United States Patent
Take

(10) Patent No.: US 8,619,373 B2
(45) Date of Patent: Dec. 31, 2013

(54) ZOOM LENS, OPTICAL APPARATUS EQUIPPED THEREWITH, AND METHOD FOR MANUFACTURING ZOOM LENS

(75) Inventor: Toshinori Take, Yokohama (JP)

(73) Assignee: Nikon Corporation, Tokyo (JP)

( * ) Notice: Subject to any disclaimer, the term of this patent is extended or adjusted under 35 U.S.C. 154(b) by 66 days.

(21) Appl. No.: 13/145,944

(22) PCT Filed: Nov. 24, 2009

(86) PCT No.: PCT/JP2009/070086
§ 371 (c)(1),
(2), (4) Date: Jul. 22, 2011

(87) PCT Pub. No.: WO2010/084664
PCT Pub. Date: Jul. 29, 2010

(65) Prior Publication Data
US 2011/0286108 A1  Nov. 24, 2011

(30) Foreign Application Priority Data

Jan. 24, 2009 (JP) .................. 2009-013720
Jan. 24, 2009 (JP) .................. 2009-013721

(51) Int. Cl.
G02B 15/14 (2006.01)
(52) U.S. Cl.
USPC .......................................... 359/687; 359/683
(58) Field of Classification Search
USPC .......................................... 359/687, 683, 684
See application file for complete search history.

(56) References Cited

U.S. PATENT DOCUMENTS

| 4,763,998 A | 8/1988 | Tsuji et al. |
| 5,528,423 A | 6/1996 | Arimoto et al. |
| 7,227,698 B2 * | 6/2007 | Yamamoto et al. ........... 359/687 |
| 7,446,947 B2 * | 11/2008 | Yamamoto et al. ........... 359/678 |
| 2001/0022696 A1 * | 9/2001 | Nishio ........................ 359/687 |

FOREIGN PATENT DOCUMENTS

| JP | 61-296319 A | 12/1986 |
| JP | 63-085518 A | 4/1988 |
| JP | 63-247715 A | 10/1988 |
| JP | 01-142519 A | 6/1989 |
| JP | 07-113957 A | 5/1995 |
| JP | 08-179212 A | 7/1996 |
| JP | 08-179214 A | 7/1996 |
| JP | 11-352400 A | 12/1999 |
| JP | 2004-199000 A | 7/2004 |
| JP | 2007-178846 A | 7/2007 |

OTHER PUBLICATIONS

English translation of International Preliminary Report on Patentability from International Patent Application No. PCT/JP2009/070086.

* cited by examiner

*Primary Examiner* — Jordan Schwartz
(74) *Attorney, Agent, or Firm* — Miles & Stockbridge P.C.

(57) ABSTRACT

A zoom lens ZL installed in an electronic still camera 1 and the like includes, in order from an object side, a first lens group G1 having positive refractive power, a second lens group G2 having negative refractive power, a third lens group G3 having positive refractive power, and a fourth lens group G4 having positive refractive power, a given conditional expressions are satisfied, where r3F denotes a radius of curvature of an image side lens surface of the cemented lens in the third lens group, and r3R denotes a radius of curvature of an object side lens surface of the negative meniscus lens in the third lens group, thereby providing a zoom lens having excellent optical performance, an optical apparatus equipped therewith, and a method for manufacturing the zoom lens.

24 Claims, 21 Drawing Sheets

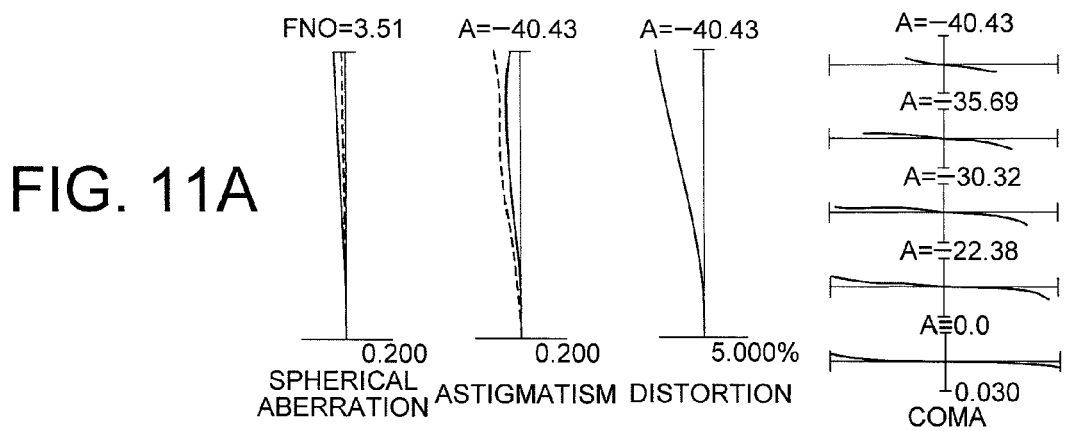
FIG. 11A
FIG. 11B
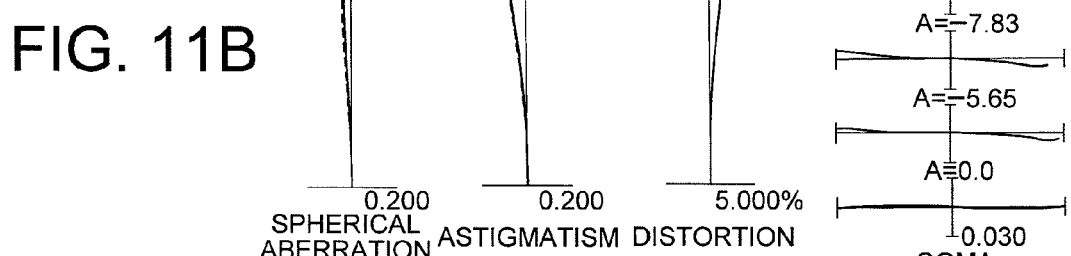
FIG. 11C
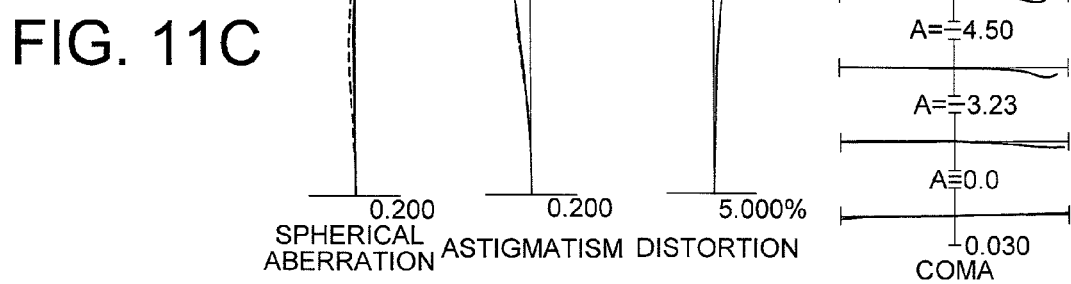
FIG. 11D
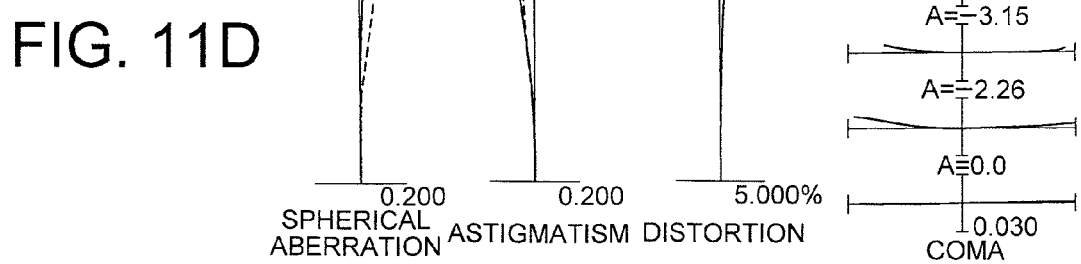

ZOOM LENS, OPTICAL APPARATUS EQUIPPED THEREWITH, AND METHOD FOR MANUFACTURING ZOOM LENS

TECHNICAL FIELD

The present invention relates to a zoom lens, an optical apparatus equipped therewith and a method for manufacturing the zoom lens.

BACKGROUND ART

A zoom lens having a four-lens-group configuration of positive-negative-positive-positive has been known (for example, see Japanese Patent Application Laid-Open No. 1-352400). The positive-negative-positive-positive four-lens-group type zoom lens is composed of four lens groups which are, in order from an object side, a first lens group having positive refractive power, a second lens group having negative refractive power, a third lens group having positive refractive power, and a fourth lens group having positive refractive power. Upon zooming from a wide-angle end state, which gives the shortest focal length, to a telephoto end state, which gives the longest focal length, at least the first lens group and the third lens group move toward the object side. Moreover, in a digital still camera and a video camera using a solid state imaging device, according to recent increase in integration of photodetector element, an area of each photodetector element becomes smaller, so that an optical system has been required to be faster and high optical performance at the same time. Moreover, as a matter of photographing convenience, a digital still camera having a high zoom ratio and excellent portability has been required.

However, in an imaging device having large number of pixels, a conventional optical system cannot obtain sufficient optical performance over large photographing area, and tends to become large because of a large aperture. As the optical system becomes large, portability becomes worse. Moreover, in order to increase possibility of photographing expression of an photographer, a zoom lens having a wide angle of view has been requested. With using a wider angle of view, it becomes possible to enjoy photograph with high flexibility. However, a high zoom ratio, a wider angle of view and high optical performance are very hard to compatible. Even if they are compatible, the optical system becomes large.

DISCLOSURE OF THE INVENTION

The present invention is made in view of the above-described problems, and has an object to provide a downsized zoom lens having excellent optical performance, an optical apparatus equipped therewith and a method for manufacturing the zoom lens.

According to a first aspect of the present invention, there is provided a zoom lens comprising, in order from an object side: a first lens group having positive refractive power; a second lens group having negative refractive power; a third lens group having positive refractive power; and a fourth lens group having positive refractive power, the third lens group including, in order from the object side, a first positive lens, a cemented lens constructed by a second positive lens cemented with a negative lens, and a negative meniscus lens, and the following conditional expressions (1) and (2) being satisfied:

$$r3\,R<0 \tag{1}$$

$$-2.00<(r3R+r3F)/(r3R-r3F)<1.00 \tag{2}$$

where r3F denotes a radius of curvature of an image side lens surface of the cemented lens in the third lens group, and r3R denotes a radius of curvature of an object side lens surface of the negative meniscus lens in the third lens group.

In the first aspect of the present invention, it is preferable that the first positive lens in the third lens group has a convex surface facing the object side, the cemented lens in the third lens group is constructed by the second positive lens having a convex surface facing the object side cemented with the negative lens having a concave surface facing the image side, and the negative meniscus lens has a convex surface facing the image side.

In the first aspect of the present invention, it is preferable that the following conditional expression (3) is satisfied:

$$0.10<fw/f3<0.50 \tag{3}$$

where fw denotes a focal length of the zoom lens in a wide-angle end state, and f3 denotes a focal length of the third lens group.

In the first aspect of the present invention, it is preferable that upon zooming from a wide-angle end state to a telephoto end state, at least the first lens group and the fourth lens group are moved to the object side such that a distance between the first lens group and the second lens group varies, a distance between the second lens group and the third lens group varies, and a distance between the third lens group and the fourth lens group varies.

In the first aspect of the present invention, it is preferable that upon zooming from a wide-angle end state to a telephoto end state, a distance between the first lens group and the second lens group increases, a distance between the second lens group and the third lens group decreases, and a distance between the third lens group and the fourth lens group decreases.

In the first aspect of the present invention, it is preferable that the following conditional expression (4) is satisfied:

$$6.00<f1/(-f2)<7.80 \tag{4}$$

where f1 denotes a focal length of the first lens group, and f2 denotes a focal length of the second lens group.

In the first aspect of the present invention, it is preferable that an aperture stop is disposed between the second lens group and the third lens group.

In the first aspect of the present invention, it is preferable that the cemented lens in the third lens group has negative refractive power.

In the first aspect of the present invention, it is preferable that at least one aspherical lens is included in the third lens group.

In the first aspect of the present invention, it is preferable that an image side lens surface of the negative meniscus lens disposed to the image side of the cemented lens in the third lens group is formed as an aspherical surface.

In the first aspect of the present invention, it is preferable that the following conditional expression (5) is satisfied:

$$0.15<f3/f4<2.75 \tag{5}$$

where f3 denotes a focal length of the third lens group, and f4 denotes a focal length of the fourth lens group.

In the first aspect of the present invention, it is preferable that the following conditional expression (6) is satisfied:

$$0.85<f1/f3<2.74 \tag{6}$$

where f1 denotes a focal length of the first lens group, and f3 denotes a focal length of the third lens group.

In the first aspect of the present invention, it is preferable that at least a portion of the second lens group is moved along an optical axis, thereby carrying out focusing on a close object.

In the first aspect of the present invention, it is preferable that at least a portion of the third lens group is moved in a direction including a component perpendicular to an optical axis.

In the first aspect of the present invention, it is preferable that the following conditional expression (7) is satisfied:

$$0.170<(-f2)/f3<0.365 \qquad (7)$$

where f2 denotes a focal length of the second lens group, and f3 denotes a focal length of the third lens group.

According to a second aspect of the present invention, there is provided an optical apparatus equipped with the zoom lens according to the first aspect for forming an image of an object on a given image plane.

According to a third aspect of the present invention, there is provided a zoom lens comprising, in order from an object side: a first lens group having positive refractive power; a second lens group having negative refractive power; a third lens group having positive refractive power; and a fourth lens group having positive refractive power, the third lens group including, in order from the object side, a first positive lens, a cemented lens constructed by a second positive lens cemented with a negative lens, and a negative meniscus lens, and the following conditional expression (7) being satisfied:

$$0.170<(-f2)/f3<0.365 \qquad (7)$$

where f2 denotes a focal length of the second lens group, and f3 denotes a focal length of the third lens group.

In the third aspect of the present invention, it is preferable that the following conditional expression (3) is satisfied:

$$0.10<fw/f3<0.50 \qquad (3)$$

where fw denotes a focal length of the zoom lens in a wide-angle end state, and f3 denotes a focal length of the third lens group.

In the third aspect of the present invention, it is preferable that the following conditional expression (4) is satisfied:

$$6.00<f1/(-f2)<7.80 \qquad (4)$$

where f1 denotes a focal length of the first lens group, and f2 denotes a focal length of the second lens group.

In the third aspect of the present invention, it is preferable that the following conditional expression (5) is satisfied:

$$0.15<f3/f4<2.75 \qquad (5)$$

where f3 denotes a focal length of the third lens group, and f4 denotes a focal length of the fourth lens group.

In the third aspect of the present invention, it is preferable that the following conditional expression (6) is satisfied:

$$0.85<f1/f3<2.74 \qquad (6)$$

where f1 denotes a focal length of the first lens group, and f3 denotes a focal length of the third lens group.

According to a fourth aspect of the present invention, there is provided a method for manufacturing a zoom lens including, in order from an object side, a first lens group having positive refractive power, a second lens group having negative refractive power, a third lens group having positive refractive power, and a fourth lens group having positive refractive power, the method comprising steps of: disposing, in order from the object side, a first positive lens, a cemented lens constructed by a second positive lens cemented with a negative lens, and a negative meniscus lens into the third lens group; and disposing the third lens group with satisfying the following conditional expressions (1) and (2):

$$r3R<0 \qquad (1)$$

$$-2.00<(r3R+r3F)/(r3R-r3F)<1.00 \qquad (2)$$

where r3F denotes a radius of curvature of an image side lens surface of the cemented lens in the third lens group, and r3R denotes a radius of curvature of an object side lens surface of the negative meniscus lens in the third lens group.

In the fourth aspect of the present invention, it is preferable that the following step is further including:

disposing each lens group with satisfying the following conditional expression (3):

$$0.10<fw/f3<0.50 \qquad (3)$$

where fw denotes a focal length of the zoom lens in a wide-angle end state, and f3 denotes a focal length of the third lens group.

In the fourth aspect of the present invention, it is preferable that the following step is further including:

disposing each lens group with satisfying the following conditional expression (4):

$$6.00<f1/(-f2)<7.80 \qquad (4)$$

where f1 denotes a focal length of the first lens group, and f2 denotes a focal length of the second lens group.

In the fourth aspect of the present invention, it is preferable that the following step is further including:

disposing each lens group with satisfying the following conditional expression (5):

$$0.15<f3/f4<2.75 \qquad (5)$$

where f3 denotes a focal length of the third lens group, and f4 denotes a focal length of the fourth lens group.

According to a fifth aspect of the present invention, there is provided a method for manufacturing a zoom lens including, in order from an object side, a first lens group having positive refractive power, a second lens group having negative refractive power, a third lens group having positive refractive power, and a fourth lens group having positive refractive power, the method comprising steps of: disposing, in order from the object side, a first positive lens, a cemented lens constructed by a second positive lens cemented with a negative lens, and a negative meniscus lens into the third lens group; and disposing each lens group with satisfying the following conditional expression (7):

$$0.170<(-f2)/f3<0.365 \qquad (7)$$

where f2 denotes a focal length of the second lens group, and f3 denotes a focal length of the third lens group.

With composing a zoom lens, an optical apparatus equipped therewith, and a method for manufacturing the zoom lens in this manner, it becomes possible to obtain high optical performance with a downsized body.

BRIEF DESCRIPTION OF THE DRAWINGS

FIGS. 3A, 3B, 3C and 3D are graphs showing various aberrations of the zoom lens according to Example 1 of the first embodiment and Example 7 of the second embodiment upon focusing on infinity, in which FIG. 3A shows a wide-angle end state (W), FIG. 3B shows an intermediate focal length state 1 (M1), FIG. 3C shows an intermediate focal length state 2 (M2), and FIG. 3D shows a telephoto end state (T).

FIGS. 5A, 5B, 5C and 5D are graphs showing various aberrations of the zoom lens according to Example 2 of the first embodiment and Example 8 of the second embodiment upon focusing on infinity, in which FIG. 5A shows the wide-angle end state (W), FIG. 5B shows the intermediate focal length state 1 (M1), FIG. 5C shows the intermediate focal length state 2 (M2), and FIG. 5D shows the telephoto end state (T).

FIGS. 7A, 7B, 7C and 7D are graphs showing various aberrations of the zoom lens according to Example 3 of the first embodiment and Example 10 of the second embodiment upon focusing on infinity, in which FIG. 7A shows the wide-angle end state (W), FIG. 7B shows the intermediate focal length state 1 (M1), FIG. 7C shows the intermediate focal length state 2 (M2), and FIG. 7D shows the telephoto end state (T).

FIGS. 9A, 9B, 9C and 9D are graphs showing various aberrations of the zoom lens according to Example 4 of the first embodiment and Example 11 of the second embodiment upon focusing on infinity, in which FIG. 9A shows the wide-angle end state (W), FIG. 9B shows the intermediate focal length state 1 (M1), FIG. 9C shows the intermediate focal length state 2 (M2), and FIG. 9D shows the telephoto end state (T).

FIGS. 11A, 11B, 11C and 11D are graphs showing various aberrations of the zoom lens according to Example 5 of the first embodiment upon focusing on infinity, in which FIG. 11A shows the wide-angle end state (W), FIG. 11B shows the intermediate focal length state 1 (M1), FIG. 11C shows the intermediate focal length state 2 (M2), and FIG. 11D shows the telephoto end state (T).

FIGS. 13A, 13B, 13C and 13D are graphs showing various aberrations of the zoom lens according to Example 6 of the first embodiment and Example 14 of the second embodiment upon focusing on infinity, in which FIG. 13A shows the wide-angle end state (W), FIG. 13B shows the intermediate focal length state 1 (M1), FIG. 13C shows the intermediate focal length state 2 (M2), and FIG. 13D shows the telephoto end state (T).

FIGS. 15A, 15B, 15C and 15D are graphs showing various aberrations of the zoom lens according to Example 9 of the second embodiment upon focusing on infinity, in which FIG. 15A shows the wide-angle end state (W), FIG. 15B shows the intermediate focal length state 1 (M1), FIG. 15C shows the intermediate focal length state 2 (M2), and FIG. 15D shows the telephoto end state (T).

FIGS. 17A, 17B, 17C and 17D are graphs showing various aberrations of the zoom lens according to Example 12 of the second embodiment upon focusing on infinity, in which FIG. 17A shows the wide-angle end state (W), FIG. 17B shows the intermediate focal length state 1 (M1), FIG. 17C shows the intermediate focal length state 2 (M2), and FIG. 17D shows the telephoto end state (T).

FIGS. 19A, 19B, 19C and 19D are graphs showing various aberrations of the zoom lens according to Example 13 of the second embodiment upon focusing on infinity, in which FIG. 19A shows the wide-angle end state (W), FIG. 19B shows the intermediate focal length state 1 (M1), FIG. 19C shows the intermediate focal length state 2 (M2), and FIG. 19D shows the telephoto end state (T).

EMBODIMENT FOR CARRYING OUT THE INVENTION

First Embodiment

Figure 1:
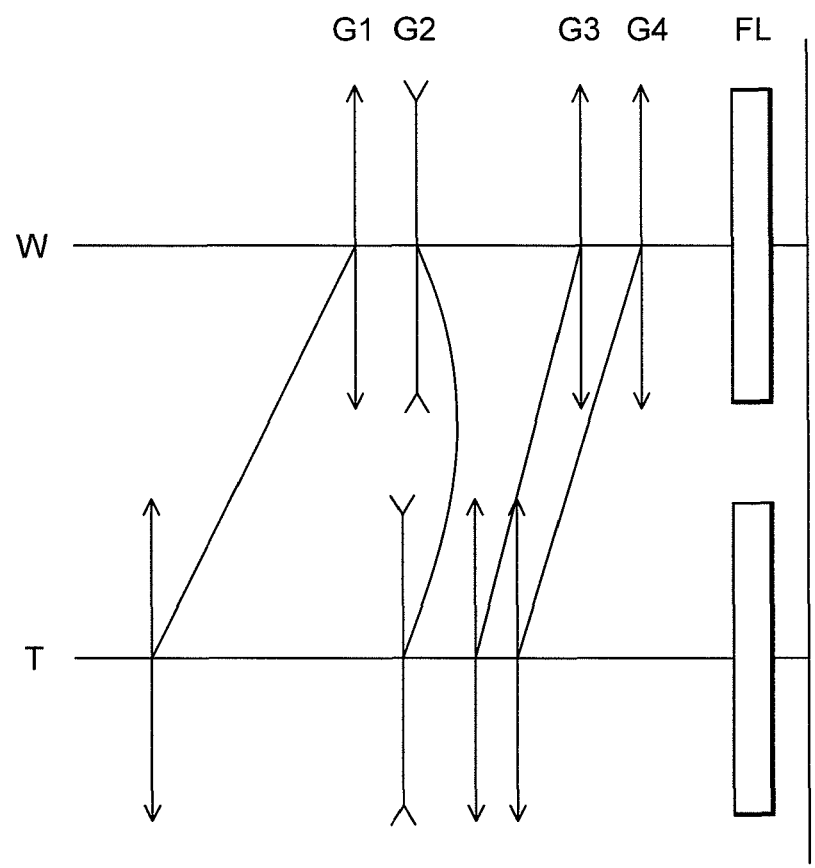
FIG. 1 is a view showing refractive power distribution of a zoom lens according to each embodiment of the present application.

A first embodiment of the present application will be explained below with reference to accompanying drawings. As shown in FIG. 1, a zoom lens ZL is composed of, in order from an object side, a first lens group G1 having positive refractive power, a second lens group G2 having negative refractive power, a third lens group G3 having positive refractive power, and a fourth lens group G4 having positive refractive power. In the zoom lens ZL, upon zooming from a wide-angle end state, which gives the shortest focal length, to a telephoto end state, which gives the longest focal length, at least the first lens group G1 and the fourth lens group G4 are moved to the object side such that a distance between the first lens group G1 and the second lens group G2 increases, a distance between the second lens group G2 and the third lens group G3 decreases, and a distance between the third lens group G3 and the fourth lens group G4 decreases. With this configuration, the zoom lens ZL makes it possible to obtain excellent optical performance with having a wide angle of view and a high zoom ratio.

Then, the function of each lens group is explained. The first lens group G1 has a function of converging light rays, and is disposed near to the image as much as possible in the wide-angle end state, so that off-axis rays pass the lens group away from the optical axis, so that the diameter of the first lens group G1 can be small. On the other hand, in the telephoto end state, the first lens group is moved to the object side so as to increase a distance to the second lens group G2, so that converging effect is enhanced to shorten the total lens length.

The second lens group G2 has an effect for expanding an image of the object formed by the first lens group G1, upon zooming from the wide-angle end state to the telephoto end state, the rate of expansion is enhanced by increasing the distance between the first lens group G1 and the second lens group G2 so as to vary the focal length.

The third lens group G3 has an effect for converging the light rays diverged by the second lens group G2. In order to accomplish excellent optical performance, it is preferable that the third lens group G3 is composed of a plurality of lens groups.

The fourth lens group G4 has an effect for further converging light rays converged by the third lens group G3. With actively varying the distance between the third lens group G3 and the fourth lens group G4 upon zooming, variation in the image plane upon zooming can be suppressed.

In the zoom lens ZL, in order to further enhance optical performance, it is preferable that the third lens group G3 is composed of, in order from the object side, a first positive lens L31, a cemented lens CL31 constructed by a second positive lens L32 cemented with a negative lens L33, and a negative meniscus lens L34, and the negative meniscus lens L34 in the third lens group G3 has a concave surface facing the object side. In other words, in the zoom lens ZL, the following conditional expressions (1) and (2) are preferably satisfied:

$$r3R<0 \qquad (1)$$

$$-2.00<(r3R+r3F)/(r3R-r3F)<1.00 \qquad (2)$$

where r3F denotes a radius of curvature of the image side lens surface of the cemented lens CL31 in the third lens group G3, and r3R denotes a radius of curvature of the object side lens surface of the negative meniscus lens L34 in the third lens group G3.

Conditional expression (1) defines the radius of curvature of the object side lens surface of the most image side lens in the third lens group G3. With satisfying conditional expression (1), in other words, with disposing the object side lens surface of the most image side lens in the third lens group G3 having a concave surface facing the object side, it becomes possible to excellently correct variations in spherical aberration and coma generated upon zooming from the wide-angle end state to the telephoto end state.

Conditional expression (2) defines a ratio of the radius of curvature of the image side lens surface of the cemented lens SL31 (sic) to the radius of curvature of the object side lens surface of the most image side lens in the third lens group G3, and is for excellently correcting coma and curvature of field generated solely in the third lens group G3. When the ratio (r3R+r3F)/(r3R−r3F) is equal to or exceeds the upper limit of conditional expression (2), it becomes impossible to correct coma and curvature of field generated solely in the third lens group G3. Moreover, distortion increases, so that it is undesirable. In order to secure the effect of the present application, it is preferable to set the upper limit of conditional expression (2) to 0.70. In order to further secure the effect of the present application, it is greatly preferable to set the upper limit of conditional expression (2) to 0.30. In order to still further secure the effect of the present application, it is most preferable to set the upper limit of conditional expression (2) to 0.15. On the other hand, when the ratio (r3R+r3F)/(r3R−r3F) is equal to or falls below the lower limit of conditional expression (2), coma generated solely in the third lens group G3 excessively increases, and optical performance upon focusing on a closest object becomes worse, so that it is undesirable. In order to secure the effect of the present application, it is preferable to set the lower limit of conditional expression (2) to −1.70. In order to further secure the effect of the present application, it is greatly preferable to set the lower limit of conditional expression (2) to −1.50. In order to still further secure the effect of the present application, it is most preferable to set the lower limit of conditional expression (2) to −1.00.

In the zoom lens ZL, in order to accomplish higher optical performance, the third lens group G3 is preferably constructed in the following manner. In order to excellently correct on-axis aberrations generated solely in the third lens group G3, it is preferable that, as described above, the third lens group G3 is composed of, in order from the object side, the first positive lens L31, the cemented lens CL31 constructed by the second positive lens L32 cemented with the negative lens L33, and the negative meniscus lens L34. In this instance, it is preferable that an aperture stop S is disposed between the second lens group G2 and the third lens group G3, and moved in a body with the third lens group G3 upon zooming from the wide-angle end state to the telephoto end state.

In the zoom lens ZL, in order to accomplish higher optical performance, the third lens group G3 is preferably constructed in the following manner. In order to excellently correct on-axis aberrations generated solely in the third lens group G3, it is preferable that, the first positive lens L31 in the third lens group G3 has a convex surface facing the object side, the second positive lens L32 in the cemented lens CL31 has a convex surface facing the object side and cemented with the negative lens L33 having a concave surface facing the image side, and the negative meniscus lens L34 has a convex surface facing the image side.

In the zoom lens ZL, the following conditional expression (3) is preferable satisfied:

$$0.10<fw/f3<0.50 \qquad (3)$$

where fw denotes a focal length of the zoom lens in the wide-angle end state, and f3 denotes a focal length of the third lens group G3.

Conditional expression (3) defines the focal length of the third lens group G3. When the ratio fw/f3 is equal to or exceeds the upper limit of conditional expression (3), refractive power of the third lens group G3 becomes strong, and spherical aberration generated solely in the third lens group G3 increases, so that it is undesirable. In order to secure the effect of the present application, it is preferable to set the upper limit of conditional expression (3) to 0.47. In order to further secure the effect of the present application, it is greatly preferable to set the upper limit of conditional expression (3) to 0.44. In order to still further secure the effect of the present application, it is most preferable to set the upper limit of conditional expression (3) to 0.40. On the other hand, when the ratio fw/f3 is equal to or falls below the lower limit of conditional expression (3), refractive power of the third lens group G3 becomes weak, and coma and curvature of field increase, so that it is undesirable. In order to secure the effect of the present application, it is preferable to set the lower limit of conditional expression (3) to 0.15. In order to further secure the effect of the present application, it is greatly preferable to set the lower limit of conditional expression (3) to 0.17. In order to still further secure the effect of the present application, it is most preferable to set the lower limit of conditional expression (3) to 0.20.

In the zoom lens ZL, the following conditional expression (4) is preferably satisfied:

$$6.00<f1/(-f2)<7.80 \qquad (4)$$

where f1 denotes a focal length of the first lens group G1, and f2 denotes a focal length of the second lens group G2.

Conditional expression (4) defines an appropriate range of a ratio of the focal length of the first lens group G1 to the focal length of the second lens group G2. When the ratio f1/(−f2) is equal to or exceeds the upper limit of conditional expression (4), refractive power of the first lens group G1 becomes relatively weak, so that the first lens group G1 cannot effectively contribute to zooming. Moreover, a moving amount of the first lens group G1 becomes large, so that variation in spherical aberration generated in the first lens group G1 upon zooming becomes large. As a result, it becomes difficult to suppress deterioration in optical performance over entire zoom range from the wide-angle end state to the telephoto end state. Moreover, refractive power of the second lens group G2 becomes relatively strong, so that generation of coma cannot be suppressed, and high optical performance cannot be obtained. Accordingly, it is undesirable. In order to secure the effect of the present application, it is preferable to set the upper limit of conditional expression (4) to 7.60. In order to further secure the effect of the present application, it is most preferable to set the upper limit of conditional expression (4) to 7.40. On the other hand, when the ratio f1/(−f2) is equal to or falls below the lower limit of conditional expression (4), refractive power of the first lens group G1 becomes relatively strong, so that an angle between the off-axis ray incident on the first lens group and the optical axis in the wide-angle state becomes small. Accordingly, when a wide angle of view is tried to be accomplished, the outer diameter of the first lens group G1 becomes large, which is contrary to downsizing. Moreover, refractive power of the second lens group G2 becomes relatively weak, so that the second lens group G2 cannot effectively contribute to zooming, so that the high zoom ratio cannot be secured. Furthermore, correction of coma becomes difficult, so that it is undesirable. In order to secure the effect of the present application, it is preferable to set the lower limit of conditional expression (4) to 6.20. In order to still further secure the effect of the present application, it is most preferable to set the lower limit of conditional expression (4) to 6.40.

In the zoom lens ZL, in order to accomplish higher optical performance, it is preferable that the third lens group G3 is composed of in the following manner. The cemented lens CL31 in the third lens group G3 has negative refractive power. With disposing negative refractive power in this manner, refractive power distribution in the third lens group G3 becomes proper, so that spherical aberration and curvature of field generated solely in the third lens group can be excellently corrected.

In the zoom lens ZL, the third lens group G3 preferably includes at least one aspherical lens. With disposing an aspherical lens in the third lens group G3, it becomes possible to excellently correct coma and curvature of field generated solely in the third lens group G3.

In the zoom lens ZL, in order to balance further higher optical performance with downsizing, it is preferable that the image side lens surface of the negative meniscus lens L34 disposed to the image side of the cemented lens CL31 in the third lens group G3 is formed as an aspherical surface. With this configuration, it becomes possible to excellently correct spherical aberration and curvature of field.

In the zoom lens ZL, the following conditional expression (5) is preferably satisfied:

$$0.15 < f3/f4 < 2.75 \quad (5)$$

where f3 denotes a focal length of the third lens group G3, and f4 denotes a focal length of the fourth lens group G4.

Conditional expression (5) defines an appropriate range of the ratio of the focal length of the third lens group G3 to the focal length of the fourth lens group G4. When the ratio f3/f4 is equal to or exceeds the upper limit of conditional expression (5), refractive power of the third lens group G3 becomes relatively weak, so that the total lens length becomes large. Moreover, correction of spherical aberration and coma generated in the third lens group G3 becomes insufficient, and desired optical performance cannot be accomplished, so that it is undesirable. In order to secure the effect of the present application, it is preferable to set the upper limit of conditional expression (5) to 2.50. In order to further secure the effect of the present application, it is greatly preferable to set the upper limit of conditional expression (5) to 2.30. In order to further secure the effect of the present application, it is most preferable to set the upper limit of conditional expression (5) to 2.10. On the other hand, when the ratio f3/f4 is equal to or falls below the lower limit of conditional expression (5), in order to secure a back focal length in the wide-angle end state, refractive power of the second lens group G2 becomes strong, and divergent effect becomes strong. As a result, the light rays incident on the third lens group G3 are diverged, so that spherical aberration generated solely in the third lens group G3 increases. Accordingly, it is undesirable. In order to secure the effect of the present application, it is preferable to set the lower limit of conditional expression (5) to 0.30. In order to further secure the effect of the present application, it is greatly preferable to set the lower limit of conditional expression (5) to 0.50. In order to still further secure the effect of the present application, it is most preferable to set the lower limit of conditional expression (5) to 0.70.

In the zoom lens ZL, the following conditional expression (6) is preferably satisfied:

$$0.85 < f1/f3 < 2.74 \quad (6)$$

where f1 denotes a focal length of the first lens group G1, and f3 denotes a focal length of the third lens group G3.

Conditional expression (6) defines an appropriate range of the ratio of the focal length of the first lens group G1 to the focal length of the third lens group G3. When the ratio f1/f3 is equal to or exceeds the upper limit of conditional expression (6), refractive power of the first lens group G1 becomes relatively weak, so that the first lens group G1 cannot effectively contribute to zooming. As a result, it becomes difficult to make the total lens length compact. Moreover, refractive power of the third lens group G3 becomes relatively strong, so that it becomes difficult to suppress generation of spherical aberration and coma. Accordingly, higher optical performance cannot be obtained, so that it is undesirable. In order to secure the effect of the present application, it is preferable to set the upper limit of conditional expression (6) to 2.50. In order to further secure the effect of the present application, it is most preferable to set the upper limit of conditional expression (6) to 2.30. On the other hand, when the ratio f1/f3 is equal to or falls below the lower limit of conditional expression (6), refractive power of the first lens group G1 becomes relatively strong, so that an angle between the off-axis ray incident on the first lens group G1 in the wide-angle state and the optical axis becomes small. Accordingly, in order to realize a wide angle of view, the outer diameter of the first lens group G1 becomes large, which is contrary to downsizing. Moreover, refractive power of the third lens group G3 becomes relatively weak, it becomes difficult to correct coma and curvature of field generated solely in the third lens group, so that it is undesirable. In order to secure the effect of the present application, it is preferable to set the lower limit of conditional expression (6) to 1.00. In order to further secure the effect of the present application, it is greatly preferable to set the lower limit of conditional expression (6) to 1.20. In order to still further secure the effect of the present application, it is most preferable to set the lower limit of conditional expression (6) to 1.40.

Figure 20:
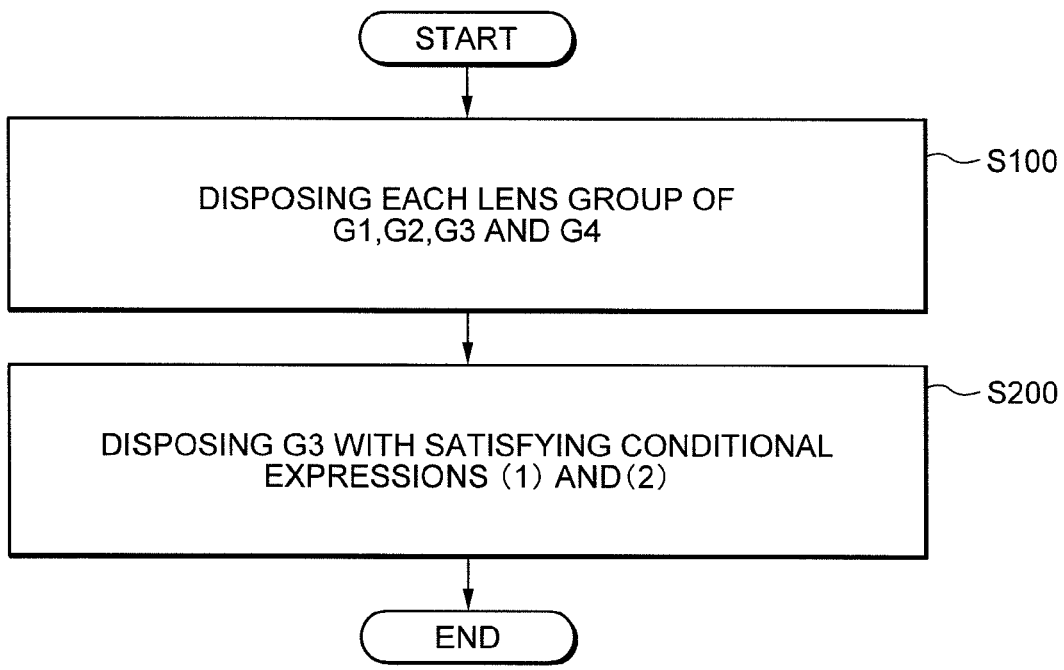
FIG. 20 is a flowchart schematically explaining a method for manufacturing the zoom lens according to the first embodiment of the present application.

Then, an outline of a method for manufacturing a zoom lens ZL according to the first embodiment is explained below with reference to FIG. 20. At first, each lens group is prepared with disposing each lens (Step S100). In particular, in the first embodiment, the first lens group G1 is prepared by disposing, in order from an object side, a cemented positive lens CL11 constructed by a negative meniscus lens L11 having a convex surface facing the object side cemented with a positive meniscus lens L12 having a concave surface facing the image side, and a positive meniscus lens L13 having a convex surface facing the object side. The second lens group G2 is prepared by disposing, in order from the object side, a negative meniscus lens L21 having a convex surface facing the object side and an aspherical surface formed on the image side, a double concave lens L22, a double convex lens L23, and a negative meniscus lens L24 having a concave surface facing the object side. The third lens group G3 is prepared by disposing, in order from the object side, a double convex lens L31, a cemented negative lens CL31 constructed by a double convex lens L32 cemented with a double concave lens L33, and a negative meniscus lens L34 having a concave surface facing the object side and an aspherical surface formed on the image side. The fourth lens group G4 is prepared by disposing, in order from the object side, a double convex lens L41 having an aspherical surface formed on the image side, a cemented negative lens CL41 constructed by a double convex lens L42 cemented with a double concave lens L43, and a double convex lens L44.

On this occasion, the third lens group G3 is disposed so that the third lens group G3 may satisfy the following conditional expressions (1) and (2) (Step S200):

$$r3R<0 \quad (1)$$

$$-2.00<(r3R+r3F)/(r3R-r3F)<1.00 \quad (2)$$

where r3F denotes a radius of curvature of the image side lens surface of the cemented lens CL31 in the third lens group G3, and r3R denotes a radius of curvature of the object side lens surface of the negative meniscus lens L34 in the third lens group G3.

Each example according to the first embodiment of the present application is explained with reference to accompanying drawings. FIG. 1 is a view showing refractive power distribution of a zoom lens ZL according to each example of the first embodiment of the present application and movement of each lens group upon zooming from a wide-angle end state (W) to a telephoto end state (T). Incidentally, FIGS. 2, 4, 6, 8, 10 and 12 are sectional views showing respective constructions of zoom lenses ZL1 through ZL6. As shown in respective drawings, each of the zoom lenses ZL1 through ZL6 is composed of, in order from an object side, a first lens group G1 having positive refractive power, a second lens group G2 having negative refractive power, a third lens group G3 having positive refractive power, a fourth lens group G4 having positive refractive power, and a filter group FL. Upon varying a focal length, in other words, zooming from the wide-angle end state to the telephoto end state, the first lens group G1 is moved with respect to an image plane and the first lens group G1, the third lens group G3 and the fourth lens group G4 are moved to the object side, and the second lens group G2 is moved such that a distance between the first lens group G1 and the second lens group G2 varies, a distance between the second lens group G2 and the third lens group G3 decreases, and a distance between the third lens group G3 and the fourth lens group G4 decreases. Here, the filter group FL is composed of a low-pass filter, an infrared blocking filter, and the like. The image plane I is formed on an unillustrated imaging device such as a film, a CCD, a DMOS, and the like.

An aperture stop S is disposed to the most object side of the third lens group G3 and moved in a body with the third lens group G3 upon zooming from the wide-angle end state to the telephoto end state.

In each Example, an aspherical surface is expressed by the following expression (a):

$$S(y)=(y^2/r)/(1+(1-\kappa(y^2/r^2))^{1/2})+A4\times y^4+A6\times y^6+A8\times y^8+A10\times y^{10} \quad (a)$$

where "y" denotes a vertical height from the optical axis, S(y) denotes a sag amount which is a distance along the optical axis from the tangent surface at the vertex of the aspherical surface to the aspherical surface at the vertical height "y" from the optical axis, "r" denotes a radius of curvature of a reference sphere (paraxial radius of curvature), "κ" denotes a conical coefficient, and "An" denotes an aspherical coefficient of n-th order. In the following Examples, "E–n" denotes "×10$^{-n}$". In each Example, an aspherical coefficient of the second order A2 is zero. Each aspherical surface is expressed in (Lens Data) by attaching "*" to the left side of the surface number.

EXAMPLE 1

Figure 2:
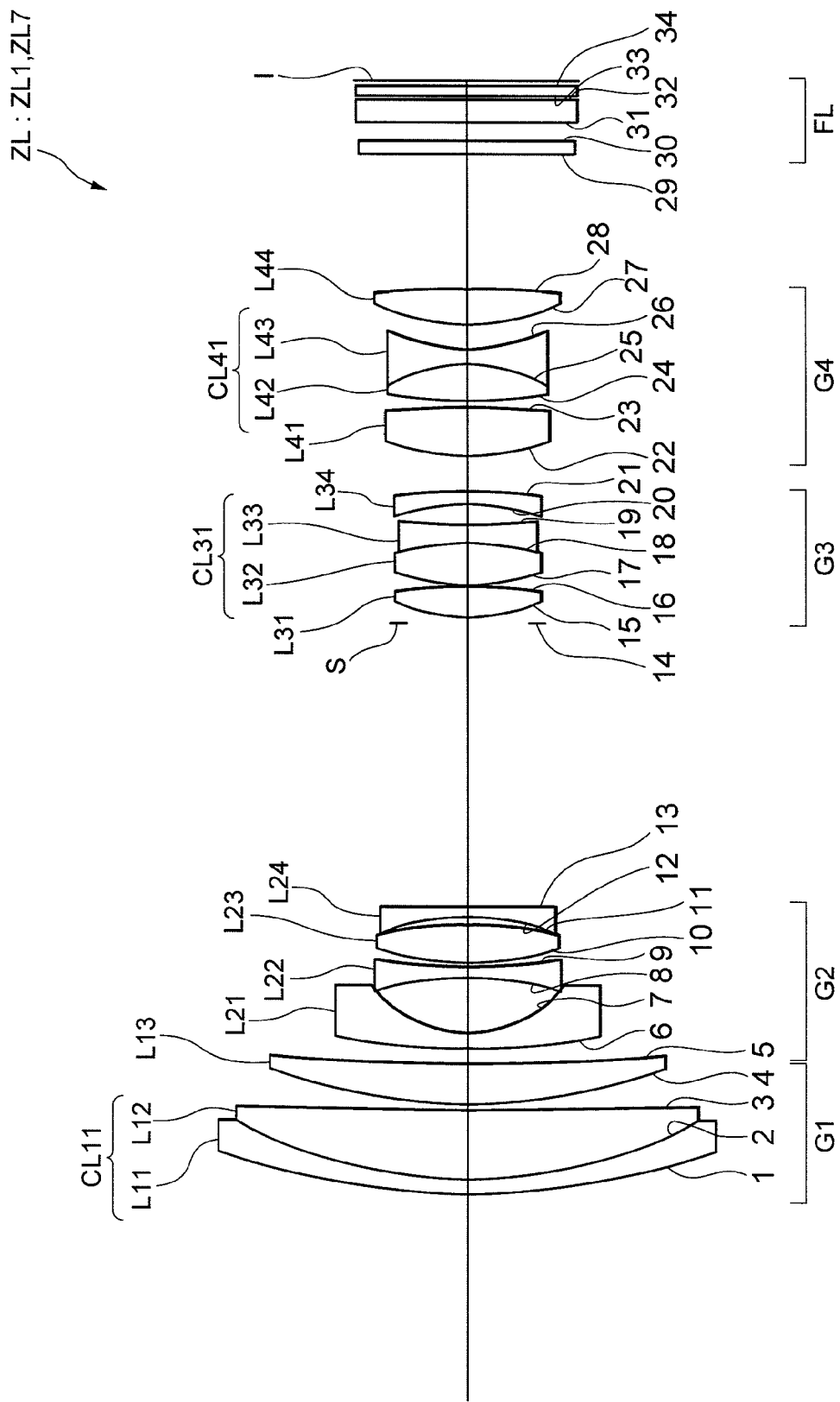
FIG. 2 is a sectional view showing a lens configuration of a zoom lens according to Example 1 of a first embodiment, and Example 7 of a second embodiment.

FIG. 2 is a sectional view showing a lens configuration of a zoom lens ZL1 according to Example 1 of the first embodiment. In the zoom lens ZL1 shown in FIG. 2, the first lens group G1 is composed of, in order from the object side, a cemented positive lens CL11 constructed by a negative meniscus lens L11 having a convex surface facing the object side cemented with a positive meniscus lens L12 having a concave surface facing the image side, and a positive meniscus lens L13 having a convex surface facing the object side. The second lens group G2 is composed of, in order from the object side, a negative meniscus lens L21 having a convex surface facing the object side and an aspherical surface formed on the image side, a double concave lens L22, a double convex lens L23, and a negative meniscus lens L24 having a concave surface facing the object side. The third lens group G3 is composed of, in order from the object side, a double convex lens L31, a cemented negative lens CL31 constructed by a double convex L32 cemented with a double concave lens L33, and a negative meniscus lens L34 having a concave surface facing the object side and an aspherical surface formed on the image side. The fourth lens group G4 is composed of, in order from the object side, a double convex lens L41 having an aspherical surface formed on the image side, a cemented negative lens CL41 constructed by a double convex lens L42 cemented with a double concave lens L43, and a double convex lens L44.

Various values associated with the zoom lens ZL1 according to Example 1 are listed in Table 1.

In (Specifications), W denotes a wide-angle end state, M1 denotes a first intermediate focal length state, M2 denotes a second intermediate focal length state, T denotes a telephoto end state, f denotes a focal length of the zoom lens, FNO denotes an f-number, and 2ω denotes an angle of view, BF denotes a back focal length, and TL denotes an air converted total lens length. In (Lens Data), the left most column "i" shows the lens surface number counted in order from the object side, the third column "d" shows a distance to the next optical surface, the fourth and the fifth columns "nd" and "vd" show a refractive index and an Abbe number at d-line (wavelength λ=587.6 nm), respectively. The total lens length "TL" denotes a distance along an optical axis between the first surface and the image plane I upon focusing on infinity. In Example 1, each of the surfaces 7, 21 and 23 is formed with an aspherical surface. In (Aspherical Surface Data), paraxial radius of curvature "R", a conical coefficient "κ", and aspherical coefficient A4 through A10 are shown.

In Example 1, a distance d5 between the first lens group G1 and the second lens group G2, a distance d13 along the optical axis between the second lens group G2 and the third lens group G3, a distance d21 between the third lens group G3 and the fourth lens group G4, and a distance d28 between the fourth lens group G4 and the filter group FL are varied upon zooming. In (Variable Distances), values of variable distances with respect to the wide-angle end state (W), the intermediate focal length state 1 (M1), the intermediate focal length state 2 (M2), and the telephoto end state (T) are shown. In (Values for Conditional Expressions), corresponding values for respective conditional expressions of the zoom lens ZL1 according to Example 1 are shown. Here, fw denotes a focal length of the zoom lens ZL1 in the wide-angle end state, f1 denotes a focal length of the first lens group G1, f2 denotes a focal length of the second lens group G2, f3 denotes a focal length to the third lens group G3, f4 denotes a focal length of the fourth lens group G4, r3F denotes a radius of curvature of the image side lens surface of the cemented negative lens CL31 in the third lens group G3, and r3R denotes a radius of curvature of the object side lens surface of the negative meniscus lens L34 in the third lens group G3. In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. Incidentally, r=0.0000 represents a plane surface, and the refractive index of the air nd=1.00000 is omitted. The explanation of reference symbols is the same in the other Examples.

TABLE 1

(Specifications)

|  | W | M1 | M2 | T |
|---|---|---|---|---|
| f = | 10.51 | 26.91 | 70.00 | 107.09 |
| FNO = | 3.41 | 4.56 | 5.60 | 5.92 |
| 2ω = | 80.74 | 34.10 | 13.57 | 8.93 |
| Bf = | 15.73 | 28.33 | 39.26 | 42.73 |
| TL = | 89.88 | 104.35 | 125.23 | 131.28 |
| Y = | 8.50 | 8.50 | 8.50 | 8.50 |

(Lens Data)

| i | r | d | nd | νd |
|---|---|---|---|---|
| 1 | 61.1581 | 1.20 | 1.84666 | 23.78 |
| 2 | 40.0620 | 5.60 | 1.49700 | 81.54 |
| 3 | 423.5882 | 0.50 | | |
| 4 | 46.1934 | 3.35 | 1.67790 | 55.34 |
| 5 | 182.2832 | (d5) | | |
| 6 | 61.2018 | 1.20 | 1.80139 | 45.46 |
| *7 | 9.3577 | 4.60 | | |
| 8 | −27.3674 | 0.85 | 1.78800 | 47.37 |
| 9 | 41.1686 | 0.30 | | |
| 10 | 22.0377 | 3.15 | 1.80810 | 22.76 |
| 11 | −32.1910 | 0.65 | | |
| 12 | −19.7165 | 0.85 | 1.75500 | 52.32 |
| 13 | −407.6339 | (d13) | | |
| 14 | 0.0000 | 0.50 | Aperture Stop S | |
| 15 | 14.8924 | 2.60 | 1.60300 | 65.44 |
| 16 | −40.4513 | 0.10 | | |
| 17 | 17.4716 | 3.45 | 1.49700 | 81.54 |
| 18 | −21.2482 | 1.45 | 1.88300 | 40.76 |
| 19 | 39.7309 | 1.75 | | |
| 20 | −17.0463 | 1.00 | 1.80139 | 45.46 |
| *21 | −51.3354 | (d21) | | |
| 22 | 18.2360 | 4.00 | 1.61881 | 63.86 |
| *23 | −34.0096 | 0.60 | | |
| 24 | 48.8072 | 3.00 | 1.60300 | 65.44 |
| 25 | −12.3504 | 1.20 | 1.75500 | 52.32 |
| 26 | 13.7843 | 2.00 | | |
| 27 | 16.9250 | 2.85 | 1.51680 | 64.12 |
| 28 | −87.6437 | (d28) | | |
| 29 | 0.0000 | 1.00 | 1.51680 | 64.12 |
| 30 | 0.0000 | 1.50 | | |
| 31 | 0.0000 | 1.87 | 1.51680 | 64.12 |
| 32 | 0.0000 | 0.40 | | |
| 33 | 0.0000 | 0.70 | 1.51680 | 64.12 |
| 34 | 0.0000 | (Bf) | | |

(Aspherical Surface Data)

Surface Number: 7

R = 9.3577
κ = 1.0421
A4 = −2.9241E−05
A6 = −5.0127E−07
A8 = 8.6241E−09
A10 = −1.7709E−10

Surface Number: 21

R = −51.3354
κ = 11.0000
A4 = −4.3022E−05
A6 = −9.3099E−07
A8 = 1.0189E−08
A10 = −7.0307E−11

Surface Number: 23

R = −34.0096
κ = 11.0000
A4 = 2.1147E−04
A6 = 1.2036E−06
A8 = −1.5877E−08
A10 = 2.1370E−10

(Variable Distances)

|  | W | M1 | M2 | T |
|---|---|---|---|---|
| f = | 10.5100 | 26.9148 | 69.9996 | 107.0852 |
| d5 = | 1.3000 | 15.9163 | 32.2603 | 37.7051 |
| d13 = | 23.2000 | 11.5316 | 5.5576 | 2.8000 |
| d21 = | 2.9000 | 1.8152 | 1.3998 | 1.3000 |
| d28 = | 10.9749 | 23.5797 | 34.5074 | 37.9749 |
| Bf = | 0.4999 | 0.4999 | 0.4999 | 0.5001 |

(Values for Conditional Expressions)

fw = 10.5100
f1 = 67.5093
f2 = −9.7136
f3 = 30.3374
f4 = 26.7735
r3F = 39.7309
(1) r3R = −17.0463
(2) (r3R + r3F)/(r3R − r3F) = −0.3995
(3) fw/f3 = 0.3464
(4) f1/(−f2) = 6.9500
(5) f3/f4 = 1.1331
(6) f1/f3 = 2.2253

Figure 3A:
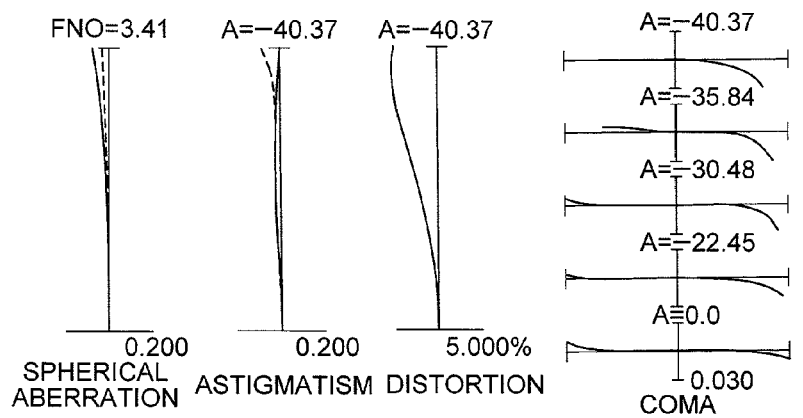
Figure 3B:
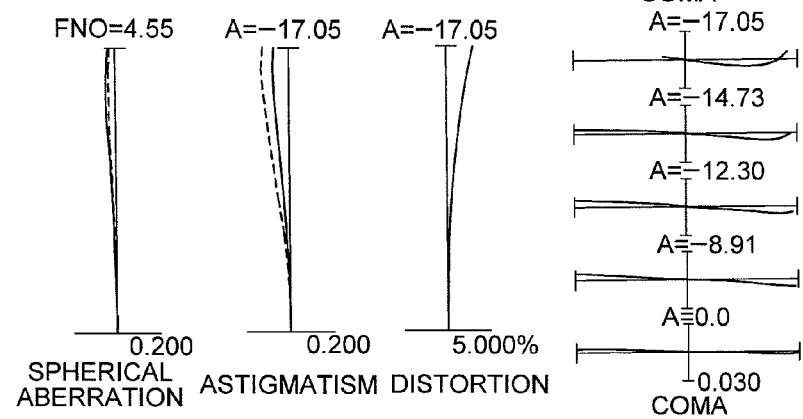
Figure 3C:
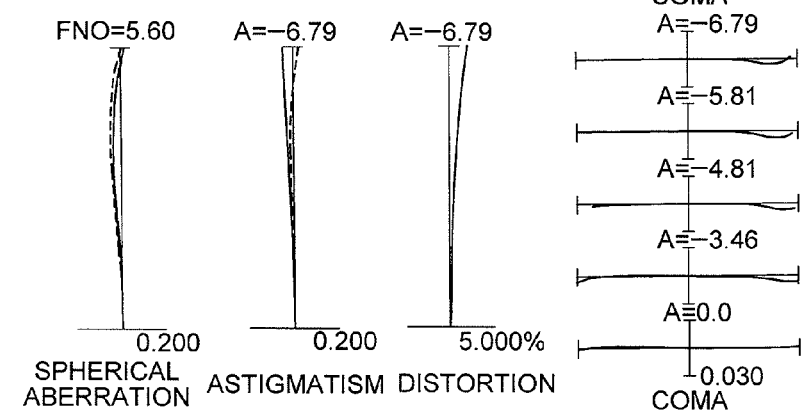
Figure 3D:
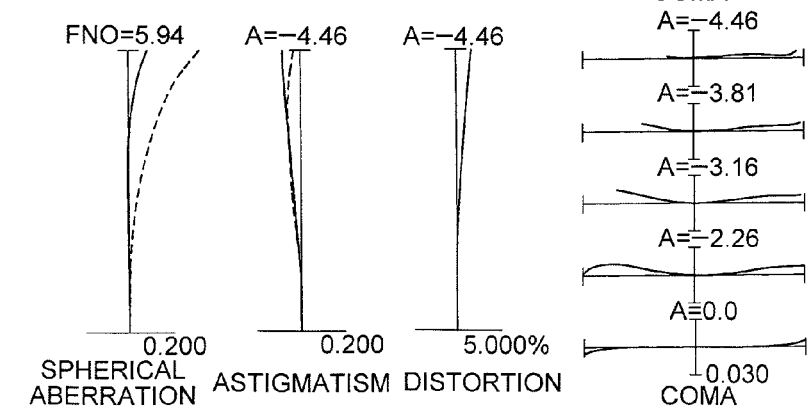

FIGS. 3A, 3B, 3C and 3D are graphs showing various aberrations of the zoom lens ZL1 according to Example 1 of the first embodiment at d-line (λ=587.6 nm) upon focusing on infinity, in which FIG. 3A shows a wide-angle end state (f=10.51 mm) W, FIG. 3B shows an intermediate focal length state 1 (f=26.91 mm) M1, FIG. 3C shows an intermediate focal length state 2 (f=70.00 mm) M2, and FIG. 3D shows a telephoto end state (f=107.09 mm) T. As is apparent from the respective graphs, the zoom lens system according to Example 1 shows superb optical performance as a result of good corrections to various aberrations in each focal length state from the wide-angle end state through the telephoto end state.

EXAMPLE 2

Figure 4:
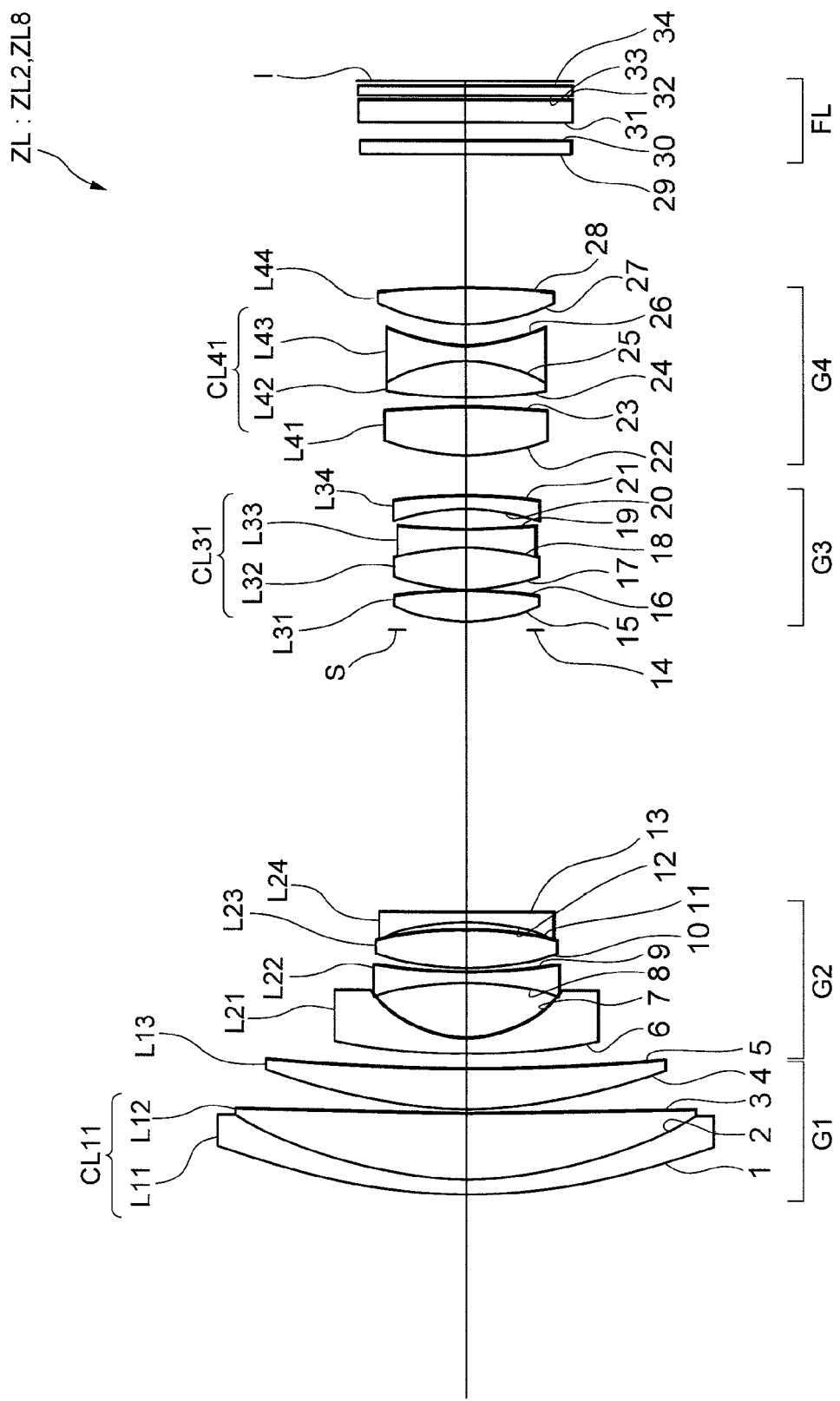
FIG. 4 is a sectional view showing a lens configuration of a zoom lens according to Example 2 of the first embodiment, and Example 8 of the second embodiment.

FIG. 4 is a sectional view showing a lens configuration of a zoom lens ZL2 according to Example 2 of the first embodiment. In the zoom lens ZL2 according to Example 2 of the first embodiment, the first lens group G1 is composed of, in order from the object side, a cemented positive lens CL11 constructed by a negative meniscus lens L11 having a convex surface facing the object side cemented with a positive meniscus lens L12 having a concave surface facing the image side, and a positive meniscus lens L13 having a convex surface facing the object side. The second lens group G2 is composed of, in order from the object side, a negative meniscus lens L21 having a convex surface facing the object side and an aspherical surface formed on the image side, a double concave lens L22, a double convex lens L23, and a double concave lens L24. The third lens group G3 is composed of, in order from the object side, a double convex lens L31, a cemented negative lens CL31 constructed by a double convex L32 cemented with a double concave lens L33, and a negative meniscus lens L34 having a concave surface facing the object side and an aspherical surface formed on the image side. The fourth lens group G4 is composed of, in order from the object side, a double convex lens L41 having an aspherical surface formed on the image side, a cemented negative lens CL41 constructed by a double convex lens L42 cemented with a double concave lens L43, and a double convex lens L44.

Various values associated with the zoom lens ZL2 according to Example 2 are listed in Table 2. In Example 2, each of lens surfaces 7, 21, and 23 is formed with an aspherical surface. In Example 2, a distance d5 between the first lens group G1 and the second lens group G2, a distance d13 between the second lens group G2 and the third lens group G3, a distance d21 between the third lens group G3 and the fourth lens group G4, and a distance d28 between the fourth lens group G4 and the filter group FL are varied upon zooming.

TABLE 2

(Specifications)

| | W | M1 | M2 | T |
|---|---|---|---|---|
| f = | 10.51 | 26.88 | 70.00 | 107.09 |
| FNO = | 3.37 | 4.55 | 5.61 | 5.94 |
| 2ω = | 80.65 | 34.11 | 13.52 | 8.89 |
| Bf = | 15.56 | 28.56 | 39.54 | 43.01 |
| TL = | 89.97 | 102.56 | 122.53 | 128.22 |
| Y = | 8.50 | 8.50 | 8.50 | 8.50 |

(Lens Data)

| i | r | d | nd | νd |
|---|---|---|---|---|
| 1 | 57.8992 | 1.20 | 1.84666 | 23.78 |
| 2 | 37.8485 | 5.40 | 1.49700 | 81.54 |
| 3 | 455.0569 | 0.50 | | |
| 4 | 45.1853 | 3.21 | 1.67790 | 55.34 |
| 5 | 200.0894 | (d5) | | |
| 6 | 76.0070 | 1.20 | 1.80139 | 45.45 |
| *7 | 9.7908 | 4.58 | | |
| 8 | −28.4260 | 0.85 | 1.78800 | 47.37 |

TABLE 2-continued

| 9 | 36.7782 | 0.30 | | |
|---|---|---|---|---|
| 10 | 21.7223 | 3.17 | 1.80810 | 22.76 |
| 11 | −30.7063 | 0.61 | | |
| 12 | −19.7864 | 0.85 | 1.75500 | 52.32 |
| 13 | 946.9644 | (d13) | | |
| 14 | 0.0000 | 0.50 | Aperture Stop S | |
| 15 | 15.3993 | 2.61 | 1.60300 | 65.44 |
| 16 | −37.6383 | 0.10 | | |
| 17 | 19.0098 | 3.49 | 1.49700 | 81.54 |
| 18 | −19.0508 | 1.50 | 1.88300 | 40.76 |
| 19 | 47.4940 | 1.62 | | |
| 20 | −16.0939 | 1.00 | 1.80139 | 45.45 |
| *21 | −37.0133 | (d21) | | |
| 22 | 18.5418 | 4.00 | 1.61881 | 63.85 |
| *23 | −28.5379 | 0.86 | | |
| 24 | 67.2548 | 3.00 | 1.60300 | 65.44 |
| 25 | −13.3315 | 1.20 | 1.75500 | 52.32 |
| 26 | 13.0827 | 1.71 | | |
| 27 | 16.2368 | 3.00 | 1.51680 | 64.10 |
| 28 | −110.0854 | (d28) | | |
| 29 | 0.0000 | 1.00 | 1.51680 | 64.12 |
| 30 | 0.0000 | 1.50 | | |
| 31 | 0.0000 | 1.87 | 1.51680 | 64.12 |
| 32 | 0.0000 | 0.40 | | |
| 33 | 0.0000 | 0.70 | 1.51680 | 64.12 |
| 34 | 0.0000 | (Bf) | | |

(Aspherical Surface Data)

Surface Number: 7

R = 9.7908
κ = 1.1109
A4 = −3.1862E−05
A6 = −5.4887E−07
A8 = 9.3504E−09
A10 = −1.8962E−10

Surface Number: 21

R = −37.0133
κ = 11.0000
A4 = −2.5730E−05
A6 = −7.9160E−07
A8 = 9.1322E−09
A10 = −5.5758E−11

Surface Number: 23

R = −28.5379
κ = 11.0000
A4 = 2.2123E−04
A6 = 1.2734E−06
A8 = −1.4347E−08
A10 = 2.5712E−10

(Variable Distances)

| | W | M1 | M2 | T |
|---|---|---|---|---|
| f = | 10.5100 | 26.8793 | 69.9997 | 107.0895 |
| d5 = | 1.3000 | 14.1157 | 29.5282 | 34.6555 |
| d13 = | 23.2000 | 11.4527 | 5.5687 | 2.8000 |
| d21 = | 3.3465 | 1.9639 | 1.4352 | 1.3000 |
| d28 = | 10.8061 | 23.8111 | 34.7874 | 38.2526 |
| Bf = | 0.5000 | 0.4999 | 0.4999 | 0.4998 |

(Values for Conditional Expressions)

fw = 10.5100
f1 = 63.3539
f2 = −9.5359
f3 = 30.4795
f4 = 27.6448
r3F = 47.4940
(1) r3R = −16.0939
(2) (r3R + r3F)/(r3R − r3F) = −0.4938
(3) fw/f3 = 0.3448
(4) f1/(−f2) = 6.6437
(5) f3/f4 = 1.1025
(6) f1/f3 = 2.0786

Figure 5A:
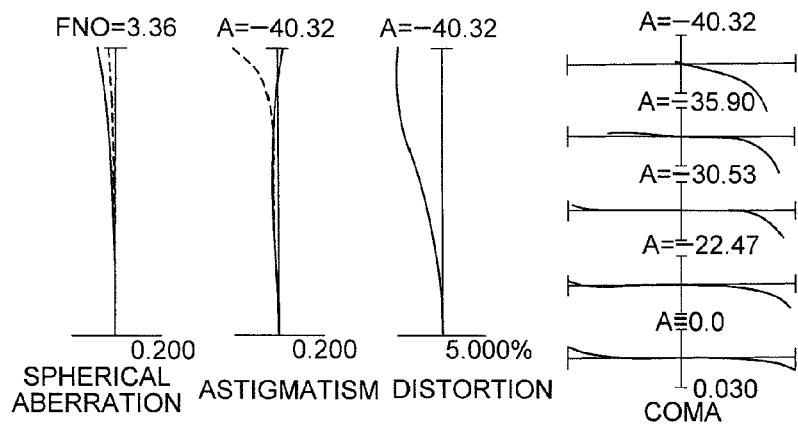
Figure 5B:
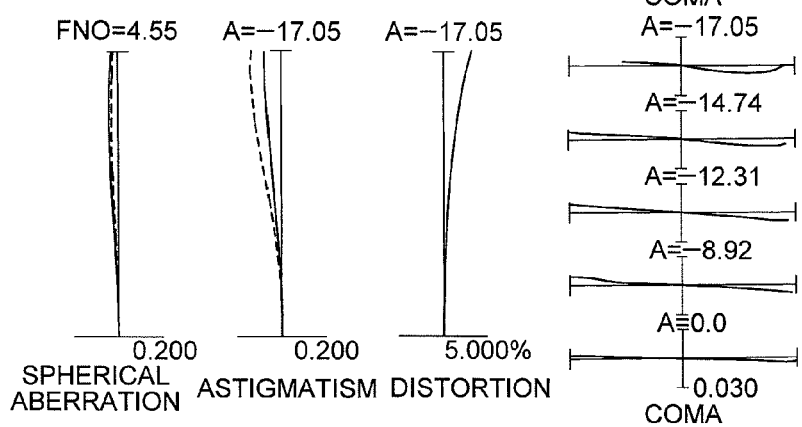
Figure 5C:
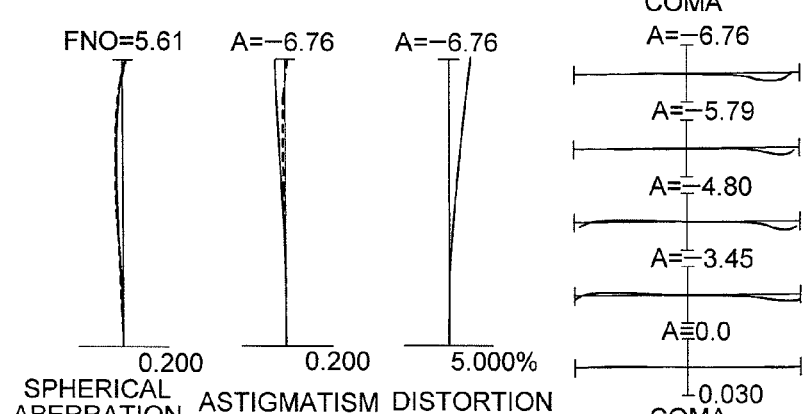
Figure 5D:
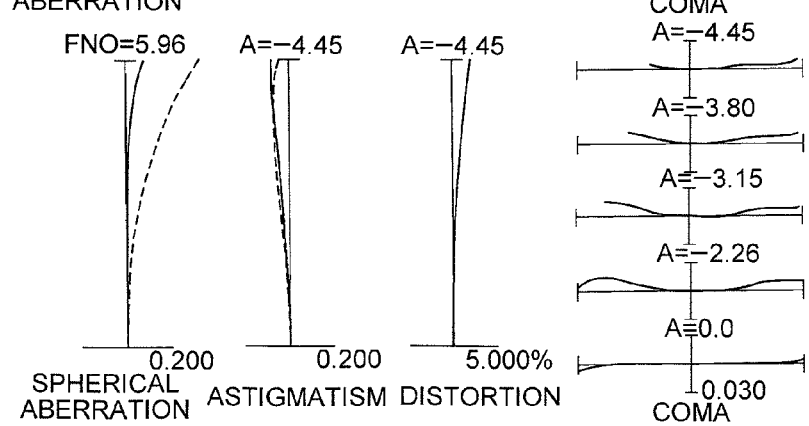

FIGS. 5A, 5B, 5C and 5D are graphs showing various aberrations of the zoom lens ZL2 according to Example 2 of the first embodiment at d-line (λ=587.6 nm) upon focusing on infinity, in which FIG. 5A shows a wide-angle end state (f=10.51 mm) W, FIG. 5B shows an intermediate focal length state 1 (f=26.88 mm) M1, FIG. 5C shows an intermediate focal length state 2 (f=70.00 mm) M2, and FIG. 5D shows a telephoto end state (f=107.09 mm) T. As is apparent from the respective graphs, the zoom lens system according to Example 2 shows superb optical performance as a result of good corrections to various aberrations in each focal length state from the wide-angle end state through the telephoto end state.

EXAMPLE 3

Figure 6:
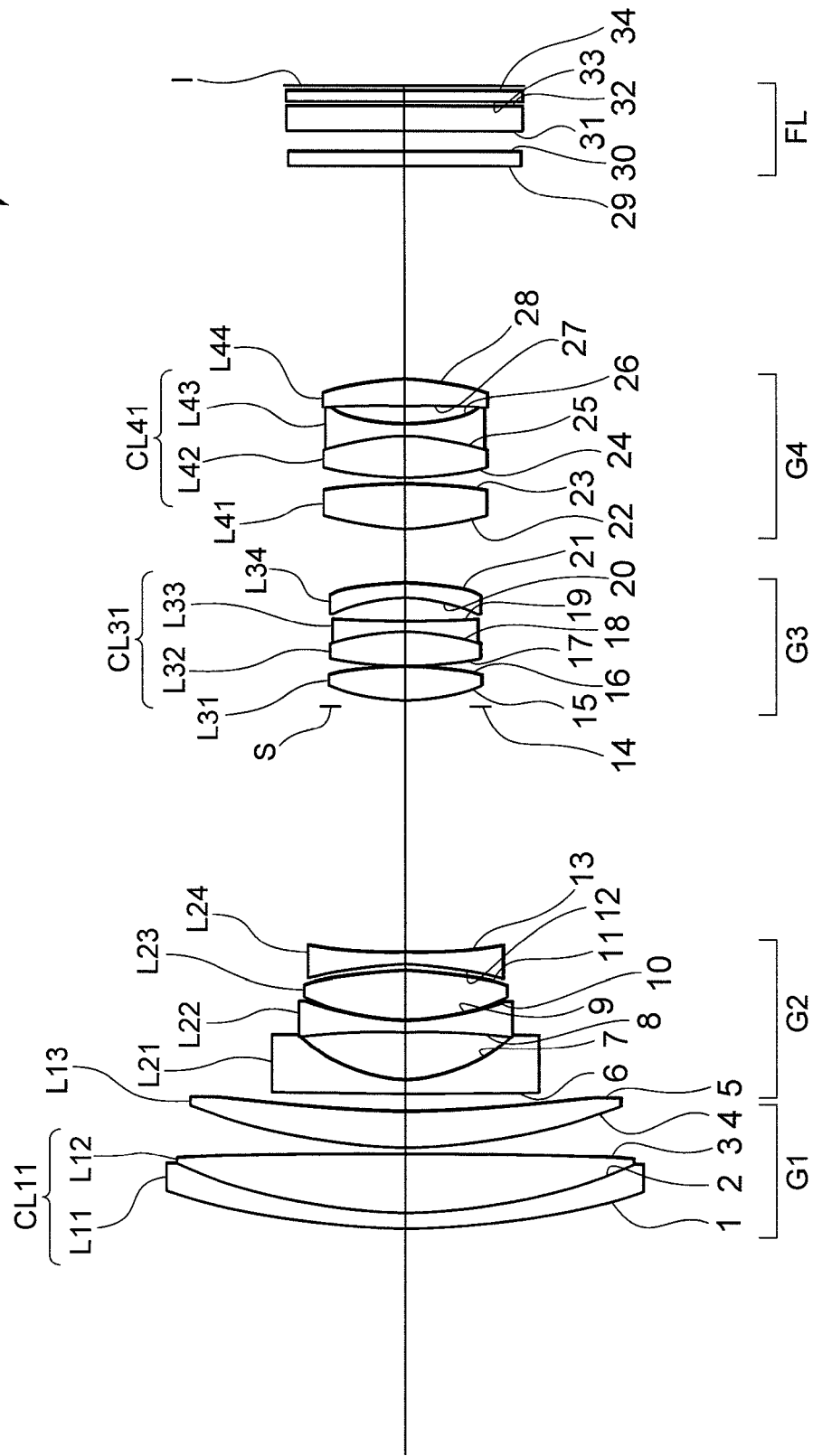
FIG. 6 is a sectional view showing a lens configuration of a zoom lens according to Example 3 of the first embodiment, and Example 10 of the second embodiment.

FIG. 6 is a sectional view showing a lens configuration of a zoom lens ZL3 according to Example 3 of the first embodiment. In the zoom lens ZL3 according to Example 3 of the first embodiment, the first lens group G1 is composed of, in order from the object side, a cemented positive lens CL21 (sic) constructed by a negative meniscus lens L11 having a convex surface facing the object side cemented with a double convex lens L12, and a positive meniscus lens L13 having a convex surface facing the object side. The second lens group G2 is composed of, in order from the object side, a negative meniscus lens L21 having a convex surface facing the object side and an aspherical surface formed on the image side, a double concave lens L22, a double convex lens L23, and a double concave lens L24. The third lens group G3 is composed of, in order from the object side, a double convex lens L31, a cemented negative lens CL31 constructed by a double convex L32 cemented with a double concave lens L33, and a negative meniscus lens L34 having a concave surface facing the object side and an aspherical surface formed on the image side. The fourth lens group G4 is composed of, in order from the object side, a double convex lens L41 having an aspherical surface formed on the image side, a cemented negative lens CL41 constructed by a double convex lens L42 cemented with a double concave lens L43, and a positive meniscus lens L44 having a convex surface facing the image side.

Various values associated with the zoom lens ZL3 according to Example 3 are listed in Table 3. In Example 3, each of lens surfaces 7, 21, and 23 is formed with an aspherical surface. In Example 3, a distance d5 between the first lens group G1 and the second lens group G2, a distance d13 between the second lens group G2 and the third lens group G3, a distance d21 between the third lens group G3 and the fourth lens group G4, and a distance d28 between the fourth lens group G4 and the filter group FL are varied upon zooming.

TABLE 3

(Specifications)

|  | W | M1 | M2 | T |
|---|---|---|---|---|
| f = | 10.51 | 16.50 | 41.00 | 107.09 |
| FNO = | 3.07 | 3.53 | 4.63 | 5.83 |
| 2ω = | 80.82 | 53.18 | 22.58 | 8.89 |
| Bf = | 20.63 | 26.70 | 39.83 | 53.07 |
| TL = | 83.79 | 88.67 | 108.77 | 128.78 |
| Y = | 8.50 | 8.50 | 8.50 | 8.50 |

TABLE 3-continued (Lens Data)

| i | r | d | nd | vd |
|---|---|---|---|---|
| 1 | 60.9480 | 1.20 | 1.92286 | 20.88 |
| 2 | 43.6565 | 4.30 | 1.49700 | 81.54 |
| 3 | −386.1029 | 0.50 | | |
| 4 | 43.7100 | 2.65 | 1.64000 | 60.08 |
| 5 | 112.1795 | (d5) | | |
| 6 | 54885.3920 | 1.00 | 1.80139 | 45.45 |
| *7 | 10.5338 | 3.58 | | |
| 8 | −76.2868 | 0.85 | 1.81600 | 46.62 |
| 9 | 20.0765 | 0.10 | | |
| 10 | 17.8807 | 3.65 | 1.80810 | 22.76 |
| 11 | −26.7256 | 0.45 | | |
| 12 | −23.1129 | 0.85 | 1.77250 | 49.60 |
| 13 | 55.6994 | (d13) | | |
| 14 | 0.0000 | 0.50 | Aperture Stop S | |
| 15 | 16.2624 | 2.45 | 1.60311 | 60.64 |
| 16 | −31.8849 | 0.10 | | |
| 17 | 30.4987 | 2.55 | 1.49700 | 81.54 |
| 18 | −17.5829 | 0.80 | 1.88300 | 40.76 |
| 19 | 80.4259 | 1.80 | | |
| 20 | −12.1903 | 1.00 | 1.80610 | 40.73 |
| *21 | −20.5989 | (d21) | | |
| 22 | 18.0823 | 3.50 | 1.61881 | 63.85 |
| *23 | −29.2315 | 0.50 | | |
| 24 | 27.0281 | 3.00 | 1.60300 | 65.44 |
| 25 | −18.4995 | 0.90 | 1.77250 | 49.60 |
| 26 | 15.2175 | 1.30 | | |
| 27 | −155.5751 | 2.00 | 1.51633 | 64.14 |
| 28 | −18.8809 | (d28) | | |
| 29 | 0.0000 | 1.00 | 1.51680 | 64.12 |
| 30 | 0.0000 | 1.50 | | |
| 31 | 0.0000 | 1.87 | 1.51680 | 64.12 |
| 32 | 0.0000 | 0.40 | | |
| 33 | 0.0000 | 0.70 | 1.51680 | 64.12 |
| 34 | 0.0000 | (Bf) | | |

(Aspherical Surface Data)

Surface Number: 7

R = 10.5338
κ = 1.1144
A4 = −4.7460E−05
A6 = −5.7358E−07
A8 = 4.5188E−09
A10 = −1.2043E−10

Surface Number: 21

R = −20.5989
κ = −2.1097
A4 = −1.1711E−04
A6 = −7.4538E−07
A8 = 9.1645E−09
A10 = −8.6943E−11

Surface Number: 23

R = −29.2315
κ = −1.4131
A4 = 1.4997E−04
A6 = 3.4591E−07
A8 = −1.3285E−08
A10 = 1.1071E−10

(Variable Distances)

|  | W | M1 | M2 | T |
|---|---|---|---|---|
| f = | 10.5100 | 16.5000 | 41.0000 | 107.0901 |
| d5 = | 1.3000 | 7.0203 | 21.7084 | 34.3815 |
| d13 = | 18.3381 | 12.3410 | 5.9452 | 1.3000 |
| d21 = | 4.0000 | 3.0748 | 1.7579 | 0.5000 |
| d28 = | 15.8766 | 21.9466 | 35.0784 | 48.3185 |
| Bf = | 0.5000 | 0.5000 | 0.5000 | 0.5001 |

TABLE 3-continued (Values for Conditional Expressions)

fw = 10.5100
f1 = 64.0667
f2 = −9.0945
f3 = 41.2846
f4 = 21.9579
r3F = 80.4259
(1) r3R = −12.1903
(2) (r3R + r3F)/(r3R − r3F) = −0.7368
(3) fw/f3 = 0.2546
(4) f1/(−f2) = 7.0446
(5) f3/f4 = 1.8802
(6) f1/f3 = 1.5518

Figure 7A:
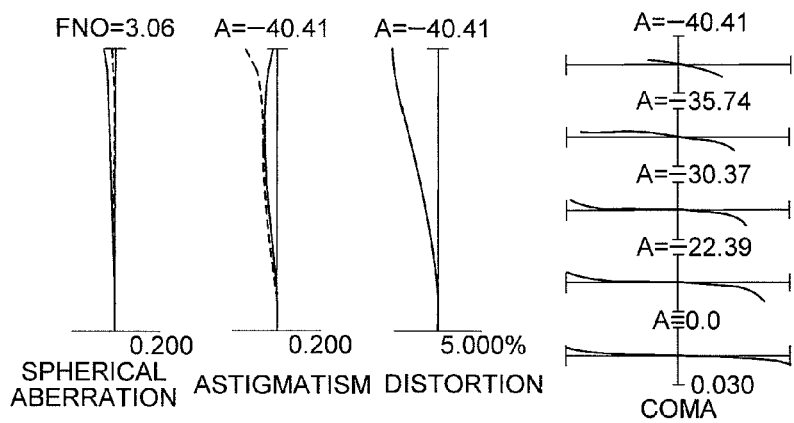
Figure 7B:
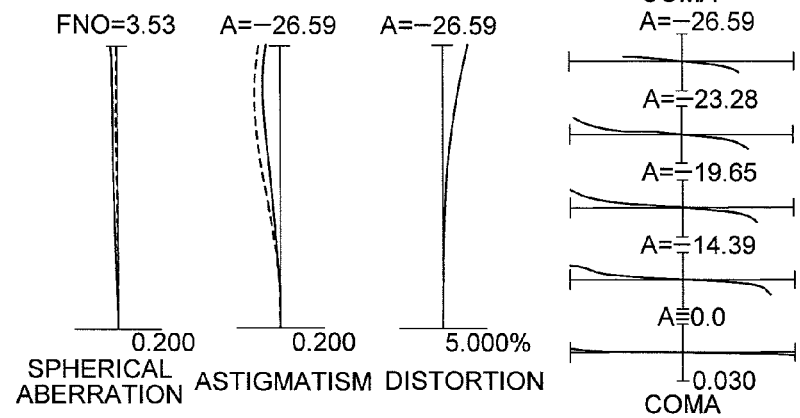
Figure 7C:
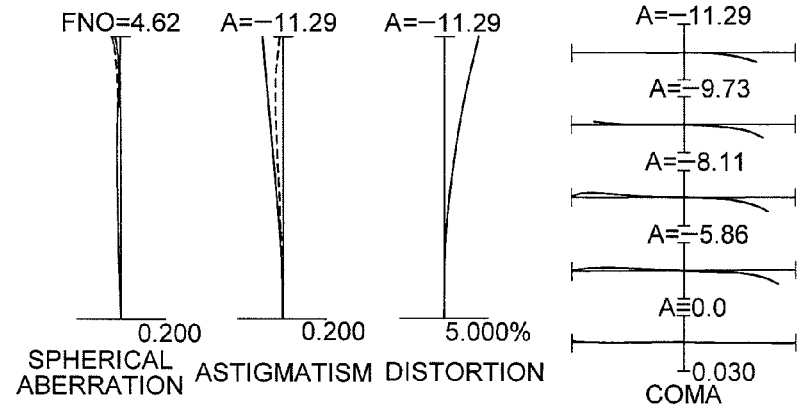
Figure 7D:
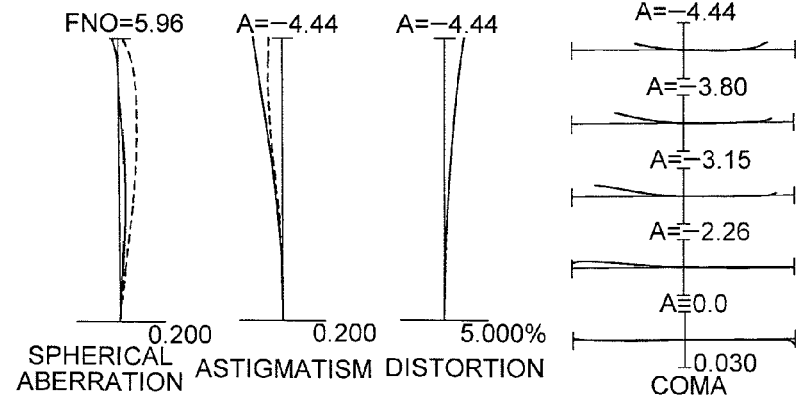

FIGS. 7A, 7B, 7C and 7D are graphs showing various aberrations of the zoom lens ZL3 according to Example 3 of the first embodiment at d-line ($\lambda$=587.6 nm) upon focusing on infinity, in which FIG. 7A shows a wide-angle end state (f=10.51 mm) W, FIG. 7B shows an intermediate focal length state 1 (f=16.50 mm) M1, FIG. 7C shows an intermediate focal length state 2 (f=41.00 mm) M2, and FIG. 7D shows a telephoto end state (f=107.09 mm) T. As is apparent from the respective graphs, the zoom lens system according to Example 3 shows superb optical performance as a result of good corrections to various aberrations in each focal length state from the wide-angle end state through the telephoto end state.

EXAMPLE 4

Figure 8:
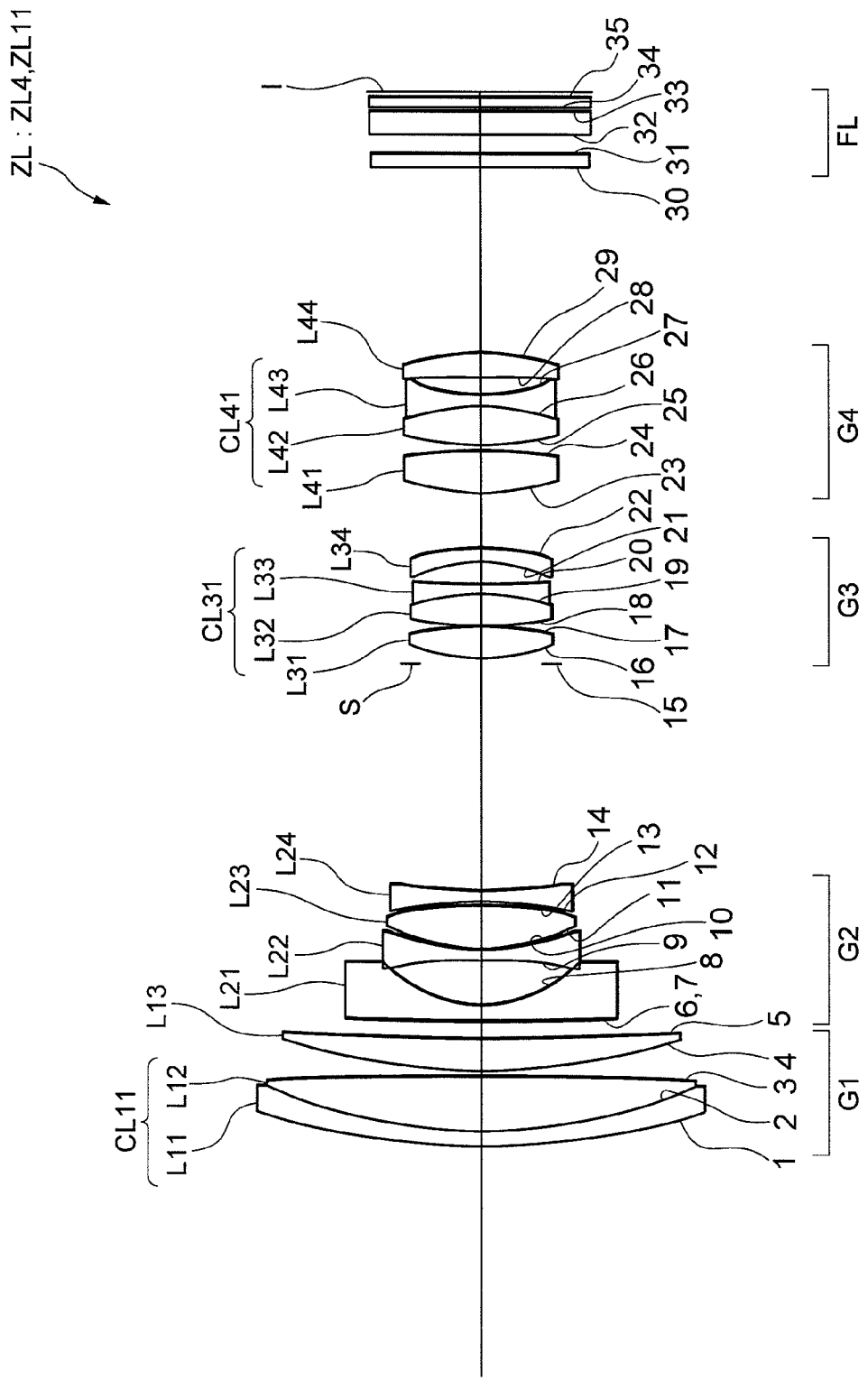
FIG. 8 is a sectional view showing a lens configuration of a zoom lens according to Example 4 of the first embodiment, and Example 11 of the second embodiment.

FIG. 8 is a sectional view showing a lens configuration of a zoom lens ZL4 according to Example 4 of the first embodiment. In the zoom lens ZL4 according to Example 4 of the first embodiment, the first lens group G1 is composed of, in order from the object side, a cemented positive lens CL11 constructed by a negative meniscus lens L11 having a convex surface facing the object side cemented with a double convex lens L12, and a positive meniscus lens L13 having a convex surface facing the object side. The second lens group G2 is composed of, in order from the object side, a negative meniscus lens L21 having a convex surface facing the object side and an aspherical surface formed on the object side, a double concave lens L22, a double convex lens L23, and a double concave lens L24. The third lens group G3 is composed of, in order from the object side, a double convex lens L31, a cemented negative lens CL31 constructed by a double convex lens L32 cemented with a double concave lens L33, and a negative meniscus lens L34 having a concave surface facing the object side and an aspherical surface formed on the image side. The fourth lens group G4 is composed of, in order from the object side, a double convex lens L41 having an aspherical surface formed on the image side, a cemented negative lens CL41 constructed by a double convex lens L42 cemented with a double concave lens L43, and a positive meniscus lens L44 having a convex surface facing the image side.

Various values associated with the zoom lens ZL4 according to Example 4 are listed in Table 4. In Example 4, each of lens surfaces 6, 22, and 24 is formed with an aspherical surface. In Example 4, a distance d5 between the first lens group G1 and the second lens group G2, a distance d14 between the second lens group G2 and the third lens group G3, a distance d22 between the third lens group G3 and the fourth lens group G4, and a distance d29 between the fourth lens group G4 and the filter group FL are varied upon zooming.

TABLE 4

(Specifications)

|       | W     | M1    | M2    | T      |
|-------|-------|-------|-------|--------|
| f =   | 10.51 | 26.50 | 70.00 | 107.09 |
| FNO = | 3.09  | 4.29  | 5.46  | 5.91   |
| 2ω =  | 80.75 | 34.44 | 13.42 | 8.84   |
| Bf =  | 19.57 | 33.96 | 46.90 | 51.53  |
| TL =  | 83.02 | 96.82 | 121.42| 129.28 |
| Y =   | 8.50  | 8.50  | 8.50  | 8.50   |

(Lens Data)

| i   | r          | d    | nd      | νd    |
|-----|------------|------|---------|-------|
| 1   | 62.9234    | 1.20 | 1.84666 | 23.78 |
| 2   | 41.4487    | 4.30 | 1.49700 | 81.54 |
| 3   | −1095.0606 | 0.50 |         |       |
| 4   | 50.3782    | 2.65 | 1.64000 | 60.08 |
| 5   | 210.9338   | (d5) |         |       |
| *6  | 250.0000   | 0.15 | 1.55389 | 38.09 |
| 7   | 220.8785   | 1.20 | 1.81600 | 46.62 |
| 8   | 10.5756    | 3.58 |         |       |
| 9   | −42.1978   | 0.85 | 1.81600 | 46.62 |
| 10  | 19.2084    | 0.10 |         |       |
| 11  | 16.8043    | 3.45 | 1.84666 | 23.78 |
| 12  | −32.5573   | 0.30 |         |       |
| 13  | −32.6346   | 0.85 | 1.75500 | 52.32 |
| 14  | 47.6411    | (d14)|         |       |
| 15  | 0.0000     | 0.50 | Aperture Stop S |  |
| 16  | 16.3033    | 2.45 | 1.60311 | 60.64 |
| 17  | −31.1607   | 0.10 |         |       |
| 18  | 33.1851    | 2.45 | 1.49700 | 81.54 |
| 19  | −15.5536   | 0.80 | 1.88300 | 40.76 |
| 20  | 325.4851   | 1.55 |         |       |
| 21  | −14.2228   | 1.00 | 1.80139 | 45.45 |
| *22 | −30.6056   | (d22)|         |       |
| 23  | 16.2509    | 3.50 | 1.61881 | 63.85 |
| *24 | −36.1517   | 0.50 |         |       |
| 25  | 21.4327    | 3.00 | 1.60300 | 65.44 |
| 26  | −20.2471   | 0.90 | 1.77250 | 49.60 |
| 27  | 13.6451    | 1.30 |         |       |
| 28  | −169.7512  | 2.00 | 1.48749 | 70.23 |
| 29  | −20.6001   | (d29)|         |       |
| 30  | 0.0000     | 1.00 | 1.51680 | 64.12 |
| 31  | 0.0000     | 1.50 |         |       |
| 32  | 0.0000     | 1.87 | 1.51680 | 64.12 |
| 33  | 0.0000     | 0.40 |         |       |
| 34  | 0.0000     | 0.70 | 1.51680 | 64.12 |
| 35  | 0.0000     | (Bf) |         |       |

(Aspherical Surface Data)

Surface Number: 6

R = 11.7888
κ = 11.0000
A4 = 1.3146E−05
A6 = −1.0696E−07
A8 = 1.6163E−10
A10 = 1.3273E−14

Surface Number: 22

R = −30.6056
κ = −0.5287
A4 = −9.7684E−05
A6 = −7.5194E−07
A8 = 1.0715E−08
A10 = −8.3651E−11

Surface Number: 24

R = −36.1517
κ = 11.0000
A4 = 2.0568E−04
A6 = 4.2479E−07
A8 = −1.2045E−08
A10 = 1.0677E−10

TABLE 4-continued (Variable Distances)

|  | W | M1 | M2 | T |
|---|---|---|---|---|
| f = | 10.5100 | 26.5022 | 69.9999 | 107.0898 |
| d5 = | 1.3000 | 12.8162 | 30.2193 | 35.9709 |
| d14 = | 18.4655 | 8.0479 | 3.3238 | 1.3000 |
| d22 = | 4.5056 | 2.8181 | 1.7954 | 1.3000 |
| d29 = | 14.8166 | 29.2033 | 42.1507 | 46.7791 |
| Bf = | 0.5000 | 0.5000 | 0.4999 | 0.4999 |

(Values for Conditional Expressions)

fw = 10.5100
f1 = 66.4840
f2 = −9.3184
f3 = 40.7867
f4 = 21.9953
r3F = 325.4851
(1) r3R = −14.2228
(2) (r3R + r3F)/(r3R − r3F) = −0.9163
(3) fw/f3 = 0.2577
(4) f1/(−f2) = 7.1347
(5) f3/f4 = 1.8544
(6) f1/f3 = 1.6300

Figure 9:
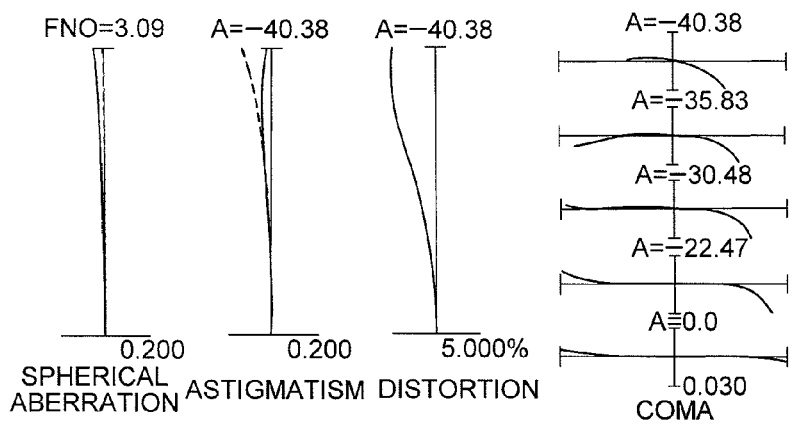

FIGS. 9A, 9B, 9C and 9D are graphs showing various aberrations of the zoom lens ZL4 according to Example 4 of the first embodiment at d-line (λ=587.6 nm) upon focusing on infinity, in which FIG. 9A shows a wide-angle end state (f=10.51 mm) W, FIG. 9B shows an intermediate focal length state 1 (f=26.50 mm) M1, FIG. 9C shows an intermediate focal length state 2 (f=70.00 mm) M2, and FIG. 9D shows a telephoto end state (f=107.09 mm) T. As is apparent from the respective graphs, the zoom lens system according to Example 4 shows superb optical performance as a result of good corrections to various aberrations in each focal length state from the wide-angle end state through the telephoto end state.

EXAMPLE 5

Figure 10:
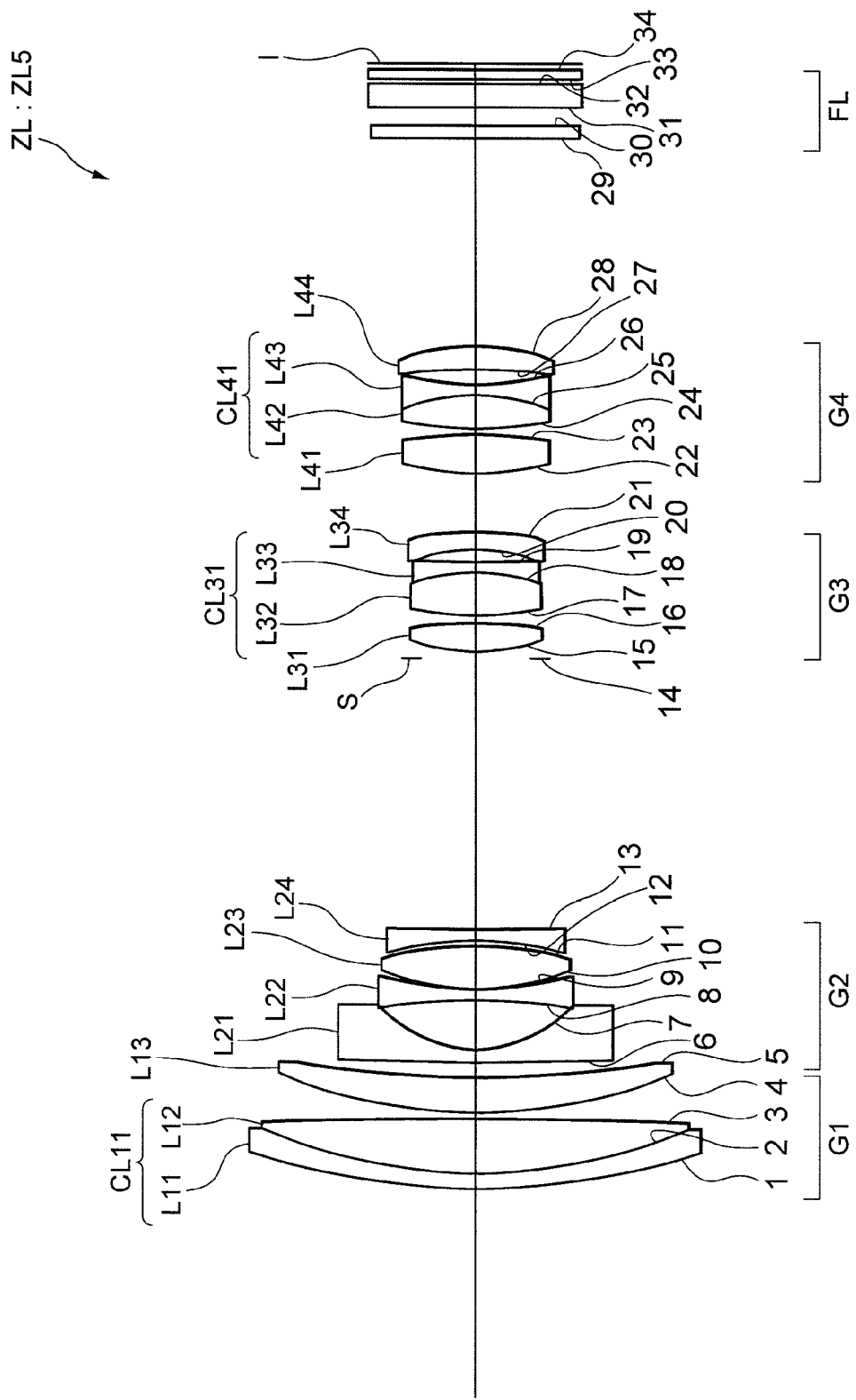
FIG. 10 is a sectional view showing a lens configuration of a zoom lens according to Example 5 of the first embodiment.

FIG. 10 is a sectional view showing a lens configuration of a zoom lens ZL5 according to Example 5 of the first embodiment. In the zoom lens ZL5 according to Example 5 of the first embodiment, the first lens group G1 is composed of, in order from the object side, a cemented positive lens CL11 constructed by a negative meniscus lens L11 having a convex surface facing the object side cemented with a double convex lens L12, and a positive meniscus lens L13 having a convex surface facing the object side. The second lens group G2 is composed of, in order from the object side, a negative meniscus lens L21 having a convex surface facing the object side and an aspherical surface formed on the image side, a double concave lens L22, a double convex lens L23, and a double concave lens L24. The third lens group G3 is composed of, in order from the object side, a double convex lens L31, a cemented negative lens CL31 constructed by a double convex L32 cemented with a double concave lens L33, and a negative meniscus lens L34 having a concave surface facing the object side and an aspherical surface formed on the image side. The fourth lens group G4 is composed of, in order from the object side, a double convex lens L41 having an aspherical surface formed on the image side, a cemented negative lens CL41 constructed by a double convex lens L42 cemented with a double concave lens L43, and a positive meniscus lens L44 having a convex surface facing the image side.

Various values associated with the zoom lens ZL5 according to Example 5 are listed in Table 5. In Example 5, each of lens surfaces 7, 21, and 23 is formed with an aspherical surface. In Example 5, a distance d5 between the first lens group G1 and the second lens group G2, a distance d13 between the second lens group G2 and the third lens group G3, a distance d21 between the third lens group G3 and the fourth lens group G4, and a distance d28 between the fourth lens group G4 and the filter group FL are varied upon zooming.

TABLE 5

(Specifications)

|  | W | M1 | M2 | T |
|---|---|---|---|---|
| f = | 10.51 | 42.67 | 74.88 | 107.09 |
| FNO = | 3.51 | 5.14 | 5.59 | 5.87 |
| 2ω = | 80.87 | 21.92 | 12.69 | 8.92 |
| Bf = | 21.43 | 40.89 | 45.83 | 48.73 |
| TL = | 89.16 | 113.36 | 124.00 | 128.55 |
| Y = | 8.50 | 8.50 | 8.50 | 8.50 |

(Lens Data)

| i | r | d | nd | νd |
|---|---|---|---|---|
| 1 | 60.6424 | 1.20 | 1.92286 | 20.88 |
| 2 | 44.2044 | 4.32 | 1.49700 | 81.54 |
| 3 | −515.1939 | 0.50 | | |
| 4 | 42.0272 | 2.89 | 1.64000 | 60.08 |
| 5 | 95.3411 | (d5) | | |
| 6 | 485.6443 | 1.00 | 1.80139 | 45.45 |
| *7 | 9.9481 | 4.00 | | |
| 8 | −51.2325 | 0.85 | 1.81600 | 46.62 |
| 9 | 26.3336 | 0.10 | | |
| 10 | 19.8742 | 3.40 | 1.80810 | 22.76 |
| 11 | −31.3904 | 0.45 | | |
| 12 | −26.2951 | 0.85 | 1.77250 | 49.60 |
| 13 | 138.0483 | (d13) | | |
| 14 | 0.0000 | 0.50 | Aperture Stop S | |
| 15 | 16.4056 | 2.27 | 1.60311 | 60.64 |
| 16 | −39.0374 | 0.66 | | |
| 17 | 27.6953 | 3.50 | 1.49700 | 81.54 |
| 18 | −16.8310 | 0.80 | 1.88300 | 40.76 |
| 19 | 191.9955 | 1.04 | | |
| 20 | −14.2816 | 1.35 | 1.80610 | 40.73 |
| *21 | −32.6678 | (d21) | | |
| 22 | 23.6409 | 3.19 | 1.61881 | 63.85 |
| *23 | −27.5142 | 0.50 | | |
| 24 | 34.9735 | 2.69 | 1.60300 | 65.44 |
| 25 | −16.7294 | 0.80 | 1.77250 | 49.60 |
| 26 | 23.8867 | 1.24 | | |
| 27 | −49.9928 | 1.84 | 1.51633 | 64.14 |
| 28 | −18.8976 | (d28) | | |
| 29 | 0.0000 | 1.00 | 1.51680 | 64.12 |
| 30 | 0.0000 | 1.50 | | |
| 31 | 0.0000 | 1.87 | 1.51680 | 64.12 |
| 32 | 0.0000 | 0.40 | | |
| 33 | 0.0000 | 0.70 | 1.51680 | 64.12 |
| 34 | 0.0000 | (Bf) | | |

(Aspherical Surface Data)

Surface Number: 6

R = 9.9481
κ = 0.0827
A4 = 7.8703E−05
A6 = 1.0563E−07
A8 = 4.7955E−09
A10 = 1.4870E−12

Surface Number: 21

R = −32.6678
κ = −9.0000
A4 = −1.1582E−04
A6 = −6.8174E−07
A8 = 1.3450E−08
A10 = −1.5683E−10

TABLE 5-continued

Surface Number: 23

R = −27.5142
κ = −3.9670
A4 = 1.1423E−04
A6 = 6.9036E−07
A8 = −1.4970E−08
A10 = 1.5634E−10

(Variable Distances)

|  | W | M1 | M2 | T |
|---|---|---|---|---|
| f = | 10.5100 | 42.6701 | 74.8800 | 107.0900 |
| d5 = | 1.2000 | 23.2905 | 32.6418 | 36.9877 |
| d13 = | 21.9234 | 6.5711 | 3.4356 | 1.1000 |
| d21 = | 4.6689 | 2.6654 | 2.1652 | 1.7929 |
| d28 = | 16.6828 | 36.1442 | 41.0739 | 43.9859 |
| Bf = | 0.4983 | 0.4963 | 0.4987 | 0.4946 |

(Values for Conditional Expressions)

fw = 10.5100
f1 = 66.0690
f2 = −9.8826
f3 = 39.7119
f4 = 24.0113
r3F = 191.9955
(1) r3R = −14.2816
(2) (r3R + r3F)/(r3R − r3F) = −0.8615
(3) fw/f3 = 0.2647
(4) f1/(−f2) = 6.6854
(5) f3/f4 = 1.6539
(6) f1/f3 = 1.6637

FIGS. 11A, 11B, 11C and 11D are graphs showing various aberrations of the zoom lens ZL5 according to Example 5 of the first embodiment at d-line (λ=587.6 nm) upon focusing on infinity, in which FIG. 11A shows a wide-angle end state (f=10.51 mm) W, FIG. 11B shows an intermediate focal length state 1 (f=42.67 mm) M1, FIG. 11C shows an intermediate focal length state 2 (f=74.88 mm) M2, and FIG. 11D shows a telephoto end state (f=107.09 mm) T. As is apparent from the respective graphs, the zoom lens system according to Example 5 shows superb optical performance as a result of good corrections to various aberrations in each focal length state from the wide-angle end state through the telephoto end state.

EXAMPLE 6

Figure 12:
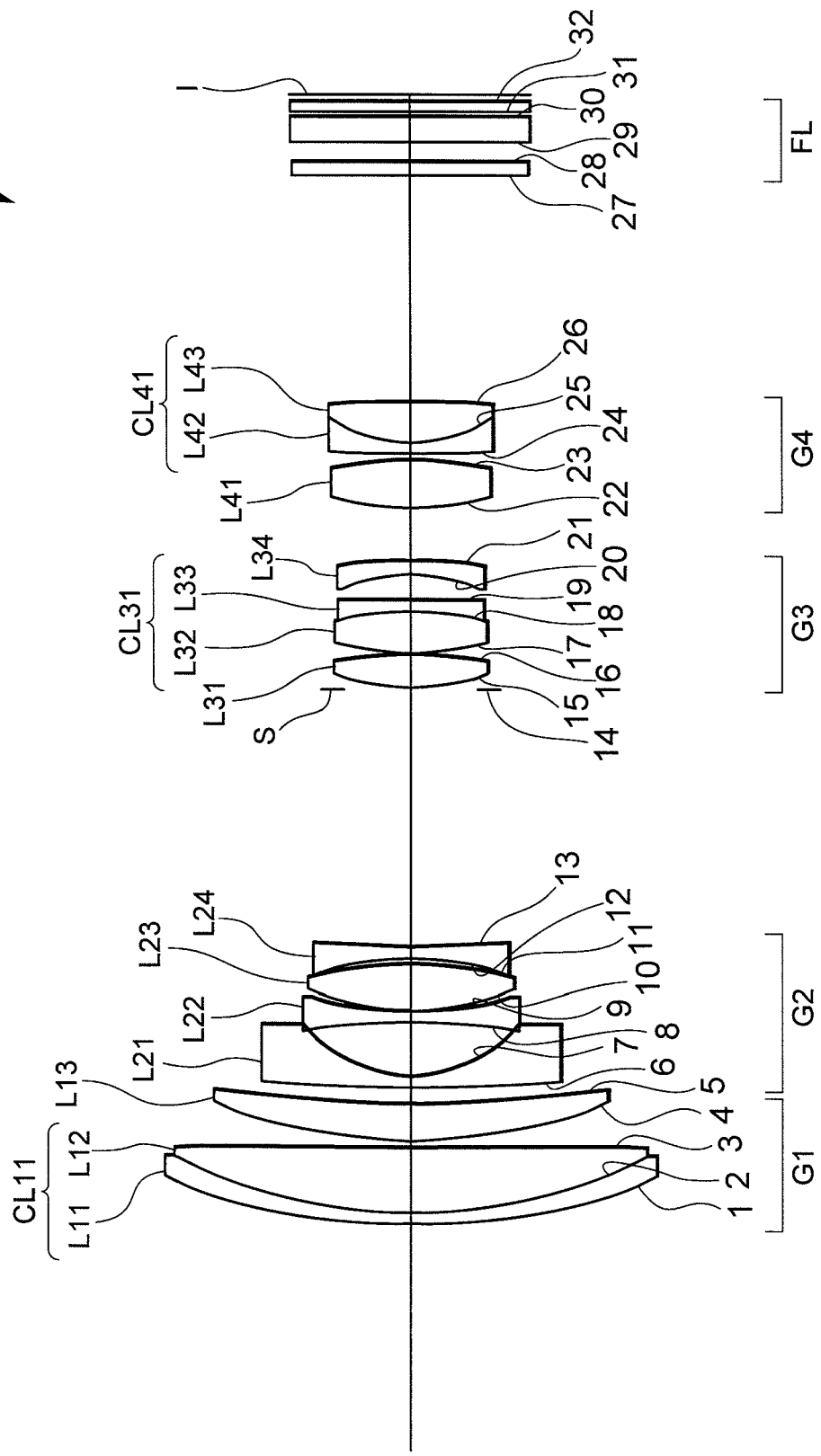
FIG. 12 is a sectional view showing a lens configuration of a zoom lens according to Example 6 of the first embodiment, and Example 14 of the second embodiment.

FIG. 12 is a sectional view showing a lens configuration of a zoom lens ZL6 according to Example 6 of the first embodiment. In the zoom lens ZL6 according to Example 6 of the first embodiment, the first lens group G1 is composed of, in order from the object side, a cemented positive lens CL11 constructed by a negative meniscus lens L11 having a convex surface facing the object side cemented with a positive meniscus lens L12 having a concave surface facing the image side, and a positive meniscus lens L13 having a convex surface facing the object side. The second lens group G2 is composed of, in order from the object side, a negative meniscus lens L21 having a convex surface facing the object side and an aspherical surface formed on the image side, a double concave lens L22, a double convex lens L23, and a double concave lens L24. The third lens group G3 is composed of, in order from the object side, a double convex lens L31, a cemented negative lens CL31 constructed by a double convex lens L32 cemented with a double concave lens L33, and a negative meniscus lens L34 having a concave surface facing the object side and an aspherical surface formed on the image side. The fourth lens group G4 is composed of, in order from the object side, a double convex lens L41 having an aspherical surface formed on the image side, and a cemented negative lens CL41 constructed by a negative meniscus lens L42 having a convex surface facing the object side cemented with a double convex lens L43.

Various values associated with the zoom lens ZL6 according to Example 6 are listed in Table 6. In Example 6, each of lens surfaces 7, 21, and 23 is formed with an aspherical surface. In Example 6, a distance d5 between the first lens group G1 and the second lens group G2, a distance d13 between the second lens group G2 and the third lens group G3, a distance d21 between the third lens group G3 and the fourth lens group G4, and a distance d26 between the fourth lens group G4 and the filter group FL are varied upon zooming.

TABLE 6

(Specifications)

|  | W | M1 | M2 | T |
|---|---|---|---|---|
| f = | 10.46 | 16.10 | 37.76 | 109.66 |
| FNO = | 3.05 | 3.50 | 4.82 | 5.99 |
| 2ω = | 81.15 | 55.01 | 24.91 | 8.76 |
| Bf = | 21.44 | 27.29 | 43.33 | 56.58 |
| TL = | 82.30 | 86.37 | 104.31 | 127.78 |
| Y = | 8.50 | 8.50 | 8.50 | 8.50 |

(Lens Data)

| i | r | d | nd | νd |
|---|---|---|---|---|
| 1 | 52.4618 | 0.82 | 1.92286 | 20.88 |
| 2 | 39.5464 | 4.73 | 1.49700 | 81.54 |
| 3 | 5279.8040 | 0.50 | | |
| 4 | 39.0489 | 2.79 | 1.60300 | 65.44 |
| 5 | 101.4457 | (d5) | | |
| 6 | 242.8497 | 0.80 | 1.80139 | 45.45 |
| *7 | 9.6078 | 3.97 | | |
| 8 | −53.0915 | 0.80 | 1.81600 | 46.62 |
| 9 | 27.1207 | 0.10 | | |
| 10 | 19.2442 | 3.40 | 1.80810 | 22.76 |
| 11 | −28.4265 | 0.45 | | |
| 12 | −21.3643 | 0.80 | 1.75500 | 52.32 |
| 13 | 74.4746 | (d13) | | |
| 14 | 0.0000 | 0.10 | Aperture Stop S | |
| 15 | 18.3624 | 2.37 | 1.60300 | 65.44 |
| 16 | −34.3973 | 0.10 | | |
| 17 | 19.6723 | 3.20 | 1.51633 | 64.14 |
| 18 | −21.6943 | 0.80 | 1.85026 | 32.34 |
| 19 | 618.5341 | 1.93 | | |
| 20 | −13.1758 | 1.00 | 1.80139 | 45.45 |
| *21 | −60.8070 | (d21) | | |
| 22 | 22.8062 | 3.50 | 1.61881 | 63.85 |
| *23 | −22.1250 | 0.50 | | |
| 24 | 225.5495 | 0.80 | 1.77250 | 49.60 |
| 25 | 10.7683 | 2.93 | 1.60300 | 65.44 |
| 26 | −181.8838 | (d26) | | |
| 27 | 0.0000 | 1.00 | 1.51680 | 64.12 |
| 28 | 0.0000 | 1.50 | | |
| 29 | 0.0000 | 1.87 | 1.51680 | 64.12 |
| 30 | 0.0000 | 0.40 | | |
| 31 | 0.0000 | 0.70 | 1.51680 | 64.12 |
| 32 | 0.0000 | (Bf) | | |

(Aspherical Surface Data)

Surface Number: 6

R = 9.6078
κ = 0.9084
A4 = −2.8248E−05
A6 = −4.9541E−07
A8 = 4.7856E−09
A10 = −1.1480E−10

TABLE 6-continued

Surface Number: 21

R = −60.8070
κ = 7.5867
A4 = −1.2929E−04
A6 = −1.1174E−06
A8 = 1.2284E−08
A10 = −8.8483E−11

Surface Number: 23

R = −22.1250
κ = −5.6671
A4 = 1.1409E−04
A6 = 1.3392E−06
A8 = −1.5434E−08
A10 = 1.2476E−10

(Variable Distances)

|       | W       | M1      | M2      | T        |
|-------|---------|---------|---------|----------|
| f =   | 10.4606 | 16.1003 | 37.7622 | 109.6618 |
| d5 =  | 1.1999  | 6.2049  | 16.2467 | 32.2485  |
| d13 = | 19.2587 | 13.2288 | 6.1018  | 1.1000   |
| d21 = | 4.0000  | 3.2510  | 2.2402  | 1.4553   |
| d26 = | 16.6908 | 22.5374 | 38.5747 | 51.8268  |
| Bf =  | 0.4999  | 0.4961  | 0.4993  | 0.5025   |

(Values for Conditional Expressions)

fw = 10.4606
f1 = 61.6382
f2 = −9.0259
f3 = 33.0321
f4 = 22.0798
r3F = 618.5341
(1) r3R = −13.1758
(2) (r3R + r3F)/(r3R − r3F) = −0.9583
(3) fw/f3 = 0.3167
(4) f1/(−f2) = 6.8291
(5) f3/f4 = 1.4960
(6) f1/f3 = 1.8660

Figure 13A:
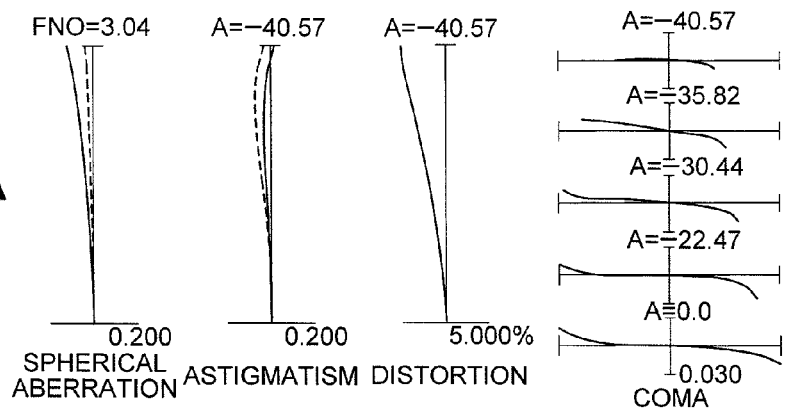
Figure 13B:
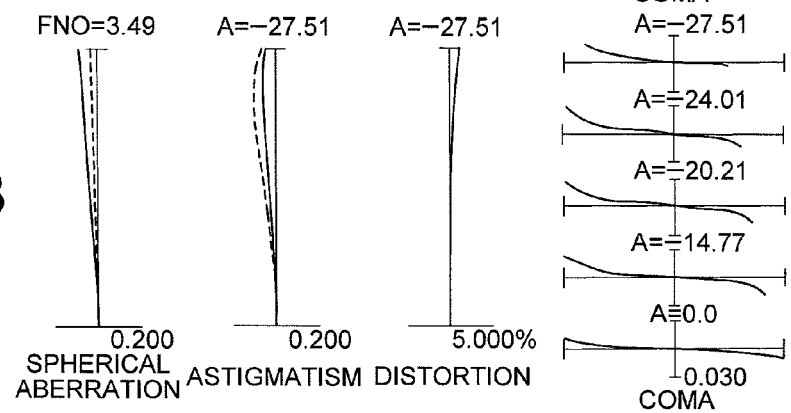
Figure 13C:
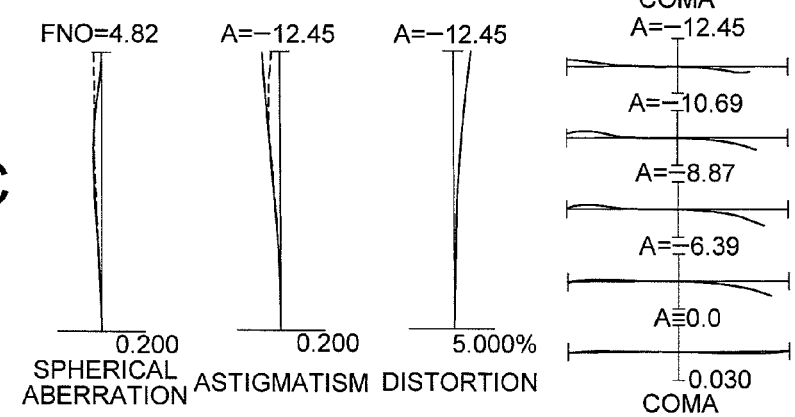
Figure 13D:
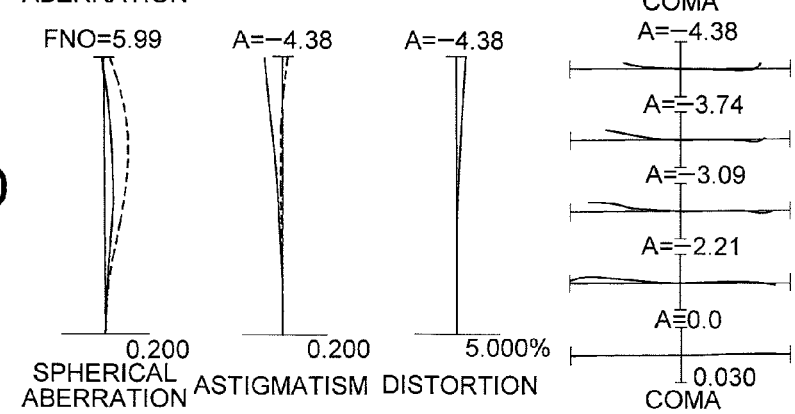

FIGS. 13A, 13B, 13C and 13D are graphs showing various aberrations of the zoom lens ZL6 according to Example 6 of the first embodiment at d-line (λ=587.6 nm) upon focusing on infinity, in which FIG. 13A shows a wide-angle end state (f=10.46 mm) W, FIG. 13B shows an intermediate focal length state 1 (f=16.10 mm) M1, FIG. 13C shows an intermediate focal length state 2 (f=37.76 mm) M2, and FIG. 13D shows a telephoto end state (f=109.66 mm) T. As is apparent from the respective graphs, the zoom lens system according to Example 6 shows superb optical performance as a result of good corrections to various aberrations in each focal length state from the wide-angle end state through the telephoto end state.

Second Embodiment

A second embodiment of the present application will be explained below with reference to accompanying drawings. As shown in FIG. 1, a zoom lens ZL is composed of, in order from an object side, a first lens group G1 having positive refractive power, a second lens group G2 having negative refractive power, a third lens group G3 having positive refractive power, and a fourth lens group G4 having positive refractive power. In the zoom lens ZL, upon zooming from a wide-angle end state, which gives the shortest focal length, to a telephoto end state, which gives the longest focal length, at least the first lens group G1 and the fourth lens group G4 are moved to the object side such that a distance between the first lens group G1 and the second lens group G2 increases, a distance between the second lens group G2 and the third lens group G3 decreases, and a distance between the third lens group G3 and the fourth lens group G4 decreases. With this configuration, the zoom lens ZL makes it possible to obtain excellent optical performance with having a wide angle of view and a high zoom ratio.

Then, the function of each lens group is explained. The first lens group G1 has a function of converging light rays, and is disposed near to the image as much as possible in the wide-angle end state, so that off-axis rays pass the lens group away from the optical axis, so that the diameter of the first lens group can be small. On the other hand, in the telephoto end state, the first lens group is moved to the object side so as to increase a distance to the second lens group, so that converging effect is enhanced to shorten the total lens length.

The second lens group G2 has an effect for expanding an image of the object formed by the first lens group G1, upon zooming from the wide-angle end state to the telephoto end state, the rate of expansion is enhanced by increasing the distance between the first lens group G1 and the second lens group G2 so as to vary the focal length.

The third lens group G3 has an effect for converging the light rays diverged by the second lens group G2. In order to accomplish excellent optical performance, it is preferable that the third lens group G3 is composed of a plurality of lens groups.

The fourth lens group G4 has an effect for further converging light rays converged by the third lens group G3. With actively varying the distance between the third lens group G3 and the fourth lens group G4 upon zooming, variation in the image plane upon zooming can be suppressed.

In the zoom lens ZL, the following conditional expression (7) is preferably satisfied:

$$0.170 < (-f2)/f3 < 0.365 \quad (7)$$

where f2 denotes a focal length of the second lens group G2, and f3 denotes a focal length of the third lens group G3.

Conditional expression (7) defines an appropriate range of the ratio of the focal length of the second lens group G2 to the focal length of the third lens group G3. When the ratio (−f2)/f3 is equal to or exceeds the upper limit of conditional expression (7), refractive power of the second lens group G2 becomes relatively weak, so that the second lens group G2 cannot effectively contribute to zooming. Moreover, correction of coma and curvature of field generated solely in the second lens group G2 becomes insufficient, so that it is undesirable. Furthermore, refractive power of the third lens group G3 becomes relatively strong, generation of spherical aberration and coma cannot be suppressed, so that high optical performance cannot be obtained. In order to secure the effect of the present application, it is preferable to set the upper limit of conditional expression (7) to 0.350. In order to further secure the effect of the present application, it is most preferable to set the upper limit of conditional expression (7) to 0.340. On the other hand, when the ratio (−f2)/f3 is equal to or falls below the lower limit of conditional expression (7), refractive power of the second lens group G2 becomes relatively strong, correction of coma in the wide-angle state becomes excessive. Moreover, refractive power of the third lens group G3 becomes relatively weak, so that it becomes difficult to correct spherical aberration and coma generated solely in the third lens group G3. Accordingly, it is undesirable. In order to secure the effect of the present application, it is preferable to set the lower limit of conditional expression (7) to 0.140. In order to further secure the effect of the present application, it is greatly preferable to set the lower limit of conditional expression (7) to 0.170. In order to still further secure the effect of the present application, it is most preferable to set the lower limit of conditional expression (7) to 0.200.

In the zoom lens ZL, in order to accomplish higher optical performance, the third lens group G3 is preferably constructed in the following manner. In order to excellently correct on-axis aberrations generated solely in the third lens group G3, it is preferable that the third lens group G3 is composed of, in order from the object side, a positive lens L31, a cemented lens CL31 constructed by a positive lens L32 cemented with a negative lens L33, and a negative lens L34. In this instance, it is preferable that an aperture stop S is disposed between the second lens group G2 and the third lens group G3, and moved in a body with the third lens group G3 upon zooming from the wide-angle end state to the telephoto end state.

In the zoom lens ZL, in order to accomplish higher optical performance, the third lens group G3 is preferably constructed in the following manner. In order to excellently correct on-axis aberrations generated solely in the third lens group G3, it is preferable that, the positive lens L31 in the third lens group G3 has a convex surface facing the object side, the positive lens L32 in the cemented lens CL31 has a convex surface facing the object side and cemented with the negative lens L33 having a concave surface facing the image side, and the negative lens L34 is a negative meniscus lens and has a convex surface facing the image side.

In the zoom lens ZL, the following conditional expression (3) is preferable satisfied:

$$0.10 < fw/f3 < 0.50 \quad (3)$$

where fw denotes a focal length of the zoom lens in the wide-angle end state, and f3 denotes a focal length of the third lens group G3.

Conditional expression (3) defines the focal length of the third lens group G3. When the ratio fw/f3 is equal to or exceeds the upper limit of conditional expression (3), refractive power of the third lens group G3 becomes strong, and spherical aberration generated solely in the third lens group G3 increases, so that it is undesirable. In order to secure the effect of the present application, it is preferable to set the upper limit of conditional expression (3) to 0.47. In order to further secure the effect of the present application, it is greatly preferable to set the upper limit of conditional expression (3) to 0.44. In order to still further secure the effect of the present application, it is most preferable to set the upper limit of conditional expression (3) to 0.40. On the other hand, when the ratio fw/f3 is equal to or falls below the lower limit of conditional expression (3), refractive power of the third lens group G3 becomes weak, and coma and curvature of field increase, so that it is undesirable. In order to secure the effect of the present application, it is preferable to set the lower limit of conditional expression (3) to 0.13. In order to further secure the effect of the present application, it is greatly preferable to set the lower limit of conditional expression (3) to 0.16. In order to still further secure the effect of the present application, it is most preferable to set the lower limit of conditional expression (3) to 0.20.

In the zoom lens ZL, the following conditional expression (4) is preferably satisfied:

$$6.00 < f1/(-f2) < 7.80 \quad (4)$$

where f1 denotes a focal length of the first lens group G1, and f2 denotes a focal length of the second lens group G2.

Conditional expression (4) defines an appropriate range of a ratio of the focal length of the first lens group G1 to the focal length of the second lens group G2. However, conditional expression (4) has already explained above, so that duplicated explanations are omitted.

In the zoom lens ZL, in order to accomplish higher optical performance, it is preferable that the third lens group G3 is composed of in the following manner. The cemented lens CL31 constructed by the positive lens L32 having the convex surface facing the object side cemented with the negative lens L33 having the concave surface facing the image side in the third lens group G3 has negative refractive power. With disposing negative refractive power in this manner, refractive power distribution in the third lens group G3 becomes proper, so that spherical aberration and curvature of field generated solely in the third lens group can be excellently corrected.

In the zoom lens ZL, the third lens group G3 preferably includes at least one aspherical lens. With disposing an aspherical lens in the third lens group G3, it becomes possible to excellently correct coma and curvature of field generated solely in the third lens group G3.

In the zoom lens ZL, in order to balance further higher optical performance with downsizing, it is preferable that the image side lens surface of the negative lens L34 disposed to the image side of the cemented lens CL31 in the third lens group G3 is formed as an aspherical surface. With this configuration, it becomes possible to excellently correct spherical aberration and curvature of field.

In the zoom lens ZL, the following conditional expression (5) is preferably satisfied:

$$0.15 < f3/f4 < 2.75 \quad (5)$$

where f3 denotes a focal length of the third lens group G3, and f4 denotes a focal length of the fourth lens group G4.

Conditional expression (5) defines an appropriate range of the ratio of the focal length of the third lens group G3 to the focal length of the fourth lens group G4. However, conditional expression (5) has already explained above, so that duplicated explanations are omitted.

In the zoom lens ZL, the following conditional expression (6) is preferably satisfied:

$$0.85 < f1/f3 < 2.74 \quad (6)$$

where f1 denotes a focal length of the first lens group G1, and f3 denotes a focal length of the third lens group G3.

Conditional expression (6) defines an appropriate range of the ratio of the focal length of the first lens group G1 to the focal length of the third lens group G3. However, conditional expression (6) has already explained above, so that duplicated explanations are omitted.

Figure 21:
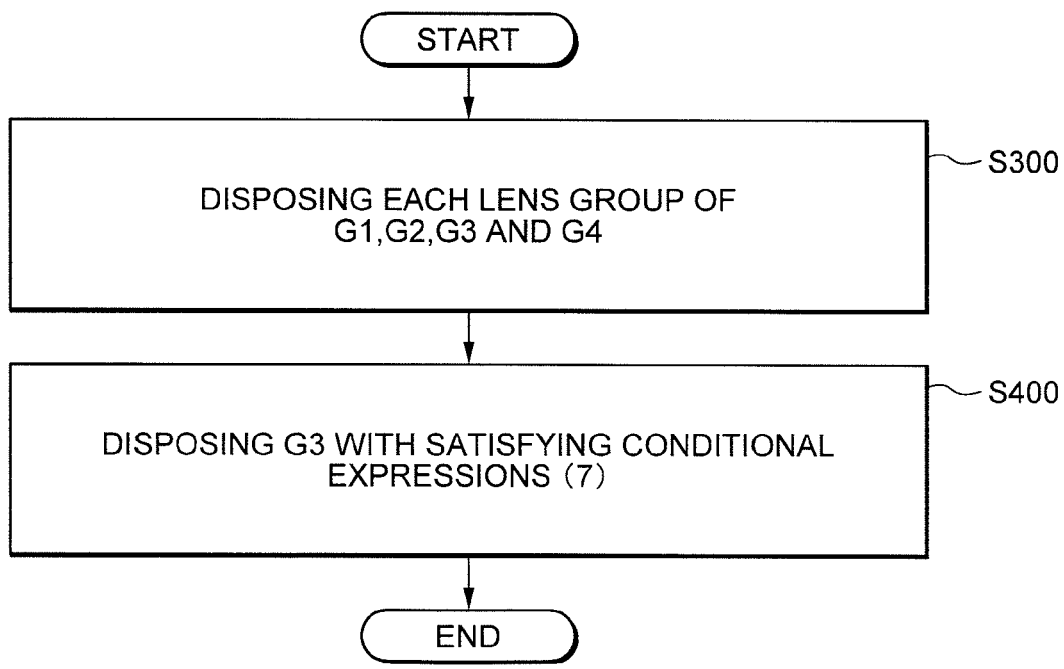
FIG. 21 is a flowchart schematically explaining a method for manufacturing the zoom lens according to the second embodiment of the present application.

Then, an outline of a method for manufacturing a zoom lens ZL according to the second embodiment is explained below with reference to FIG. 21. At first, each lens group is prepared with disposing each lens (Step S300). In particular, in the first embodiment, the first lens group G1 is prepared by disposing, in order from an object side, a cemented positive lens CL11 constructed by a negative meniscus lens L11 having a convex surface facing the object side cemented with a positive meniscus lens L12 having a concave surface facing the image side, and a positive meniscus lens L13 having a convex surface facing the object side. The second lens group G2 is prepared by disposing, in order from the object side, a negative meniscus lens L21 having a convex surface facing the object side and an aspherical surface formed on the image side, a double concave lens L22, a double convex lens L23, and a negative meniscus lens L24 having a concave surface facing the object side. The third lens group G3 is prepared by disposing, in order from the object side, a double convex lens L31, a cemented negative lens CL31 constructed by a double convex lens L32 cemented with a double concave lens L33, and a negative meniscus lens L34 having a concave surface facing the object side and an aspherical surface formed on the image side. The fourth lens group G4 is prepared by disposing, in order from the object side, a double convex lens L41 having an aspherical surface formed on the image side, a cemented negative lens CL41 constructed by a double convex lens L42 cemented with a double concave lens L43, and a double convex lens L44.

On this occasion, the third lens group G3 is disposed so that the third lens group G3 may satisfy the following conditional expression (7) (Step S400):

$$0.170 < (-f2)/f3 < 0.365 \quad (7)$$

where f2 denotes a focal length of the second lens group G2, and f3 denotes a focal length of the third lens group G3.

Each example according to the second embodiment of the present application is explained with reference to accompanying drawings. FIG. 1 is a view showing refractive power distribution of a zoom lens ZL according to each example of the second embodiment of the present application and movement of each lens group upon zooming from a wide-angle end state (W) to a telephoto end state (T). Incidentally, FIGS. 2, 4, 14, 6, 8, 16, 18 and 12 are sectional views showing respective constructions of zoom lenses ZL7 through ZL14. As shown in respective drawings, each of the zoom lenses ZL7 through ZL14 is composed of, in order from an object side, a first lens group G1 having positive refractive power, a second lens group G2 having negative refractive power, a third lens group G3 having positive refractive power, a fourth lens group G4 having positive refractive power, and a filter group FL. Upon varying a focal length, in other words, zooming from the wide-angle end state to the telephoto end state, the first lens group G1 is moved with respect to an image plane and the first lens group G1, the third lens group G3 and the fourth lens group G4 are moved to the object side, and the second lens group G2 is moved such that a distance between the first lens group G1 and the second lens group G2 varies, a distance between the second lens group G2 and the third lens group G3 decreases, and a distance between the third lens group G3 and the fourth lens group G4 decreases. Here, the filter group FL is composed of a low-pass filter, an infrared blocking filter, and the like. The image plane I is formed on an unillustrated imaging device such as a film, a CCD, a DMOS, and the like.

An aperture stop S is disposed to the most object side of the third lens group G3 and moved in a body with the third lens group G3 upon zooming from the wide-angle end state to the telephoto end state.

EXAMPLE 7

FIG. 2 is a sectional view showing a lens configuration of a zoom lens ZL1 according to Example 7 of the second embodiment. In the zoom lens ZL7 according to Example 7 of the second embodiment, the first lens group G1 is composed of, in order from the object side, a cemented positive lens CL11 constructed by a negative meniscus lens L11 having a convex surface facing the object side cemented with a positive meniscus lens L12 having a concave surface facing the image side, and a positive meniscus lens L13 having a convex surface facing the object side. The second lens group G2 is composed of, in order from the object side, a negative meniscus lens L21 having a convex surface facing the object side and an aspherical surface formed on the image side, a double concave lens L22, a double convex lens L23, and a negative meniscus lens L24 having a concave surface facing the object side. The third lens group G3 is composed of, in order from the object side, a double convex lens L31, a cemented negative lens CL31 constructed by a double convex L32 cemented with a double concave lens L33, and a negative meniscus lens L34 having a concave surface facing the object side and an aspherical surface formed on the image side. The fourth lens group G4 is composed of, in order from the object side, a double convex lens L41 having an aspherical surface formed on the image side, a cemented negative lens CL41 constructed by a double convex lens L42 cemented with a double concave lens L43, and a double convex lens L44.

Various values associated with the zoom lens ZL7 according to Example 7 are listed in Table 7. In Example 7, each of lens surfaces 7, 21, and 23 is formed with an aspherical surface. In Example 7, a distance d5 between the first lens group G1 and the second lens group G2, a distance d13 between the second lens group G2 and the third lens group G3, a distance d21 between the third lens group G3 and the fourth lens group G4, and a distance d28 between the fourth lens group G4 and the filter group FL are varied upon zooming.

TABLE 7

| (Specifications) | | | | |
|---|---|---|---|---|
| | W | M1 | M2 | T |
| f = | 10.51 | 26.91 | 70.00 | 107.09 |
| FNO = | 3.41 | 4.56 | 5.60 | 5.92 |
| 2ω = | 80.74 | 34.10 | 13.57 | 8.93 |
| Bf = | 15.73 | 28.33 | 39.26 | 42.73 |
| TL = | 89.88 | 104.35 | 125.23 | 131.28 |

| (Lens Data) | | | | |
|---|---|---|---|---|
| i | r | d | nd | νd |
| 1 | 61.1581 | 1.20 | 1.84666 | 23.78 |
| 2 | 40.0620 | 5.60 | 1.49700 | 81.54 |
| 3 | 423.5882 | 0.50 | | |
| 4 | 46.1934 | 3.35 | 1.67790 | 55.34 |
| 5 | 182.2832 | (d5) | | |
| 6 | 61.2018 | 1.20 | 1.80139 | 45.46 |
| *7 | 9.3577 | 4.60 | | |
| 8 | −27.3674 | 0.85 | 1.78800 | 47.37 |
| 9 | 41.1686 | 0.30 | | |
| 10 | 22.0377 | 3.15 | 1.80810 | 22.76 |
| 11 | −32.1910 | 0.65 | | |
| 12 | −19.7165 | 0.85 | 1.75500 | 52.32 |
| 13 | −407.6339 | (d13) | | |
| 14 | 0.0000 | 0.50 | Aperture Stop S | |
| 15 | 14.8924 | 2.60 | 1.60300 | 65.44 |
| 16 | −40.4513 | 0.10 | | |
| 17 | 17.4716 | 3.45 | 1.49700 | 81.54 |
| 18 | −21.2482 | 1.45 | 1.88300 | 40.76 |
| 19 | 39.7309 | 1.75 | | |
| 20 | −17.0463 | 1.00 | 1.80139 | 45.46 |
| *21 | −51.3354 | (d21) | | |
| 22 | 18.2360 | 4.00 | 1.61881 | 63.86 |
| *23 | −34.0096 | 0.60 | | |
| 24 | 48.8072 | 3.00 | 1.60300 | 65.44 |
| 25 | −12.3504 | 1.20 | 1.75500 | 52.32 |
| 26 | 13.7843 | 2.00 | | |
| 27 | 16.9250 | 2.85 | 1.51680 | 64.12 |
| 28 | −87.6437 | (d28) | | |
| 29 | 0.0000 | 1.00 | 1.51680 | 64.12 |
| 30 | 0.0000 | 1.50 | | |
| 31 | 0.0000 | 1.87 | 1.51680 | 64.12 |
| 32 | 0.0000 | 0.40 | | |
| 33 | 0.0000 | 0.70 | 1.51680 | 64.12 |
| 34 | 0.0000 | (Bf) | | |

TABLE 7-continued (Aspherical Surface Data)

Surface Number: 7

R = 9.3577
κ = 1.0421
A4 = −2.9241E−05
A6 = −5.0127E−07
A8 = 8.6241E−09
A10 = −1.7709E−10

Surface Number: 21

R = −51.3354
κ = 11.0000
A4 = −4.3022E−05
A6 = −9.3099E−07
A8 = 1.0189E−08
A10 = −7.0307E−11

Surface Number: 23

R = −34.0096
κ = 11.0000
A4 = 2.1147E−04
A6 = 1.2036E−06
A8 = −1.5877E−08
A10 = 2.1370E−10

(Variable Distances)

|      | W       | M1      | M2      | T        |
|------|---------|---------|---------|----------|
| f =  | 10.5100 | 26.9148 | 69.9996 | 107.0852 |
| d5 = | 1.3000  | 15.9163 | 32.2603 | 37.7051  |
| d13 = | 23.2000 | 11.5316 | 5.5576  | 2.8000   |
| d21 = | 2.9000  | 1.8152  | 1.3998  | 1.3000   |
| d28 = | 10.9749 | 23.5797 | 34.5074 | 37.9749  |
| Bf = | 0.4999  | 0.4999  | 0.4999  | 0.5001   |

(Values for Conditional Expressions)

fw = 10.5100
f1 = 67.5093
f2 = −9.7136
f3 = 30.3374
f4 = 26.7735
(3) fw/f3 = 0.3464
(4) f1/(−f2) = 6.9500
(5) f3/f4 = 1.1331
(6) f1/f3 = 2.2253
(7) (−f2)/f3 = 0.3202

FIGS. 3A, 3B, 3C and 3D are graphs showing various aberrations of the zoom lens ZL7 according to Example 7 of the second embodiment at d-line (λ=587.6 nm) upon focusing on infinity, in which FIG. 3A shows a wide-angle end state (f=10.51 mm) W, FIG. 3B shows an intermediate focal length state 1 (f=26.91 mm) M1, FIG. 3C shows an intermediate focal length state 2 (f=70.00 mm) M2, and FIG. 3D shows a telephoto end state (f=107.09 mm) T. As is apparent from the respective graphs, the zoom lens system according to Example 7 shows superb optical performance as a result of good corrections to various aberrations in each focal length state from the wide-angle end state through the telephoto end state.

EXAMPLE 8

FIG. 4 is a sectional view showing a lens configuration of a zoom lens ZL8 according to Example 8 of the second embodiment. In the zoom lens ZL8 according to Example 8 of the second embodiment, the first lens group G1 is composed of, in order from the object side, a cemented positive lens CL11 constructed by a negative meniscus lens L11 having a convex surface facing the object side cemented with a positive meniscus lens L12 having a concave surface facing the image side, and a positive meniscus lens L13 having a convex surface facing the object side. The second lens group G2 is composed of, in order from the object side, a negative meniscus lens L21 having a convex surface facing the object side and an aspherical surface formed on the image side, a double concave lens L22, a double convex lens L23, and a double concave lens L24. The third lens group G3 is composed of, in order from the object side, a double convex lens L31, a cemented negative lens CL31 constructed by a double convex L32 cemented with a double concave lens L33, and a negative meniscus lens L34 having a concave surface facing the object side and an aspherical surface formed on the image side. The fourth lens group G4 is composed of, in order from the object side, a double convex lens L41 having an aspherical surface formed on the image side, a cemented negative lens CL41 constructed by a double convex lens L42 cemented with a double concave lens L43, and a double convex lens L44.

Various values associated with the zoom lens ZL8 according to Example 8 are listed in Table 8. In Example 8, each of lens surfaces 7, 21, and 23 is formed with an aspherical surface. In Example 8, a distance d5 between the first lens group G1 and the second lens group G2, a distance d13 between the second lens group G2 and the third lens group G3, a distance d21 between the third lens group G3 and the fourth lens group G4, and a distance d28 between the fourth lens group G4 and the filter group FL are varied upon zooming.

TABLE 8

(Specifications)

|       | W     | M1     | M2     | T      |
|-------|-------|--------|--------|--------|
| f =   | 10.51 | 26.88  | 70.00  | 107.09 |
| FNO = | 3.37  | 4.55   | 5.61   | 5.94   |
| 2ω =  | 80.65 | 34.11  | 13.52  | 8.89   |
| Bf =  | 15.56 | 28.56  | 39.54  | 43.01  |
| TL =  | 89.97 | 102.56 | 122.53 | 128.22 |
| Y =   | 8.50  | 8.50   | 8.50   | 8.50   |

(Lens Data)

| i | r | d | nd | vd |
|---|---|---|----|-----|
| 1 | 57.8992 | 1.20 | 1.84666 | 23.78 |
| 2 | 37.8485 | 5.40 | 1.49700 | 81.54 |
| 3 | 455.0569 | 0.50 | | |
| 4 | 45.1853 | 3.21 | 1.67790 | 55.34 |
| 5 | 200.0894 | (d5) | | |
| 6 | 76.0070 | 1.20 | 1.80139 | 45.45 |
| *7 | 9.7908 | 4.58 | | |
| 8 | −28.4260 | 0.85 | 1.78800 | 47.37 |
| 9 | 36.7782 | 0.30 | | |
| 10 | 21.7223 | 3.17 | 1.80810 | 22.76 |
| 11 | −30.7063 | 0.61 | | |
| 12 | −19.7864 | 0.85 | 1.75500 | 52.32 |
| 13 | 946.9644 | (d13) | | |
| 14 | 0.0000 | 0.50 | Aperture Stop S | |
| 15 | 15.3993 | 2.61 | 1.60300 | 65.44 |
| 16 | −37.6383 | 0.10 | | |
| 17 | 19.0098 | 3.49 | 1.49700 | 81.54 |
| 18 | −19.0508 | 1.50 | 1.88300 | 40.76 |
| 19 | 47.4940 | 1.62 | | |
| 20 | −16.0939 | 1.00 | 1.80139 | 45.45 |
| *21 | −37.0133 | (d21) | | |
| 22 | 18.5418 | 4.00 | 1.61881 | 63.85 |
| *23 | −28.5379 | 0.86 | | |
| 24 | 67.2548 | 3.00 | 1.60300 | 65.44 |
| 25 | −13.3315 | 1.20 | 1.75500 | 52.32 |
| 26 | 13.0827 | 1.71 | | |
| 27 | 16.2368 | 3.00 | 1.51680 | 64.10 |
| 28 | −110.0854 | (d28) | | |
| 29 | 0.0000 | 1.00 | 1.51680 | 64.12 |

TABLE 8-continued

| | | | | |
|---|---|---|---|---|
| 30 | 0.0000 | 1.50 | | |
| 31 | 0.0000 | 1.87 | 1.51680 | 64.12 |
| 32 | 0.0000 | 0.40 | | |
| 33 | 0.0000 | 0.70 | 1.51680 | 64.12 |
| 34 | 0.0000 | (Bf) | | |

(Aspherical Surface Data)

Surface Number: 7

R = 9.7908
κ = 1.1109
A4 = −3.1862E−05
A6 = −5.4887E−07
A8 = 9.3504E−09
A10 = −1.8962E−10

Surface Number: 21

R = −37.0133
κ = 11.0000
A4 = −2.5730E−05
A6 = −7.9160E−07
A8 = 9.1322E−09
A10 = −5.5758E−11

Surface Number: 23

R = −28.5379
κ = 11.0000
A4 = 2.2123E−04
A6 = 1.2734E−06
A8 = −1.4347E−08
A10 = 2.5712E−10

(Variable Distances)

| | W | M1 | M2 | T |
|---|---|---|---|---|
| f = | 10.5100 | 26.8793 | 69.9997 | 107.0895 |
| d5 = | 1.3000 | 14.1157 | 29.5282 | 34.6555 |
| d13 = | 23.2000 | 11.4527 | 5.5687 | 2.8000 |
| d21 = | 3.3465 | 1.9639 | 1.4352 | 1.3000 |
| d28 = | 10.8061 | 23.8111 | 34.7874 | 38.2526 |
| Bf = | 0.5000 | 0.4999 | 0.4999 | 0.4998 |

(Values for Conditional Expressions)

fw = 10.5100
f1 = 63.3539
f2 = −9.5359
f3 = 30.4795
f4 = 27.6448
(3) fw/f3 = 0.3448
(4) f1/(−f2) = 6.6437
(5) f3/f4 = 1.1025
(6) f1/f3 = 2.0786
(7) (−f2)/f3 = 0.3129

FIGS. 5A, 5B, 50 and 5D are graphs showing various aberrations of the zoom lens ZL8 according to Example 8 of the second embodiment at d-line (λ=587.6 nm) upon focusing on infinity, in which FIG. 5A shows a wide-angle end state (f=10.51 mm) W, FIG. 5B shows an intermediate focal length state 1 (f=26.88 mm) M1, FIG. 5C shows an intermediate focal length state 2 (f=70.00 mm) M2, and FIG. 5D shows a telephoto end state (f=107.09 mm) T. As is apparent from the respective graphs, the zoom lens system according to Example 8 shows superb optical performance as a result of good corrections to various aberrations in each focal length state from the wide-angle end state through the telephoto end state.

EXAMPLE 9

Figure 14:
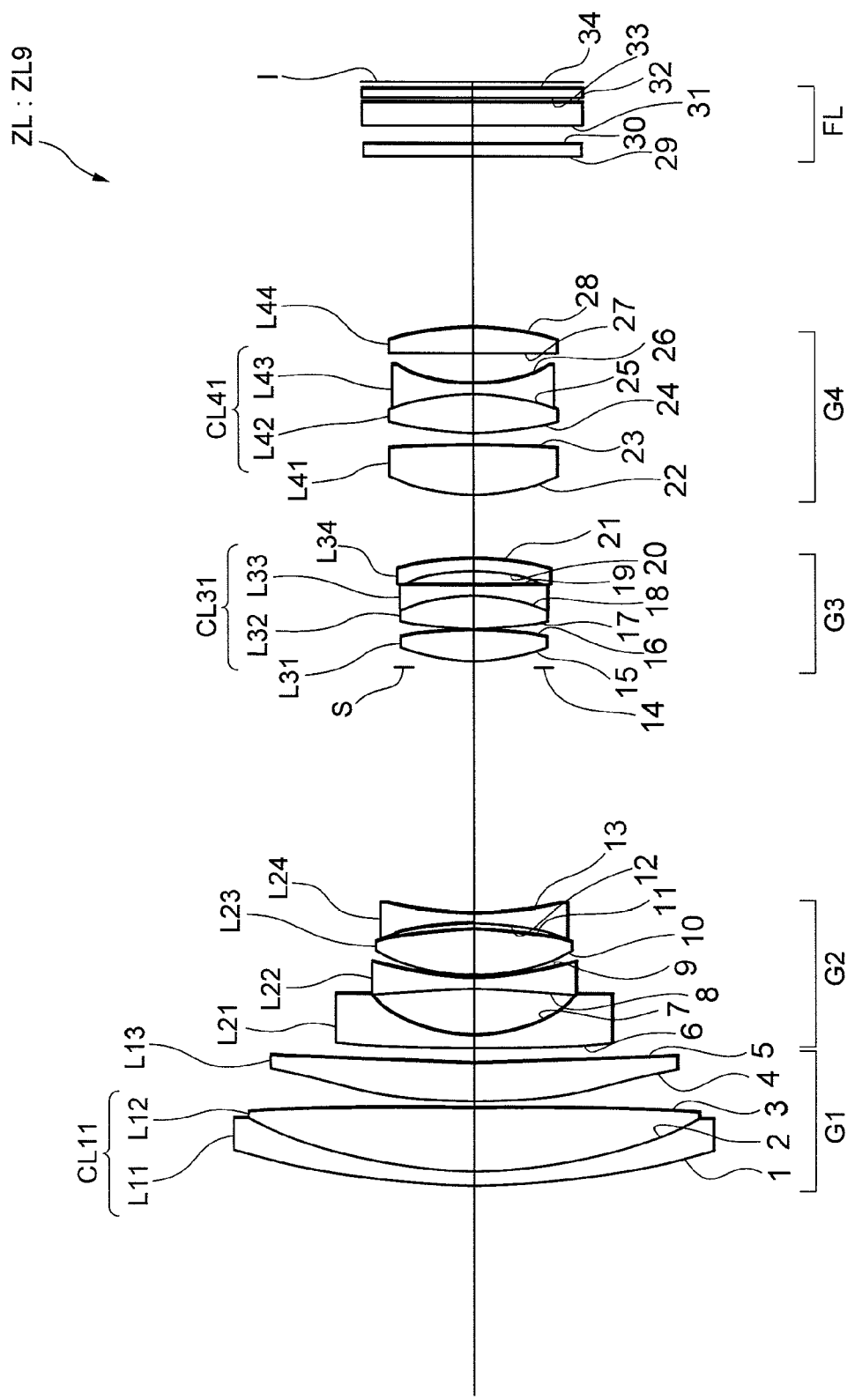
FIG. 14 is a sectional view showing a lens configuration of a zoom lens according to Example 9 of the second embodiment.

FIG. 14 is a sectional view showing a lens configuration of a zoom lens ZL9 according to Example 9 of the second embodiment. In the zoom lens ZL9 according to Example 9 of the second embodiment, the first lens group G1 is composed of, in order from the object side, a cemented positive lens CL11 constructed by a negative meniscus lens L11 having a convex surface facing the object side cemented with a double convex lens L12, and a positive meniscus lens L13 having a convex surface facing the object side. The second lens group G2 is composed of, in order from the object side, a negative meniscus lens L21 having a convex surface facing the object side and an aspherical surface formed on the image side, a double concave lens L22, a double convex lens L23, and a double concave lens L24. The third lens group G3 is composed of, in order from the object side, a double convex lens L31, a cemented negative lens CL31 constructed by a double convex L32 cemented with a double concave lens L33, and a negative meniscus lens L34 having a concave surface facing the object side and an aspherical surface formed on the image side. The fourth lens group G4 is composed of, in order from the object side, a double convex lens L41 having an aspherical surface formed on the image side, a cemented negative lens CL41 constructed by a double convex lens L42 cemented with a double concave lens L43, and a double convex lens L44.

Various values associated with the zoom lens ZL9 according to Example 9 are listed in Table 9. In Example 9, each of lens surfaces 7, 21, and 23 is formed with an aspherical surface. In Example 9, a distance d5 between the first lens group G1 and the second lens group G2, a distance d13 between the second lens group G2 and the third lens group G3, a distance d21 between the third lens group G3 and the fourth lens group G4, and a distance d28 between the fourth lens group G4 and the filter group FL are varied upon zooming.

TABLE 9

(Specifications)

| | W | M1 | M2 | T |
|---|---|---|---|---|
| f = | 10.51 | 29.95 | 70.00 | 107.09 |
| FNO = | 3.18 | 4.36 | 5.22 | 5.68 |
| 2ω = | 80.60 | 30.17 | 13.30 | 8.79 |
| Bf = | 18.48 | 33.19 | 42.87 | 47.75 |
| TL = | 88.21 | 105.57 | 123.58 | 130.28 |
| Y = | 8.50 | 8.50 | 8.50 | 8.50 |

(Lens Data)

| i | r | d | nd | νd |
|---|---|---|---|---|
| 1 | 68.5605 | 1.20 | 1.84666 | 23.78 |
| 2 | 42.3599 | 5.11 | 1.49700 | 81.54 |
| 3 | −444.2837 | 0.50 | | |
| 4 | 49.2462 | 3.14 | 1.67790 | 55.34 |
| 5 | 211.3759 | (d5) | | |
| 6 | 217.0511 | 1.00 | 1.80139 | 45.45 |
| *7 | 11.7077 | 3.76 | | |
| 8 | −56.0613 | 0.85 | 1.78800 | 47.37 |
| 9 | 23.4667 | 0.30 | | |
| 10 | 17.4890 | 3.65 | 1.80810 | 22.76 |
| 11 | −30.9442 | 0.47 | | |
| 12 | −22.6021 | 0.85 | 1.75500 | 52.32 |
| 13 | 29.9374 | (d13) | | |
| 14 | 0.0000 | 0.50 | Aperture Stop S | |
| 15 | 16.2836 | 2.60 | 1.58313 | 59.37 |
| 16 | −29.6240 | 0.10 | | |
| 17 | 36.7304 | 2.64 | 1.49700 | 81.54 |
| 18 | −14.3984 | 0.80 | 1.88300 | 40.76 |
| 19 | 662.0052 | 1.20 | | |
| 20 | −15.4752 | 1.00 | 1.80610 | 40.73 |
| *21 | −27.0212 | (d21) | | |
| 22 | 16.8744 | 4.00 | 1.61881 | 63.85 |
| *23 | −38.8949 | 0.98 | | |
| 24 | 27.5037 | 3.16 | 1.60300 | 65.44 |

TABLE 9-continued

| 25 | −18.8331 | 0.90 | 1.77250 | 49.60 |
|---|---|---|---|---|
| 26 | 14.4567 | 2.44 | | |
| 27 | 1455.0177 | 2.08 | 1.51680 | 64.10 |
| 28 | −23.7870 | (d28) | | |
| 29 | 0.0000 | 1.00 | 1.51680 | 64.12 |
| 30 | 0.0000 | 1.50 | | |
| 31 | 0.0000 | 1.87 | 1.51680 | 64.12 |
| 32 | 0.0000 | 0.40 | | |
| 33 | 0.0000 | 0.70 | 1.51680 | 64.12 |
| 34 | 0.0000 | (Bf) | | |

(Aspherical Surface Data)

Surface Number: 7

R = 11.7077
κ = 1.2513
A4 = −2.8152E−05
A6 = −3.3418E−07
A8 = 2.6785E−09
A10 = −6.2585E−11

Surface Number: 21

R = −27.0212
κ = −8.1884
A4 = −1.1709E−04
A6 = −2.7202E−07
A8 = 3.7029E−09
A10 = −3.6895E−11

Surface Number: 23

R = −38.8949
κ = 11.0000
A4 = 1.6447E−04
A6 = 3.6576E−07
A8 = −8.5004E−09
A10 = 7.8148E−11

(Variable Distances)

| | W | M1 | M2 | T |
|---|---|---|---|---|
| f = | 10.5100 | 29.9451 | 69.9999 | 107.0898 |
| d5 = | 1.3000 | 16.8655 | 30.5201 | 35.2254 |
| d13 = | 19.9386 | 9.2815 | 5.0464 | 2.8000 |
| d21 = | 5.2833 | 3.0201 | 1.9339 | 1.3000 |
| d28 = | 13.7275 | 28.4376 | 38.1170 | 42.9973 |
| Bf = | 0.5000 | 0.5000 | 0.5000 | 0.5000 |

(Values for Conditional Expressions)

fw = 10.5100
f1 = 63.8468
f2 = −8.8622
f3 = 36.5931
f4 = 25.2196
(3) fw/f3 = 0.2872
(4) f1/(−f2) = 7.2044
(5) f3/f4 = 1.4510
(6) f1/f3 = 1.7448
(7) (−f2)/f3 = 0.2422

Figure 15A:
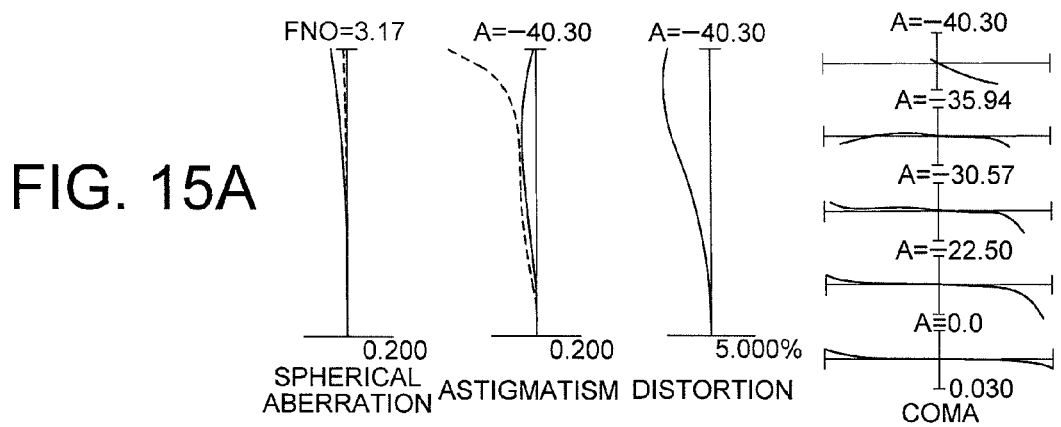
Figure 15B:
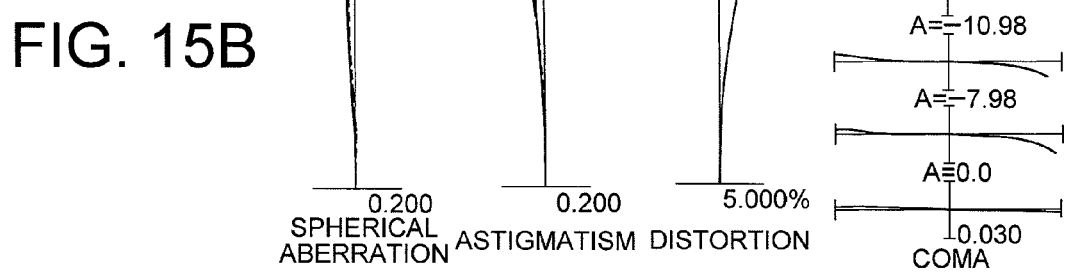
Figure 15C:
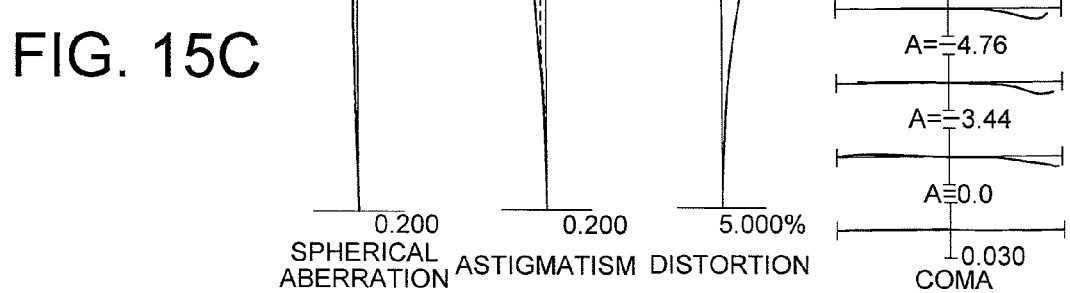
Figure 15D:
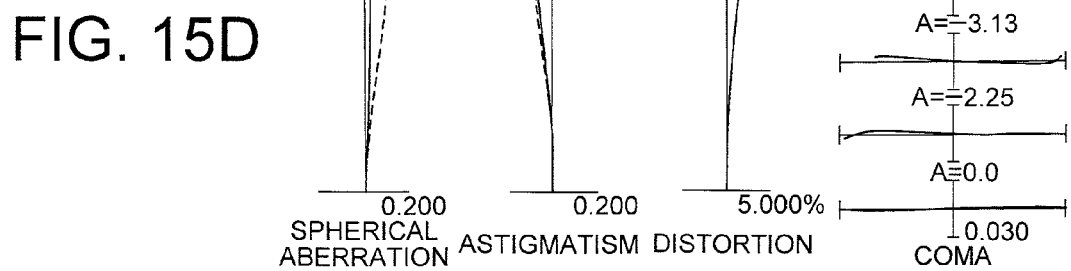

FIGS. 15A, 15B, 15C and 15D are graphs showing various aberrations of the zoom lens ZL9 according to Example 9 of the second embodiment at d-line (λ=587.6 nm) upon focusing on infinity, in which FIG. 15A shows a wide-angle end state (f=10.51 mm) W, FIG. 15B shows an intermediate focal length state 1 (f=29.95 mm) M1, FIG. 15C shows an intermediate focal length state 2 (f=70.00 mm) M2, and FIG. 15D shows a telephoto end state (f=107.09 mm) T. As is apparent from the respective graphs, the zoom lens system according to Example 9 shows superb optical performance as a result of good corrections to various aberrations in each focal length state from the wide-angle end state through the telephoto end state.

EXAMPLE 10

FIG. 6 is a sectional view showing a lens configuration of a zoom lens ZL10 according to Example 10 of the second embodiment. In the zoom lens ZL10 according to Example 10 of the second embodiment, the first lens group G1 is composed of, in order from the object side, a cemented positive lens CL21 (sic) constructed by a negative meniscus lens L11 having a convex surface facing the object side cemented with a double convex lens L12, and a positive meniscus lens L13 having a convex surface facing the object side. The second lens group G2 is composed of, in order from the object side, a negative meniscus lens L21 having a convex surface facing the object side and an aspherical surface formed on the image side, a double concave lens L22, a double convex lens L23, and a double concave lens L24. The third lens group G3 is composed of, in order from the object side, a double convex lens L31, a cemented negative lens CL31 constructed by a double convex L32 cemented with a double concave lens L33, and a negative meniscus lens L34 having a concave surface facing the object side and an aspherical surface formed on the image side. The fourth lens group G4 is composed of, in order from the object side, a double convex lens L41 having an aspherical surface formed on the image side, a cemented negative lens CL41 constructed by a double convex lens L42 cemented with a double concave lens L43, and a positive meniscus lens L44 having a convex surface facing the image side.

Various values associated with the zoom lens ZL10 according to Example 10 are listed in Table 10. In Example 10, each of lens surfaces 7, 21, and 23 is formed with an aspherical surface. In Example 10, a distance d5 between the first lens group G1 and the second lens group G2, a distance d13 between the second lens group G2 and the third lens group G3, a distance d21 between the third lens group G3 and the fourth lens group G4, and a distance d28 between the fourth lens group G4 and the filter group FL are varied upon zooming.

TABLE 10

(Specifications)

| | W | M1 | M2 | T |
|---|---|---|---|---|
| f = | 10.51 | 16.50 | 41.00 | 107.09 |
| FNO = | 3.07 | 3.53 | 4.63 | 5.83 |
| 2ω = | 80.82 | 53.18 | 22.58 | 8.89 |
| Bf = | 20.63 | 26.70 | 39.83 | 53.07 |
| TL = | 83.79 | 88.67 | 108.77 | 128.78 |
| Y = | 8.50 | 8.50 | 8.50 | 8.50 |

(Lens Data)

| i | r | d | nd | νd |
|---|---|---|---|---|
| 1 | 60.9480 | 1.20 | 1.92286 | 20.88 |
| 2 | 43.6565 | 4.30 | 1.49700 | 81.54 |
| 3 | −386.1029 | 0.50 | | |
| 4 | 43.7100 | 2.65 | 1.64000 | 60.08 |
| 5 | 112.1795 | (d5) | | |
| 6 | 54885.3920 | 1.00 | 1.80139 | 45.45 |
| *7 | 10.5338 | 3.58 | | |
| 8 | −76.2868 | 0.85 | 1.81600 | 46.62 |
| 9 | 20.0765 | 0.10 | | |
| 10 | 17.8807 | 3.65 | 1.80810 | 22.76 |
| 11 | −26.7256 | 0.45 | | |
| 12 | −23.1129 | 0.85 | 1.77250 | 49.60 |
| 13 | 55.6994 | (d13) | | |
| 14 | 0.0000 | 0.50 | Aperture Stop S | |
| 15 | 16.2624 | 2.45 | 1.60311 | 60.64 |
| 16 | −31.8849 | 0.10 | | |

TABLE 10-continued

| | | | | |
|---|---|---|---|---|
| 17 | 30.4987 | 2.55 | 1.49700 | 81.54 |
| 18 | −17.5829 | 0.80 | 1.88300 | 40.76 |
| 19 | 80.4259 | 1.80 | | |
| 20 | −12.1903 | 1.00 | 1.80610 | 40.73 |
| *21 | −20.5989 | (d21) | | |
| 22 | 18.0823 | 3.50 | 1.61881 | 63.85 |
| *23 | −29.2315 | 0.50 | | |
| 24 | 27.0281 | 3.00 | 1.60300 | 65.44 |
| 25 | −18.4995 | 0.90 | 1.77250 | 49.60 |
| 26 | 15.2175 | 1.30 | | |
| 27 | −155.5751 | 2.00 | 1.51633 | 64.14 |
| 28 | −18.8809 | (d28) | | |
| 29 | 0.0000 | 1.00 | 1.51680 | 64.12 |
| 30 | 0.0000 | 1.50 | | |
| 31 | 0.0000 | 1.87 | 1.51680 | 64.12 |
| 32 | 0.0000 | 0.40 | | |
| 33 | 0.0000 | 0.70 | 1.51680 | 64.12 |
| 34 | 0.0000 | (Bf) | | |

(Aspherical Surface Data)

Surface Number: 7

R = 10.5338
κ = 1.1144
A4 = −4.7460E−05
A6 = −5.7358E−07
A8 = 4.5188E−09
A10 = −1.2043E−10

Surface Number: 21

R = −20.5989
κ = −2.1097
A4 = −1.1711E−04
A6 = −7.4538E−07
A8 = 9.1645E−09
A10 = −8.6943E−11

Surface Number: 23

R = −29.2315
κ = −1.4131
A4 = 1.4997E−04
A6 = 3.4591E−07
A8 = −1.3285E−08
A10 = 1.1071E−10

(Variable Distances)

| | W | M1 | M2 | T |
|---|---|---|---|---|
| f = | 10.5100 | 16.5000 | 41.0000 | 107.0901 |
| d5 = | 1.3000 | 7.0203 | 21.7084 | 34.3815 |
| d13 = | 18.3381 | 12.3410 | 5.9452 | 1.3000 |
| d21 = | 4.0000 | 3.0748 | 1.7579 | 0.5000 |
| d28 = | 15.8766 | 21.9466 | 35.0784 | 48.3185 |
| Bf = | 0.5000 | 0.5000 | 0.5000 | 0.5001 |

(Values for Conditional Expressions)

fw = 10.5100
f1 = 64.0667
f2 = −9.0945
f3 = 41.2846
f4 = 21.9579
(3) fw/f3 = 0.2546
(4) f1/(−f2) = 7.0446
(5) f3/f4 = 1.8802
(6) f1/f3 = 1.5518
(7) (−f2)/f3 = 0.2203

FIGS. 7A, 7B, 7C and 7D are graphs showing various aberrations of the zoom lens ZL10 according to Example 10 of the second embodiment at d-line (λ=587.6 nm) upon focusing on infinity, in which FIG. 7A shows a wide-angle end state (f=10.51 mm) W, FIG. 7B shows an intermediate focal length state 1 (f=16.50 mm) M1, FIG. 7C shows an intermediate focal length state 2 (f=41.00 mm) M2, and FIG. 7D shows a telephoto end state (f=107.09 mm) T. As is apparent from the respective graphs, the zoom lens system according to Example 10 shows superb optical performance as a result of good corrections to various aberrations in each focal length state from the wide-angle end state through the telephoto end state.

EXAMPLE 11

FIG. 8 is a sectional view showing a lens configuration of a zoom lens ZL11 according to Example 11 of the second embodiment. In the zoom lens ZL11 according to Example 11 of the second embodiment, the first lens group G1 is composed of, in order from the object side, a cemented positive lens CL11 constructed by a negative meniscus lens L11 having a convex surface facing the object side cemented with a double convex lens L12, and a positive meniscus lens L13 having a convex surface facing the object side. The second lens group G2 is composed of, in order from the object side, a negative meniscus lens L21 having a convex surface facing the object side and an aspherical surface formed on the object side, a double concave lens L22, a double convex lens L23, and a double concave lens L24. The third lens group G3 is composed of, in order from the object side, a double convex lens L31, a cemented negative lens CL31 constructed by a double convex lens L32 cemented with a double concave lens L33, and a negative meniscus lens L34 having a concave surface facing the object side and an aspherical surface formed on the image side. The fourth lens group G4 is composed of, in order from the object side, a double convex lens L41 having an aspherical surface formed on the image side, a cemented negative lens CL41 constructed by a double convex lens L42 cemented with a double concave lens L43, and a positive meniscus lens L44 having a convex surface facing the image side.

Various values associated with the zoom lens ZL11 according to Example 11 are listed in Table 11. In Example 11, each of lens surfaces 6, 22, and 24 is formed with an aspherical surface. In Example 11, a distance d5 between the first lens group G1 and the second lens group G2, a distance d14 between the second lens group G2 and the third lens group G3, a distance d22 between the third lens group G3 and the fourth lens group G4, and a distance d29 between the fourth lens group G4 and the filter group FL are varied upon zooming.

TABLE 11

(Specifications)

| | W | M1 | M2 | T |
|---|---|---|---|---|
| f = | 10.51 | 26.50 | 70.00 | 107.09 |
| FNO = | 3.09 | 4.29 | 5.46 | 5.91 |
| 2ω = | 80.75 | 34.44 | 13.42 | 8.84 |
| Bf = | 19.57 | 33.96 | 46.90 | 51.53 |
| TL = | 83.02 | 96.82 | 121.42 | 129.28 |
| Y = | 8.50 | 8.50 | 8.50 | 8.50 |

(Lens Data)

| i | r | d | nd | νd |
|---|---|---|---|---|
| 1 | 62.9234 | 1.20 | 1.84666 | 23.78 |
| 2 | 41.4487 | 4.30 | 1.49700 | 81.54 |
| 3 | −1095.0606 | 0.50 | | |
| 4 | 50.3782 | 2.65 | 1.64000 | 60.08 |
| 5 | 210.9338 | (d5) | | |
| *6 | 250.0000 | 0.15 | 1.55389 | 38.09 |
| 7 | 220.8785 | 1.20 | 1.81600 | 46.62 |
| 8 | 10.5756 | 3.58 | | |
| 9 | −42.1978 | 0.85 | 1.81600 | 46.62 |

TABLE 11-continued

| | | | | |
|---|---|---|---|---|
| 10 | 19.2084 | 0.10 | | |
| 11 | 16.8043 | 3.45 | 1.84666 | 23.78 |
| 12 | −32.5573 | 0.30 | | |
| 13 | −32.6346 | 0.85 | 1.75500 | 52.32 |
| 14 | 47.6411 | (d14) | | |
| 15 | 0.0000 | 0.50 | Aperture Stop S | |
| 16 | 16.3033 | 2.45 | 1.60311 | 60.64 |
| 17 | −31.1607 | 0.10 | | |
| 18 | 33.1851 | 2.45 | 1.49700 | 81.54 |
| 19 | −15.5536 | 0.80 | 1.88300 | 40.76 |
| 20 | 325.4851 | 1.55 | | |
| 21 | −14.2228 | 1.00 | 1.80139 | 45.45 |
| *22 | −30.6056 | (d22) | | |
| 23 | 16.2509 | 3.50 | 1.61881 | 63.85 |
| *24 | −36.1517 | 0.50 | | |
| 25 | 21.4327 | 3.00 | 1.60300 | 65.44 |
| 26 | −20.2471 | 0.90 | 1.77250 | 49.60 |
| 27 | 13.6451 | 1.30 | | |
| 28 | −169.7512 | 2.00 | 1.48749 | 70.23 |
| 29 | −20.6001 | (d29) | | |
| 30 | 0.0000 | 1.00 | 1.51680 | 64.12 |
| 31 | 0.0000 | 1.50 | | |
| 32 | 0.0000 | 1.87 | 1.51680 | 64.12 |
| 33 | 0.0000 | 0.40 | | |
| 34 | 0.0000 | 0.70 | 1.51680 | 64.12 |
| 35 | 0.0000 | (Bf) | | |

(Aspherical Surface Data)

Surface Number: 6

R = 11.7888
κ = 11.0000
A4 = 1.3146E−05
A6 = −1.0696E−07
A8 = 1.6163E−10
A10 = 1.3273E−14

Surface Number: 22

R = −30.6056
κ = −0.5287
A4 = −9.7684E−05
A6 = −7.5194E−07
A8 = 1.0715E−08
A10 = −8.3651E−11

Surface Number: 24

R = −36.1517
κ = 11.0000
A4 = 2.0568E−04
A6 = 4.2479E−07
A8 = −1.2045E−08
A10 = 1.0677E−10

(Variable Distances)

| | W | M1 | M2 | T |
|---|---|---|---|---|
| f = | 10.5100 | 26.5022 | 69.9999 | 107.0898 |
| d5 = | 1.3000 | 12.8162 | 30.2193 | 35.9709 |
| d14 = | 18.4655 | 8.0479 | 3.3238 | 1.3000 |
| d22 = | 4.5056 | 2.8181 | 1.7954 | 1.3000 |
| d29 = | 14.8166 | 29.2033 | 42.1507 | 46.7791 |
| Bf = | 0.5000 | 0.5000 | 0.4999 | 0.4999 |

(Values for Conditional Expressions)

fw = 10.5100
f1 = 66.4840
f2 = −9.3184
f3 = 40.7867
f4 = 21.9953
(3) fw/f3 = 0.2577
(4) f1/(−f2) = 7.1347
(5) f3/f4 = 1.8543
(6) f1/f3 = 1.6300
(7) (−f2)/f3 = 0.2285

FIGS. 9A, 9B, 9C and 9D are graphs showing various aberrations of the zoom lens ZL11 according to Example 11 of the second embodiment at d-line (λ=587.6 nm) upon focusing on infinity, in which FIG. 9A shows a wide-angle end state (f=10.51 mm) W, FIG. 9B shows an intermediate focal length state 1 (f=26.50 mm) M1, FIG. 9C shows an intermediate focal length state 2 (f=70.00 mm) M2, and FIG. 9D shows a telephoto end state (f=107.09 mm) T. As is apparent from the respective graphs, the zoom lens system according to Example 11 shows superb optical performance as a result of good corrections to various aberrations in each focal length state from the wide-angle end state through the telephoto end state.

EXAMPLE 12

Figure 16:
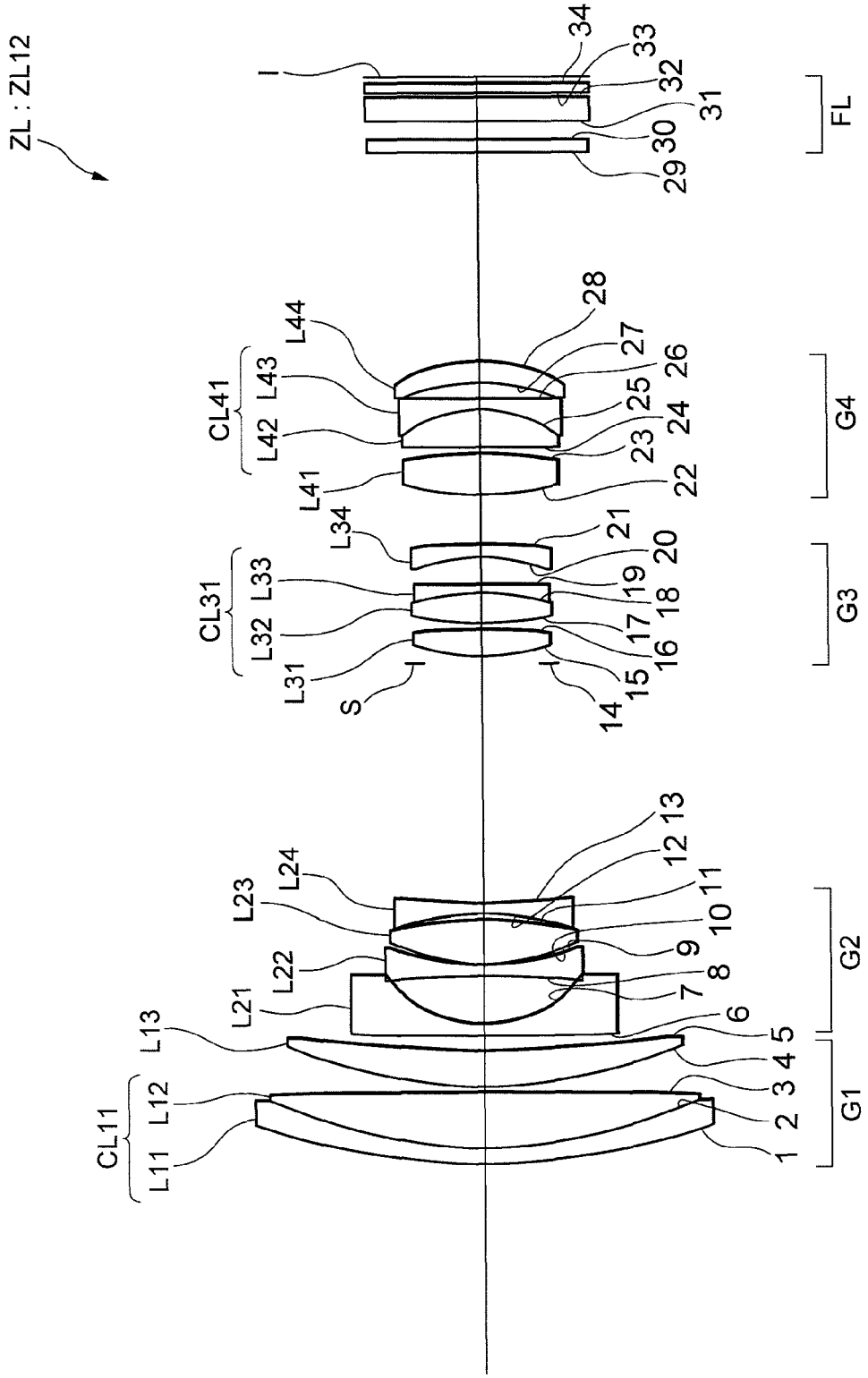
FIG. 16 is a sectional view showing a lens configuration of a zoom lens according to Example 12 of the second embodiment.

FIG. 16 is a sectional view showing a lens configuration of a zoom lens ZL12 according to Example 12 of the second embodiment. In the zoom lens ZL12 according to Example 12 of the second embodiment, the first lens group G1 is composed of, in order from the object side, a cemented positive lens CL11 constructed by a negative meniscus lens L11 having a convex surface facing the object side cemented with a double convex lens L12, and a positive meniscus lens L13 having a convex surface facing the object side. The second lens group G2 is composed of, in order from the object side, a negative meniscus lens L21 having a convex surface facing the object side and an aspherical surface formed on the object side, a double concave lens L22, a double convex lens L23, and a double concave lens L24. The third lens group G3 is composed of, in order from the object side, a double convex lens L31, a cemented positive lens CL31 constructed by a double convex L32 cemented with a negative meniscus lens L33 having a convex surface facing the image side, and a negative meniscus lens L34 having a concave surface facing the object side and an aspherical surface formed on the image side. The fourth lens group G4 is composed of, in order from the object side, a double convex lens L41 having an aspherical surface formed on the image side, a cemented negative lens CL41 constructed by a double convex lens L42 cemented with a double concave lens L43, and a positive meniscus lens L44 having a convex surface facing the image side.

Various values associated with the zoom lens ZL12 according to Example 12 are listed in Table 12. In Example 12, each of lens surfaces 7, 21, and 23 is formed with an aspherical surface. In Example 12, a distance d5 between the first lens group G1 and the second lens group G2, a distance d13 between the second lens group G2 and the third lens group G3, a distance d21 between the third lens group G3 and the fourth lens group G4, and a distance d28 between the fourth lens group G4 and the filter group FL are varied upon zooming.

TABLE 12

| (Specifications) | | | | |
|---|---|---|---|---|
| | W | M1 | M2 | T |
| f = | 10.46 | 18.17 | 37.76 | 109.74 |
| FNO = | 3.44 | 4.10 | 5.28 | 5.82 |
| 2ω = | 81.15 | 49.53 | 24.92 | 8.74 |
| Bf = | 21.44 | 30.21 | 44.81 | 50.86 |
| TL = | 85.67 | 91.81 | 109.73 | 128.83 |
| Y = | 8.50 | 8.50 | 8.50 | 8.50 |

TABLE 12-continued (Lens Data)

| i | r | d | nd | vd |
|---|---|---|---|---|
| 1 | 54.9132 | 1.20 | 1.92286 | 20.88 |
| 2 | 40.4059 | 4.45 | 1.49700 | 81.54 |
| 3 | −1897.1986 | 0.50 | | |
| 4 | 40.4477 | 2.80 | 1.64000 | 60.08 |
| 5 | 98.7042 | (d5) | | |
| 6 | 370.5922 | 1.00 | 1.80139 | 45.45 |
| *7 | 9.5194 | 3.80 | | |
| 8 | −97.8941 | 0.85 | 1.81600 | 46.62 |
| 9 | 20.0558 | 0.10 | | |
| 10 | 16.4401 | 3.55 | 1.80810 | 22.76 |
| 11 | −33.7370 | 0.45 | | |
| 12 | −24.3486 | 0.85 | 1.77250 | 49.60 |
| 13 | 63.0598 | (d13) | | |
| 14 | 0.0000 | 0.50 | Aperture Stop S | |
| 15 | 15.4466 | 2.20 | 1.60311 | 60.64 |
| 16 | −53.3583 | 0.50 | | |
| 17 | 24.0825 | 2.40 | 1.49700 | 81.54 |
| 18 | −18.9991 | 0.80 | 1.88300 | 40.76 |
| 19 | −134.6538 | 2.10 | | |
| 20 | −14.6682 | 1.00 | 1.80610 | 40.73 |
| *21 | −75.0591 | (d21) | | |
| 22 | 24.3229 | 3.30 | 1.61881 | 63.85 |
| *23 | −20.3832 | 0.50 | | |
| 24 | 504.3896 | 2.95 | 1.60300 | 65.44 |
| 25 | −10.3821 | 0.80 | 1.77250 | 49.60 |
| 26 | 156.6977 | 1.38 | | |
| 27 | −17.0835 | 1.70 | 1.51633 | 64.14 |
| 28 | −13.0447 | (d28) | | |
| 29 | 0.0000 | 1.00 | 1.51680 | 64.12 |
| 30 | 0.0000 | 1.50 | | |
| 31 | 0.0000 | 1.87 | 1.51680 | 64.12 |
| 32 | 0.0000 | 0.40 | | |
| 33 | 0.0000 | 0.70 | 1.51680 | 64.12 |
| 34 | 0.0000 | (Bf) | | |

(Aspherical Surface Data)

Surface Number: 7

R = 9.5194
κ = 0.9522
A4 = 3.8614E−05
A6 = −7.2033E−07
A8 = 6.1427E−09
A10 = −1.5661E−10

Surface Number: 21

R = −75.0591
κ = 8.3591
A4 = −1.1844E−04
A6 = −1.3067E−06
A8 = 2.2047E−08
A10 = −2.6218E−10

Surface Number: 23

R = −20.3832
κ = −3.9075
A4 = 1.2366E−04
A6 = 1.4884E−06
A8 = −2.0992E−08
A10 = 2.4454E−10

(Variable Distances)

| | W | M1 | M2 | T |
|---|---|---|---|---|
| f = | 10.4608 | 18.1716 | 37.7632 | 109.7436 |
| d5 = | 1.2150 | 7.1571 | 16.9157 | 35.4168 |
| d13 = | 19.3561 | 11.5968 | 5.9010 | 1.1431 |
| d21 = | 3.9839 | 3.1655 | 2.4256 | 1.7341 |
| d28 = | 16.6826 | 25.4596 | 40.0551 | 46.1067 |
| Bf = | 0.4999 | 0.5000 | 0.5000 | 0.5000 |

TABLE 12-continued (Values for Conditional Expressions)

fw = 10.4608
f1 = 62.8663
f2 = −8.8776
f3 = 36.0065
f4 = 22.5627
(3) fw/f3 = 0.2905
(4) f1/(−f2) = 7.0815
(5) f3/f4 = 1.5958
(6) f1/f3 = 1.7460
(7) (−f2)/f3 = 0.2466

Figure 17A:
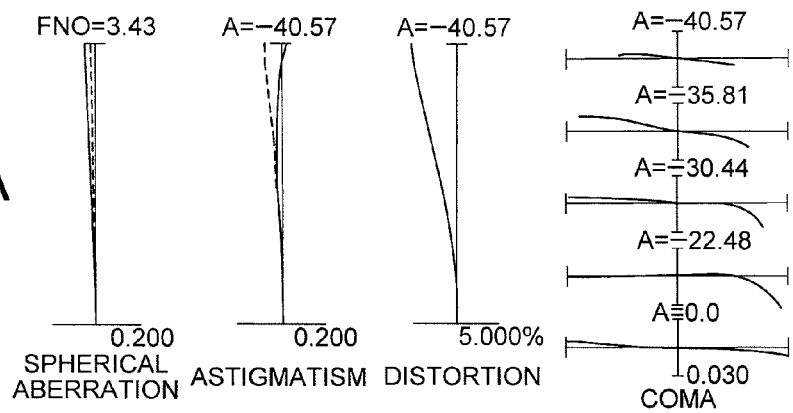
Figure 17B:
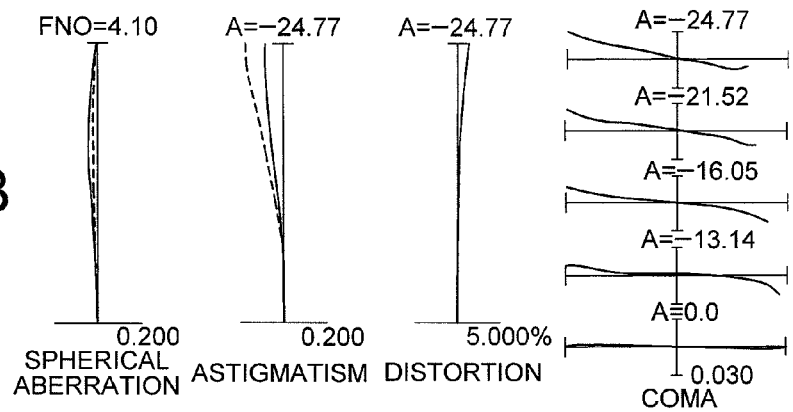
Figure 17C:
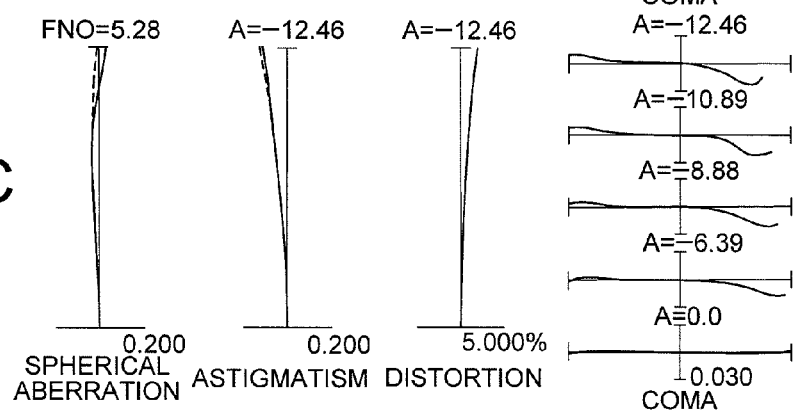
Figure 17D:
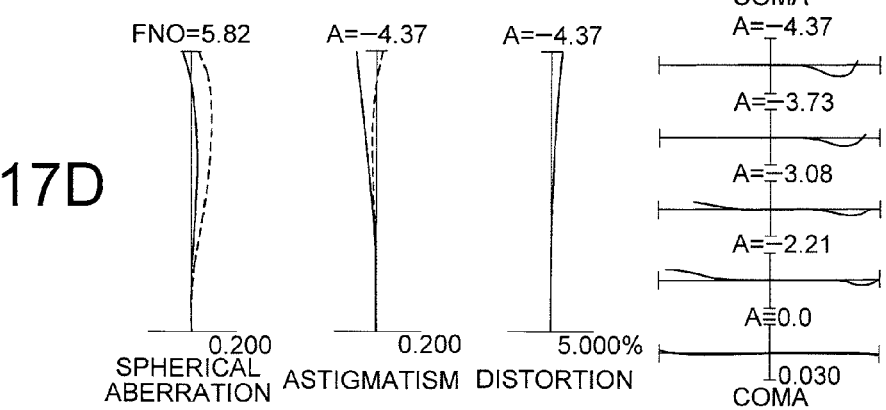

FIGS. 17A, 17B, 17C and 17D are graphs showing various aberrations of the zoom lens ZL12 according to Example 12 of the second embodiment at d-line (λ=587.6 nm) upon focusing on infinity, in which FIG. 17A shows a wide-angle end state (f=10.46 mm) W, FIG. 17B shows an intermediate focal length state 1 (f=18.17 mm) M1, FIG. 17C shows an intermediate focal length state 2 (f=37.76 mm) M2, and FIG. 17D shows a telephoto end state (f=109.74 mm) T. As is apparent from the respective graphs, the zoom lens system according to Example 12 shows superb optical performance as a result of good corrections to various aberrations in each focal length state from the wide-angle end state through the telephoto end state.

EXAMPLE 13

Figure 18:
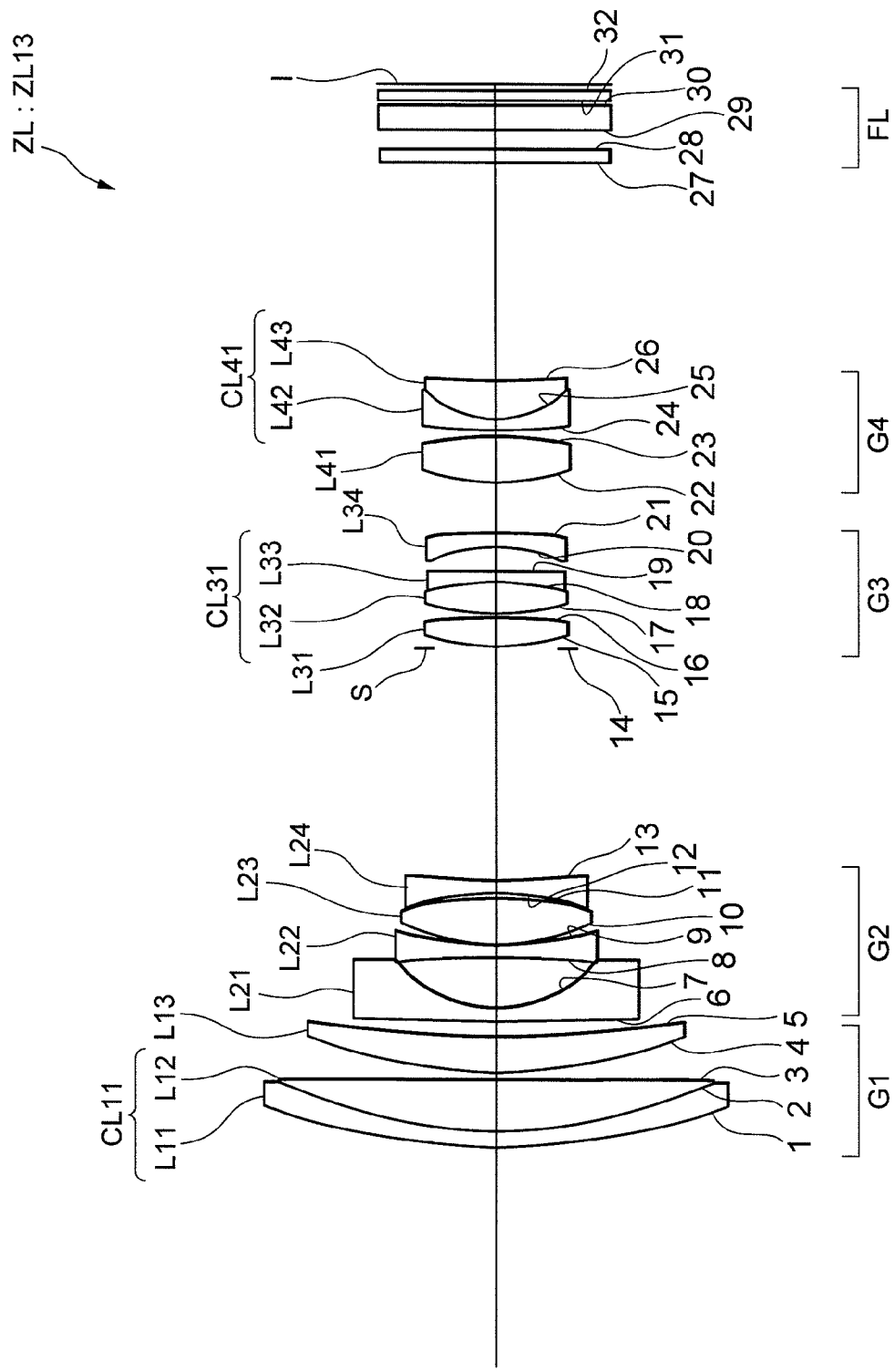
FIG. 18 is a sectional view showing a lens configuration of a zoom lens according to Example 13 of the second embodiment.

FIG. 18 is a sectional view showing a lens configuration of a zoom lens ZL13 according to Example 13 of the second embodiment. In the zoom lens ZL13 according to Example 13 of the second embodiment, the first lens group G1 is composed of, in order from the object side, a cemented positive lens CL11 constructed by a negative meniscus lens L11 having a convex surface facing the object side cemented with a double convex lens L12, and a positive meniscus lens L13 having a convex surface facing the object side. The second lens group G2 is composed of, in order from the object side, a negative meniscus lens L21 having a convex surface facing the object side and an aspherical surface formed on the object side, a double concave lens L22, a double convex lens L23, and a double concave lens L24. The third lens group G3 is composed of, in order from the object side, a double convex lens L31, a cemented positive lens CL31 constructed by a double convex L32 cemented with a negative meniscus lens L33 having a convex surface facing the image side, and a negative meniscus lens L34 having a concave surface facing the object side and an aspherical surface formed on the image side. The fourth lens group G4 is composed of, in order from the object side, a double convex lens L41 having an aspherical surface formed on the image side, and a cemented negative lens CL41 constructed by a negative meniscus lens L42 having a convex surface facing the object side cemented with a double convex lens L43.

Various values associated with the zoom lens ZL13 according to Example 13 are listed in Table 13. In Example 13, each of lens surfaces 7, 21, and 23 is formed with an aspherical surface. In Example 13, a distance d5 between the first lens group G1 and the second lens group G2, a distance d13 between the second lens group G2 and the third lens group G3, a distance d21 between the third lens group G3 and the fourth lens group G4, and a distance d26 between the fourth lens group G4 and the filter group FL are varied upon zooming.

TABLE 13

(Specifications)

|  | W | M1 | M2 | T |
|---|---|---|---|---|
| f = | 10.46 | 15.92 | 37.76 | 109.66 |
| FNO = | 2.98 | 3.51 | 4.80 | 5.84 |
| 2ω = | 81.14 | 56.35 | 24.87 | 8.74 |
| Bf = | 21.44 | 28.16 | 43.58 | 55.36 |
| TL = | 80.36 | 82.96 | 103.77 | 127.78 |
| Y = | 8.50 | 8.50 | 8.50 | 8.50 |

(Lens Data)

| i | r | d | nd | νd |
|---|---|---|---|---|
| 1 | 55.3286 | 1.20 | 1.92286 | 20.88 |
| 2 | 41.2046 | 3.97 | 1.49700 | 81.54 |
| 3 | −1382.8047 | 0.50 | | |
| 4 | 40.7219 | 2.84 | 1.60300 | 65.44 |
| 5 | 101.6759 | (d5) | | |
| 6 | 371.2084 | 1.00 | 1.80139 | 45.45 |
| *7 | 9.7057 | 3.86 | | |
| 8 | −72.6688 | 0.85 | 1.81600 | 46.62 |
| 9 | 24.8973 | 0.10 | | |
| 10 | 18.5207 | 3.55 | 1.80810 | 22.76 |
| 11 | −27.1812 | 0.45 | | |
| 12 | −20.6629 | 0.85 | 1.77250 | 49.60 |
| 13 | 60.2134 | (d13) | | |
| 14 | 0.0000 | 0.10 | Aperture Stop S | |
| 15 | 19.1988 | 2.30 | 1.60300 | 65.44 |
| 16 | −36.1506 | 0.23 | | |
| 17 | 20.2585 | 2.52 | 1.51633 | 64.14 |
| 18 | −21.0481 | 0.80 | 1.85026 | 32.34 |
| 19 | −194.8090 | 1.91 | | |
| 20 | −12.9724 | 1.00 | 1.80139 | 45.45 |
| *21 | −63.0659 | (d21) | | |
| 22 | 19.4562 | 3.50 | 1.61881 | 63.85 |
| *23 | −21.1844 | 0.50 | | |
| 24 | 64.9068 | 0.80 | 1.77250 | 49.60 |
| 25 | 8.8620 | 2.95 | 1.60300 | 65.44 |
| 26 | 80.4025 | (d26) | | |
| 27 | 0.0000 | 1.00 | 1.51680 | 64.12 |
| 28 | 0.0000 | 1.50 | | |
| 29 | 0.0000 | 1.87 | 1.51680 | 64.12 |
| 30 | 0.0000 | 0.40 | | |
| 31 | 0.0000 | 0.70 | 1.51680 | 64.12 |
| 32 | 0.0000 | (Bf) | | |

(Aspherical Surface Data)

Surface Number: 7

R = 9.7057
κ = 0.8081
A4 = −2.0772E−05
A6 = −3.4885E−07
A8 = 4.1544E−09
A10 = −9.2312E−11

Surface Number: 21

R = −63.0659
κ = 7.2797
A4 = −1.3863E−04
A6 = −1.2499E−06
A8 = 1.7711E−08
A10 = −1.3519E−10

Surface Number: 23

R = −21.1844
κ = −4.6773
A4 = 1.3338E−04
A6 = 1.1314E−06
A8 = −1.6398E−08
A10 = 9.6931E−11

TABLE 13-continued

(Variable Distances)

|  | W | M1 | M2 | T |
|---|---|---|---|---|
| f = | 10.4608 | 15.9226 | 37.7628 | 109.6564 |
| d5 = | 1.2000 | 3.9752 | 16.4679 | 33.9975 |
| d13 = | 17.9482 | 11.7968 | 5.6218 | 1.1000 |
| d21 = | 4.0000 | 3.2562 | 2.3282 | 1.5540 |
| d26 = | 16.6828 | 23.4049 | 38.8279 | 50.6064 |
| Bf = | 0.4995 | 0.5012 | 0.4988 | 0.4960 |

(Values for Conditional Expressions)

fw = 10.4608
f1 = 63.9943
f2 = −8.9079
f3 = 35.5142
f4 = 21.1412
(3) fw/f3 = 0.2946
(4) f1/(−f2) = 7.1840
(5) f3/f4 = 1.6799
(6) f1/f3 = 1.8019
(7) (−f2)/f3 = 0.2508

Figure 19A:
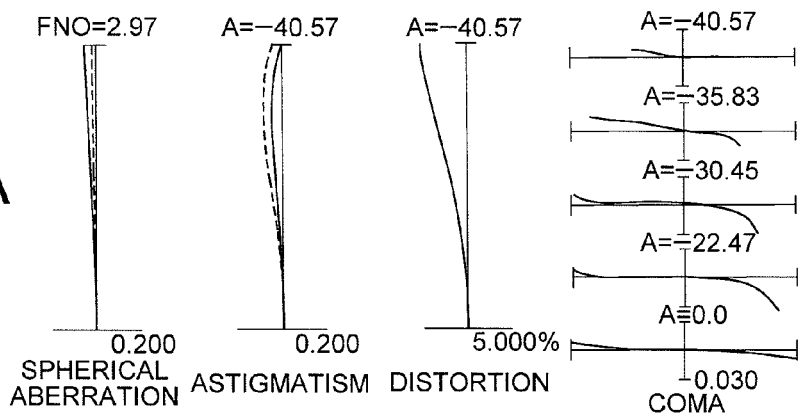
Figure 19B:
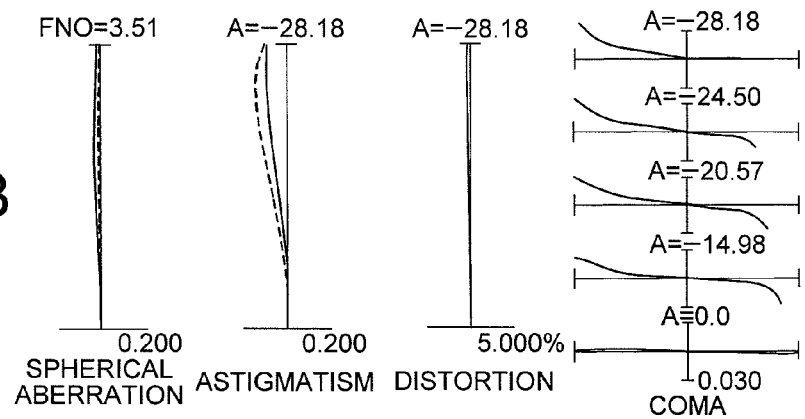
Figure 19C:
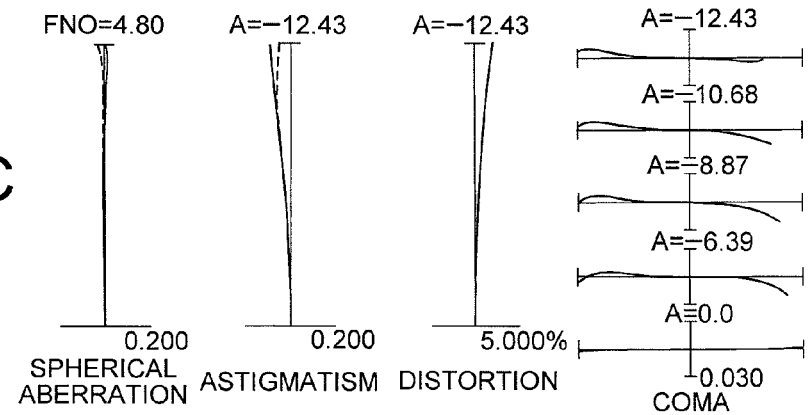
Figure 19D:
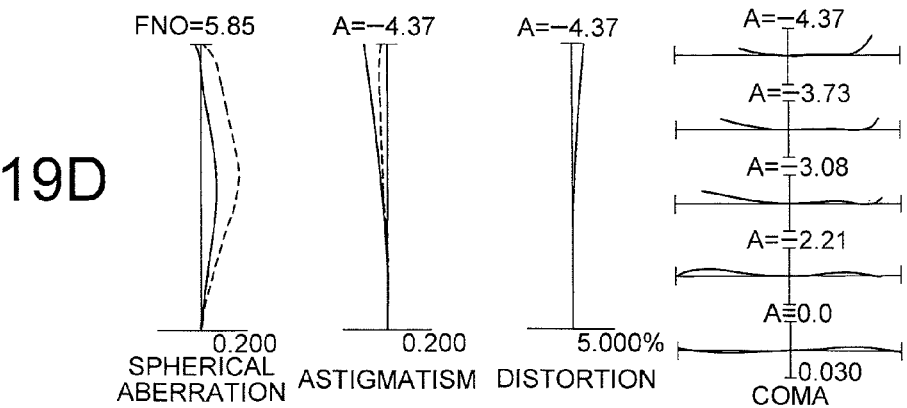

FIGS. 19A, 19B, 19C and 19D are graphs showing various aberrations of the zoom lens ZL13 according to Example 13 of the second embodiment at d-line (λ=587.6 nm) upon focusing on infinity, in which FIG. 19A shows a wide-angle end state (f=10.46 mm) W, FIG. 19B shows an intermediate focal length state 1 (f=15.92 mm) M1, FIG. 19C shows an intermediate focal length state 2 (f=37.76 mm) M2, and FIG. 19D shows a telephoto end state (f=109.66 mm) T. As is apparent from the respective graphs, the zoom lens system according to Example 13 shows superb optical performance as a result of good corrections to various aberrations in each focal length state from the wide-angle end state through the telephoto end state.

EXAMPLE 14

FIG. 12 is a sectional view showing a lens configuration of a zoom lens ZL14 according to Example 14 of the second embodiment. In the zoom lens ZL14 according to Example 14 of the second embodiment, the first lens group G1 is composed of, in order from the object side, a cemented positive lens CL11 constructed by a negative meniscus lens L11 having a convex surface facing the object side cemented with a positive meniscus lens L12 having a concave surface facing the image side, and a positive meniscus lens L13 having a convex surface facing the object side. The second lens group G2 is composed of, in order from the object side, a negative meniscus lens L21 having a convex surface facing the object side and an aspherical surface formed on the image side, a double concave lens L22, a double convex lens L23, and a double concave lens L24. The third lens group G3 is composed of, in order from the object side, a double convex lens L31, a cemented negative lens CL31 constructed by a double convex L32 cemented with a double concave lens L33, and a negative meniscus lens L34 having a concave surface facing the object side and an aspherical surface formed on the image side. The fourth lens group G4 is composed of, in order from the object side, a double convex lens L41 having an aspherical surface formed on the image side, and a cemented negative lens CL41 constructed by a negative meniscus lens L42 having a convex surface facing the object side cemented with a double convex lens L43.

Various values associated with the zoom lens ZL14 according to Example 14 are listed in Table 14. In Example 14, each of lens surfaces 7, 21, and 23 is formed with an aspherical surface. In Example 14, a distance d5 between the first lens group G1 and the second lens group G2, a distance d13 between the second lens group G2 and the third lens group G3, a distance d21 between the third lens group G3 and the fourth lens group G4, and a distance d26 between the fourth lens group G4 and the filter group FL are varied upon zooming.

TABLE 14

(Specifications)

| | W | M1 | M2 | T |
|---|---|---|---|---|
| f = | 10.46 | 16.10 | 37.76 | 109.66 |
| FNO = | 3.05 | 3.50 | 4.82 | 5.99 |
| 2ω = | 81.15 | 55.01 | 24.91 | 8.76 |
| Bf = | 21.44 | 27.29 | 43.33 | 56.58 |
| TL = | 82.30 | 86.37 | 104.31 | 127.78 |
| Y = | 8.50 | 8.50 | 8.50 | 8.50 |

(Lens Data)

| i | r | d | nd | vd |
|---|---|---|---|---|
| 1 | 52.4618 | 0.82 | 1.92286 | 20.88 |
| 2 | 39.5464 | 4.73 | 1.49700 | 81.54 |
| 3 | 5279.8040 | 0.50 | | |
| 4 | 39.0489 | 2.79 | 1.60300 | 65.44 |
| 5 | 101.4457 | (d5) | | |
| 6 | 242.8497 | 0.80 | 1.80139 | 45.45 |
| *7 | 9.6078 | 3.97 | | |
| 8 | −53.0915 | 0.80 | 1.81600 | 46.62 |
| 9 | 27.1207 | 0.10 | | |
| 10 | 19.2442 | 3.40 | 1.80810 | 22.76 |
| 11 | −28.4265 | 0.45 | | |
| 12 | −21.3643 | 0.80 | 1.75500 | 52.32 |
| 13 | 74.4746 | (d13) | | |
| 14 | 0.0000 | 0.10 | Aperture Stop S | |
| 15 | 18.3624 | 2.37 | 1.60300 | 65.44 |
| 16 | −34.3973 | 0.10 | | |
| 17 | 19.6723 | 3.20 | 1.51633 | 64.14 |
| 18 | −21.6943 | 0.80 | 1.85026 | 32.34 |
| 19 | 618.5341 | 1.93 | | |
| 20 | −13.1758 | 1.00 | 1.80139 | 45.45 |
| *21 | −60.8070 | (d21) | | |
| 22 | 22.8062 | 3.50 | 1.61881 | 63.85 |
| *23 | −22.1250 | 0.50 | | |
| 24 | 225.5495 | 0.80 | 1.77250 | 49.60 |
| 25 | 10.7683 | 2.93 | 1.60300 | 65.44 |
| 26 | −181.8838 | (d26) | | |
| 27 | 0.0000 | 1.00 | 1.51680 | 64.12 |
| 28 | 0.0000 | 1.50 | | |
| 29 | 0.0000 | 1.87 | 1.51680 | 64.12 |
| 30 | 0.0000 | 0.40 | | |
| 31 | 0.0000 | 0.70 | 1.51680 | 64.12 |
| 32 | 0.0000 | (Bf) | | |

(Aspherical Surface Data)

Surface Number: 6

R = 9.6078
κ = 0.9084
A4 = −2.8248E−05
A6 = −4.9541E−07
A8 = 4.7856E−09
A10 = −1.1480E−10

Surface Number: 21

R = −60.8070
κ = 7.5867
A4 = −1.2929E−04
A6 = −1.1174E−06
A8 = 1.2284E−08
A10 = −8.8483E−11

Surface Number: 23

R = −22.1250
κ = −5.6671

TABLE 14-continued

A4 = 1.1409E−04
A6 = 1.3392E−06
A8 = −1.5434E−08
A10 = 1.2476E−10

(Variable Distances)

| | W | M1 | M2 | T |
|---|---|---|---|---|
| f = | 10.4606 | 16.1003 | 37.7622 | 109.6618 |
| d5 = | 1.1999 | 6.2049 | 16.2467 | 32.2485 |
| d13 = | 19.2587 | 13.2288 | 6.1018 | 1.1100 |
| d21 = | 4.0000 | 3.2510 | 2.2402 | 1.4553 |
| d26 = | 16.6908 | 22.5374 | 38.5747 | 51.8268 |
| Bf = | 0.4999 | 0.4961 | 0.4993 | 0.5025 |

(Values for Conditional Expressions)

fw = 10.4606
f1 = 61.6382
f2 = −9.0259
f3 = 33.0321
f4 = 22.0798
(3) fw/f3 = 0.3167
(4) f1/(−f2) = 6.8291
(5) f3/f4 = 1.4960
(6) f1/f3 = 1.8660
(7) (−f2)/f3 = 0.2732

FIGS. 13A, 13B, 13C and 13D are graphs showing various aberrations of the zoom lens ZL14 according to Example 14 of the second embodiment at d-line (λ=587.6 nm) upon focusing on infinity, in which FIG. 13A shows a wide-angle end state (f=10.46 mm) W, FIG. 13B shows an intermediate focal length state 1 (f=16.10 mm) M1, FIG. 13C shows an intermediate focal length state 2 (f=37.76 mm) M2, and FIG. 13D shows a telephoto end state (f=109.66 mm) T. As is apparent from the respective graphs, the zoom lens system according to Example 14 shows superb optical performance as a result of good corrections to various aberrations in each focal length state from the wide-angle end state through the telephoto end state.

Figure 22:
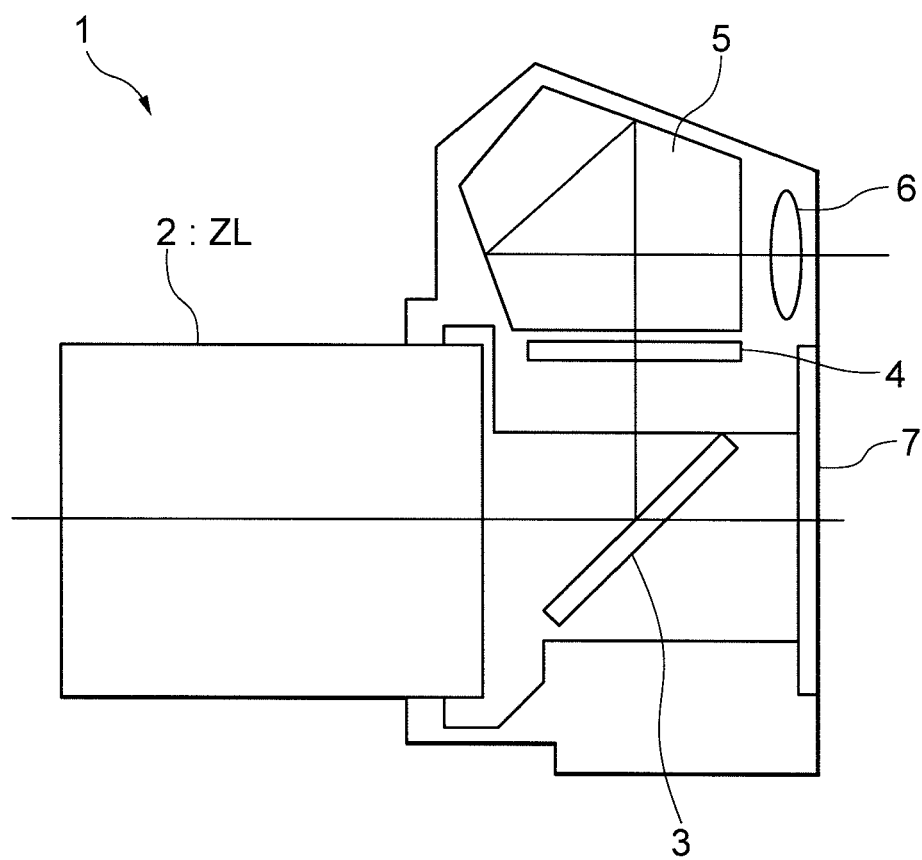
FIG. 22 is a cross-sectional diagram schematically showing a construction of a single-lens reflex digital camera equipped with the zoom lens according to each embodiment of the present application.

FIG. 22 is a sectional view showing a construction of a single-lens reflex digital camera 1 (hereinafter simply called as a camera) as an optical apparatus equipped with the zoom lens ZL according to each embodiment of the present application. In the camera 1, light rays emitted from an unillustrated object (an object to be photographed) are converged by the imaging lens 2 (zoom lens ZL), reflected by a quick return mirror 3, and focused on a focusing screen 4. The light rays focused on the focusing screen 4 are reflected a plurality of times in a pentagonal roof prism 5, and led to an eyepiece 6. Accordingly, a photographer can observe the object (the object to be photographed) image as an erected image through the eyepiece 6.

When the photographer presses an unillustrated release button all the way down, the quick return mirror 3 is retracted from the optical path, and the light rays from the unillustrated object are formed an object image on an imaging device 7. Accordingly, the light rays emitted from the object are captured by the imaging device 7, and stored in an unillustrated memory as a photographed image of the object (the object to be photographed). In this manner, the photographer can take a picture of an object (the object to be photographed) by the camera 1. Incidentally, the camera 1 shown in FIG. 22 may be constructed to removably hold the zoom lens ZL and may also be constructed integrally with the zoom lens ZL. Moreover, the camera 1 may be constructed as a so-called single lens reflex camera and may also be constructed as a compact camera including none of the quick return mirror.

Incidentally, the following description may suitably be applied within limits that do not deteriorate optical performance.

In the zoom lens ZL, in order to prevent failure of taking a picture by an image blur caused by a camera shake and the like liable to happen in a high-zoom-ratio zoom lens, a camera-shake detector for detecting vibrations of a lens system and a driving means are connected to the lens system, a lens group or a portion of a lens group composing the lens system disposed as a shift lens group, and the shift lens group is shifted by the drive means for correcting an image blur (movement of the image) caused by vibration of the lens system detected by the camera-shake detector, so that the image blur can be corrected. As described above, the zoom lens ZL can be functioned as a vibration reduction lens system. In particular, it is preferable that at least a portion of the second lens group G2 or at least a portion of the third lens group is used as the vibration reduction lens group.

In the above described Examples, although the zoom lens ZL having a four-lens-group configuration has been shown, the above described lens configuration can be applied to other lens configurations such as a five-lens-group configuration and the like. Moreover, a lens configuration in which a lens or a lens group is added to the most object side, and a lens configuration in which a lens or a lens group is added to the most image side may be possible. Otherwise, a lens configuration in which a lens or a lens group is added between lens groups is also possible. Incidentally, a lens group is defined as a portion having at least one lens that is separated from the other portions by air spaces that vary upon zooming.

In order to vary focusing from an infinitely distant object to a close object, a single lens group, a plurality of lens groups, or a sub-lens group may be moved along the optical axis as a focusing lens group. In this case, the focusing lens group can be used for auto focus, and suitable for being driven by a motor such as an ultrasonic motor. It is particularly preferable that at least a portion of the second lens group G2, or at least a portion of the fourth lens group G4 is used as the focusing lens group.

Moreover, any lens surface in a zoom lens system according to the present application may be formed as a spherical surface, a plane surface or an aspherical surface. When a lens surface is a spherical surface or a plane surface, processing and assembling become easy, so that deterioration of optical performance caused by errors upon processing and assembling can be prevented. Even if the image plane is shifted, deterioration in optical performance is small, so that it is desirable.

When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

Although an aperture stop S is preferably disposed between the second lens group G2 and the third lens group G3, the function may be substituted by a lens frame without disposing a member as an aperture stop.

An antireflection coating having high transmittance over a broad wavelength range may be applied to each lens surface in a zoom lens ZL according to the present application to reduce flare or ghost images, so that high optical performance with a high contrast can be achieved.

In a zoom lens ZL according to the present application, it is preferable that the first lens group G1 includes two positive lens components. In the first lens group G1, it is preferable that these lens components are disposed, in order from the object side, positive-positive with an air space between them. Alternatively, the first lens group G1 preferably includes two positive lens components and one negative lens component. In the first lens group G1, it is preferable that these lens components are disposed, in order from the object side, negative-positive-positive with air spaces between them.

In a zoom lens ZL according to the present application, it is preferable that the second lens group G2 includes one positive lens component and two negative lens components. In the second lens group G2, it is preferable that these lens components are disposed, in order from the object side, negative-negative-positive with disposing air spaces between them. Otherwise, the second lens group G2 preferably includes one positive lens component and three negative lens components. In the second lens group G2, it is preferable that these lens components are disposed, in order from the object side, negative-negative-positive-negative with disposing air spaces between them.

In a zoom lens ZL according to the present application, it is preferable that the third lens group G3 includes one positive lens component and two negative lens components. In the third lens group G3, it is preferable that these lens components are disposed, in order from the object side, positive-negative-negative with disposing air spaces between them.

In a zoom lens ZL according to the present application, it is preferable that the fourth lens group G4 includes two positive lens components and one negative lens component. In the fourth lens group G4, it is preferable that these lens components are disposed, in order from the object side, positive-negative-positive with disposing air spaces between them. Otherwise, the fourth lens group G4 preferably includes one positive lens component and one negative lens component. In the fourth lens group G4, it is preferable that these lens components are disposed, in order from the object side, positive-negative with disposing an air space between them.

In a zoom lens ZL according to the present application, the zoom ratio is about five to fifteen. In a zoom lens ZL according to the present application, a distance between the image side lens surface of the most image side lens and the image plane, which is the back focal length, is preferably 10 to 30 mm in the smallest state. In a zoom lens ZL according to the present application, an image height is preferable 5 to 12.5 mm, and most preferable 5 to 9.5 mm.

Above-described each example only shows a specific example for the purpose of better understanding of the present invention. Accordingly, it is needless to say that the invention in its broader aspect is not limited to the specific details and representative devices shown and described herein.

What is claimed is:

1. A zoom lens comprising, in order from an object side:
a first lens group having positive refractive power;
a second lens group having negative refractive power;
a third lens group having positive refractive power; and
a fourth lens group having positive refractive power, the third lens group including, in order from the object side, a first positive lens, a cemented lens constructed by in order from the object side a second positive lens cemented with a negative lens, and a negative meniscus lens, and
the following conditional expressions being satisfied:

$r3R<0$ $-2.00<(r3R+r3F)/(r3R-r3F)<1.00$ $6.00<f1/(-f2)<7.80$ where r3F denotes a radius of curvature of an image side lens surface of the cemented lens in the third lens group, r3R denotes a radius of curvature of an object side lens surface of the negative meniscus lens in the third lens group, f1 denotes a focal length of the first lens group, and f2 denotes a focal length of the second lens group.

2. The zoom lens according to claim 1, wherein the first positive lens in the third lens group has a convex surface facing the object side, the cemented lens in the third lens group is constructed by the second positive lens having a convex surface facing the object side cemented with the negative lens having a concave surface facing the image side, and the negative meniscus lens has a convex surface facing the image side.

3. The zoom lens according to claim 1, wherein the following conditional expression is satisfied:

$$0.10<fw/f3<0.50$$

where fw denotes a focal length of the zoom lens in a wide-angle end state, and f3 denotes a focal length of the third lens group.

4. The zoom lens according to claim 1, wherein upon zooming from a wide-angle end state to a telephoto end state, at least the first lens group and the fourth lens group are moved to the object side such that a distance between the first lens group and the second lens group varies, a distance between the second lens group and the third lens group varies, and a distance between the third lens group and the fourth lens group varies.

5. The zoom lens according to claim 1, wherein upon zooming from a wide-angle end state to a telephoto end state, a distance between the first lens group and the second lens group increases, a distance between the second lens group and the third lens group decreases, and a distance between the third lens group and the fourth lens group decreases.

6. The zoom lens according to claim 1, wherein an aperture stop is disposed between the second lens group and the third lens group.

7. The zoom lens according to claim 1, wherein the cemented lens in the third lens group has negative refractive power.

8. The zoom lens according to claim 1, wherein at least one aspherical lens is included in the third lens group.

9. The zoom lens according to claim 1, wherein an image side lens surface of the negative meniscus lens disposed to the image side of the cemented lens in the third lens group is formed as an aspherical surface.

10. The zoom lens according to claim 1, wherein the following conditional expression is satisfied:

$$0.15<f3/f4<2.75$$

where f3 denotes a focal length of the third lens group, and f4 denotes a focal length of the fourth lens group.

11. The zoom lens according to claim 1, wherein the following conditional expression is satisfied:

$$0.85<f1/f3<2.74$$

where f1 denotes the focal length of the first lens group, and f3 denotes a focal length of the third lens group.

12. The zoom lens according to claim 1, wherein at least a portion of the second lens group is moved along an optical axis, thereby carrying out focusing on a close object.

13. The zoom lens according to claim 1, wherein at least a portion of the third lens group is moved in a direction including a component perpendicular to an optical axis.

14. The zoom lens according to claim 1, wherein the following conditional expression is satisfied:

$$0.170<(-f2)/f3<0.365$$

where f2 denotes the focal length of the second lens group, and f3 denotes a focal length of the third lens group.

15. An optical apparatus equipped with the zoom lens according to claim 1 for forming an image of an object on a given image plane.

16. A zoom lens comprising, in order from an object side:
a first lens group having positive refractive power;
a second lens group having negative refractive power;
a third lens group having positive refractive power; and
a fourth lens group having positive refractive power,
the third lens group including, in order from the object side, a first positive lens, a cemented lens constructed by in order from the object side a second positive lens cemented with a negative lens, and a negative meniscus lens, and
the following conditional expression being satisfied:

$$0.170<(-f2)/f3<0.365$$

where f2 denotes a focal length of the second lens group, and f3 denotes a focal length of the third lens group.

17. The zoom lens according to claim 16, wherein the following conditional expression is satisfied:

$$0.10<fw/f3<0.50$$

where fw denotes a focal length of the zoom lens in a wide-angle end state, and f3 denotes the focal length of the third lens group.

18. The zoom lens according to claim 16, wherein the following conditional expression is satisfied:

$$6.00<f1/(-f2)<7.80$$

where f1 denotes a focal length of the first lens group, and f2 denotes the focal length of the second lens group.

19. The zoom lens according to claim 16, wherein the following conditional expression is satisfied:

$$0.15<f3/f4<2.75$$

where f3 denotes the focal length of the third lens group, and f4 denotes a focal length of the fourth lens group.

20. The zoom lens according to claim 16, wherein the following conditional expression is satisfied:

$$0.85<f1/f3<2.74$$

where f1 denotes a focal length of the first lens group, and f3 denotes a focal length of the third lens group.

21. A method for manufacturing a zoom lens including, in order from an object side, a first lens group having positive refractive power, a second lens group having negative refractive power, a third lens group having positive refractive power, and a fourth lens group having positive refractive power, the method comprising steps of:
disposing, in order from the object side, a first positive lens, a cemented lens constructed by in order from the object side a second positive lens cemented with a negative lens, and a negative meniscus lens into the third lens group;
disposing the third lens group with satisfying the following conditional expressions:

$$r3R<0$$

$$-2.00<(r3R+r3F)/(r3R-r3F)<1.00$$

where r3F denotes a radius of curvature of an image side lens surface of the cemented lens in the third lens group, and r3R denotes a radius of curvature of an object side lens surface of the negative meniscus lens in the third lens group; and disposing each lens group with satisfying the following conditional expression:

$$6.00 < f1/(-f2) < 7.80$$

where f1 denotes a focal length of the first lens group, and f2 denotes a focal length of the second lens group.

22. The method according to claim 21, further comprising a step of:

disposing each lens group with satisfying the following conditional expression:

$$0.10 < fw/f3 < 0.50$$

where fw denotes a focal length of the zoom lens in a wide-angle end state, and f3 denotes a focal length of the third lens group.

23. The method according to claim 21, further comprising a step of:

disposing each lens group with satisfying the following conditional expression:

$$0.15 < f3/f4 < 2.75$$

where f3 denotes a focal length of the third lens group, and f4 denotes a focal length of the fourth lens group.

24. A method for manufacturing a zoom lens including, in order from an object side, a first lens group having positive refractive power, a second lens group having negative refractive power, a third lens group having positive refractive power, and a fourth lens group having positive refractive power, the method comprising steps of:

disposing, in order from the object side, a first positive lens, a cemented lens constructed by in order from the object side a second positive lens cemented with a negative lens, and a negative meniscus lens into the third lens group; and disposing each lens group with satisfying the following conditional expression:

$$0.170 < (-f2)/f3 < 0.365$$

where f2 denotes a focal length of the second lens group, and f3 denotes a focal length of the third lens group.

* * * * *